United States Patent [19]
Berend et al.

[11] Patent Number: 5,611,036
[45] Date of Patent: Mar. 11, 1997

[54] APPARATUS AND METHOD FOR DEFINING THE FORM AND ATTRIBUTES OF AN OBJECT IN AN IMAGE

[75] Inventors: Andrew L. Berend, Cambridge; Mark J. Williams, Huntingdon Cambs.; Michael Brocklehurst, Cambridge, all of United Kingdom

[73] Assignee: Cambridge Animation Systems Limited, Great Britain

[21] Appl. No.: 311,398

[22] Filed: Sep. 23, 1994

Related U.S. Application Data

[63] Continuation of Ser. No. 800,227, Nov. 29, 1991, abandoned.

[30] Foreign Application Priority Data

| Nov. 30, 1990 | [GB] | United Kingdom | 9026120 |
| Jan. 11, 1991 | [GB] | United Kingdom | 9100632 |
| Jan. 31, 1991 | [GB] | United Kingdom | 9102125 |
| May 21, 1991 | [GB] | United Kingdom | 9110945 |
| Aug. 12, 1991 | [GB] | United Kingdom | 9117409 |

[51] Int. Cl.⁶ ........................... G06T 11/00
[52] U.S. Cl. ............................ 395/141; 395/143
[58] Field of Search ................... 395/140–143, 395/150, 151, 133, 134, 138, 275

[56] References Cited

U.S. PATENT DOCUMENTS

| 4,189,743 | 2/1980 | Schure et al. | 358/93 |
| 4,189,744 | 2/1980 | Stern | 358/93 |
| 4,631,690 | 12/1986 | Corthout et al. | 364/518 |
| 4,646,075 | 2/1987 | Andrews et al. | 340/747 |
| 4,897,638 | 1/1990 | Kokunishi et al. | 340/751 |
| 5,155,805 | 10/1992 | Kaasila | 395/151 |
| 5,155,813 | 10/1992 | Donoghue et al. | 395/275 |

FOREIGN PATENT DOCUMENTS

| 2999189 | 8/1989 | Australia | G06F 15/72 |
| 0227387 | 12/1986 | European Pat. Off. | G06F 3/023 |
| 0342752 | 5/1989 | European Pat. Off. | G06F 15/72 |
| 63-109581 | 5/1988 | Japan | G06F 15/62 |
| WO8402993 | 8/1984 | WIPO | G06F 15/353 |

OTHER PUBLICATIONS

Computer Graphics Principles and Practice—Foley et al. 1990.
Steven Strassmann, "Hairy Brushes," Aug. 18–22, 1986, pp. 225–232.
Naoyuki Kai, Tsutomu Minagawa, Ichiro Nagashima, Masahide Ohhashi, "A High Speed Outline Font Rasterizing LSI," 1989, pp. 24.6.1–24.6.4.

*Primary Examiner*—Almis R. Jankus
*Attorney, Agent, or Firm*—Lerner, David, Littenberg, Krumholz & Mentlik

[57] ABSTRACT

Apparatus and method for defining the form and attributes of an object in an image. The form and attributes of the object are defined in such a way that the attribute data can be modified without changing the form. Attribute data may include opacity, color, and object width. In detail, a path which represents the underlying skeletal form of an object in an image is generated from path control data, which may comprise data defining path control points. Values of an attribute of the object are specified at attribute points which have a position relative to the path. The attribute points may be varied without changing the form. The apparatus and method may be used for computer painting and to generate a matte or transparency image.

87 Claims, 42 Drawing Sheets

WORKING MEMORY 121

| LINE 1 TABLE | | | | |
|---|---|---|---|---|
| (POINT 1) | $x_1$ | $y_1$ | $x_{e1}, y_{e1}$ | $x_{f1}, y_{f1}$ |
| (POINT 2) | $x_2$ | $y_2$ | $x_{e2}, y_{e2}$ | $x_{f2}, y_{f2}$ |
| (POINT 3) | $x_3$ | $y_3$ | $x_{e3}, y_{e3}$ | $x_{f3}, y_{f3}$ |
| | | | | |

FIG. 4

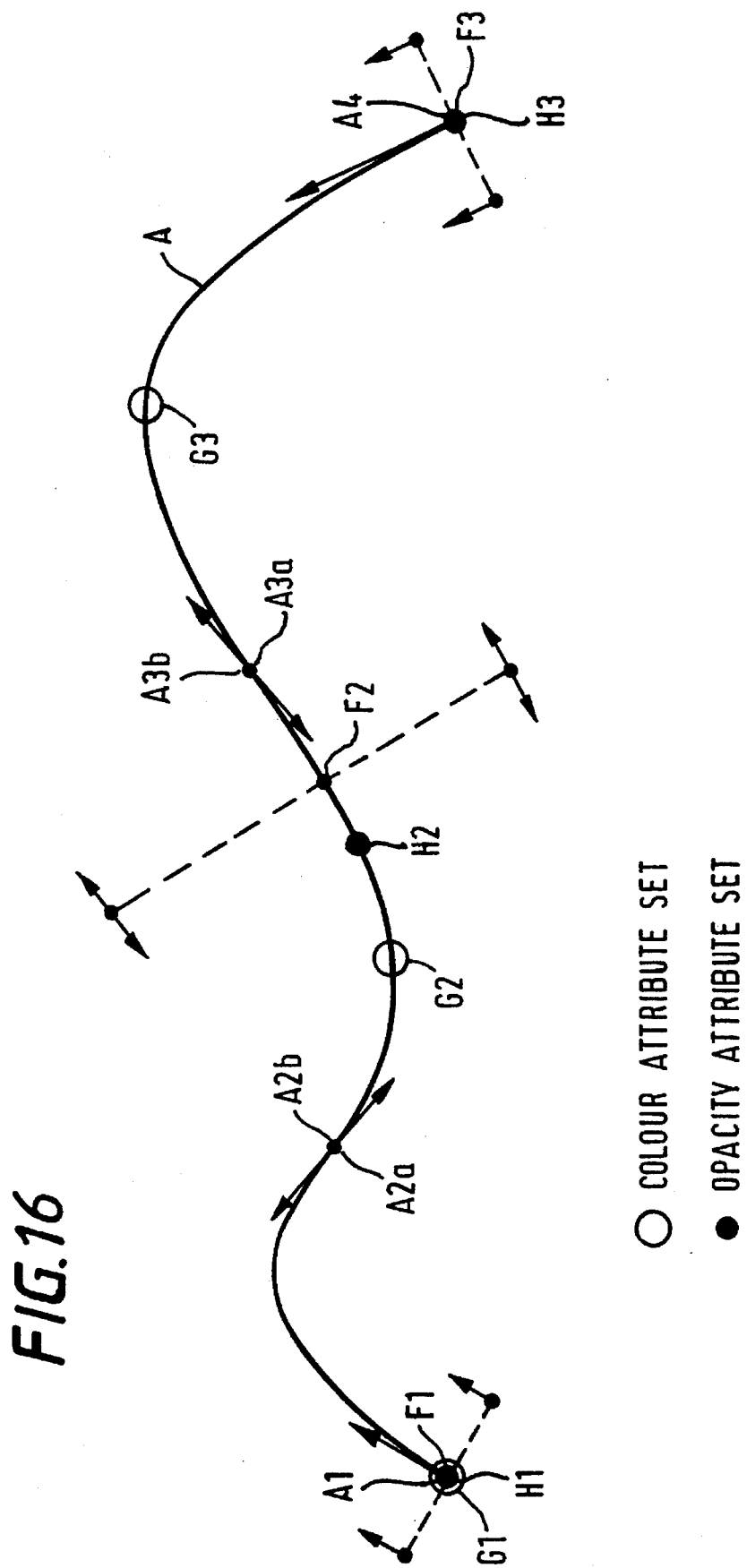

FIG. 17

122 — ATTRIBUTE CONTROL POINTS

| POINT | SEG | PARAM | EXTENT ||||||| COLOUR |||||| OPACITY ||||||
|---|---|---|---|---|---|---|---|---|---|---|---|---|---|---|---|---|---|---|---|---|
| | | | $E_1$ | $E_2$ | $tan_1x$ | $tan_1y$ | $tan_2x$ | $tan_2y$ | $C_1$ | $C_2$ | $C_3$ | $x_1$ | $x_2$ | $x_3$ | $O_1$ | $O_2$ | $O_3$ | $x_1$ | $x_2$ | $x_3$ |
| $P_1$ | $A_1$ | 0 | 0.2 | 0.2 | 1.0 | 0.0 | -1.0 | 0.0 | G | R | G | 0 | 0.5 | 1.0 | 0 | 1.0 | 0 | 0 | 0.5 | 1.0 |
| $P_2$ | $A_2a$ | 0.3 | - | - | - | - | - | - | 0 | R | 0 | 0 | 0.5 | 1.0 | - | - | - | - | - | - |
| $P_3$ | $A_2b$ | 0.6 | - | - | - | - | - | - | - | - | - | - | - | - | 0 | 1.0 | 0 | 0 | 0.5 | 1.0 |
| $P_4$ | $A_2b$ | 0.7 | 0.6 | 0.8 | 0.9 | 0.1 | -0.9 | -0.1 | - | - | - | - | - | - | - | - | - | - | - | - |
| $P_5$ | $A_3b$ | 0.4 | - | - | - | - | - | - | 0 | G | R | 0 | 0.5 | 1.0 | - | - | - | - | - | - |
| $P_6$ | $A_3b$ | 1.0 | 0.2 | 0.2 | 1.0 | 0.0 | -1.0 | 0.0 | - | - | - | - | - | - | 0 | 0.1 | 0 | 0 | 0.5 | 1.0 |

PATH CONTROL POINTS

| POINT | POSITION || TAN. END POINT ||
|---|---|---|---|---|
| $A_1$ | $x_1$ | $y_1$ | $x_{f1}$ | $y_{f1}$ |
| $A_2a$ | $x_2$ | $y_2$ | $x_{e2}$ | $y_{e2}$ |
| $A_2b$ | $x_2$ | $y_2$ | $x_{f2}$ | $y_{f2}$ |
| $A_3a$ | $x_3$ | $y_3$ | $x_{e3}$ | $y_{e3}$ |
| $A_3b$ | $x_3$ | $y_3$ | $x_{f3}$ | $y_{f3}$ |
| $A_4$ | $x_4$ | $y_4$ | $x_{e4}$ | $y_{e4}$ |

FIG.19

SEGMENT TABLE

| | CURVE | WIDTH | COLOUR | OPACITY |
|---|---|---|---|---|
| P1 | | | | |
| P2 | | | | |
| P3 | | | | |
| P4 | | | | |
| P5 | | | | |
| ⋮ | | | | |
| | | | | |

SLICE TABLE

127

| CORNER | POSITIONS | REGIONS | |
|---|---|---|---|
| $x_1$ $y_1$ | $x_3$ $y_3$ | $x_5$ $y_5$ | $x_6$ $y_6$ |
| $x_2$ $y_2$ | $x_4$ $y_4$ | $x_7$ $y_7$ | $x_8$ $y_8$ |
| | | $x_9$ $y_9$ | $x_{10}$ $y_{10}$ |

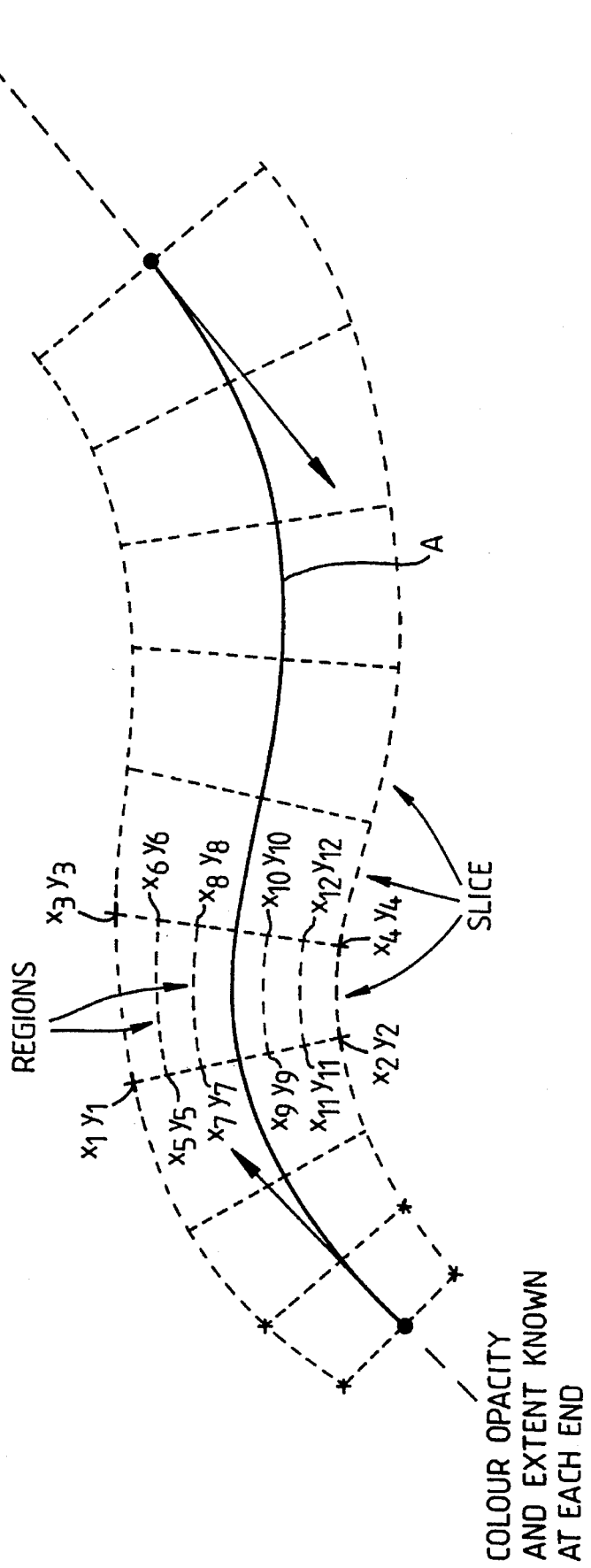

FIG.26A.
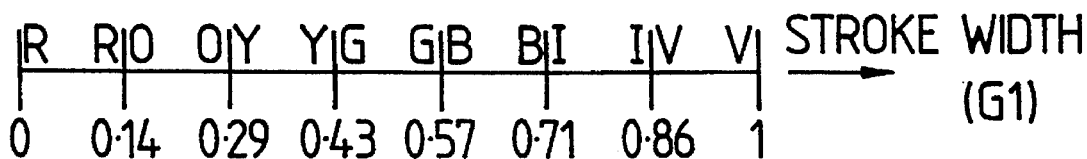
STROKE WIDTH → (G1)
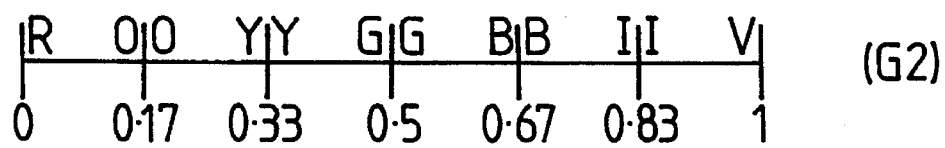
(G2)
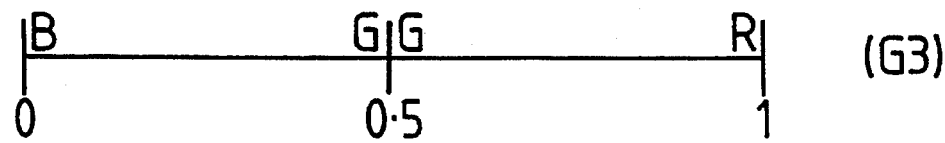
(G3)
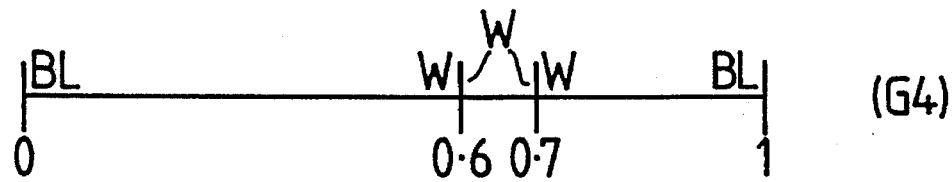
(G4)
R = RED      O = ORANGE    W = WHITE
G = GREEN    Y = YELLOW
B = BLUE     I = INDIGO
BL = BLACK   V = VIOLET

FIG. 26C.
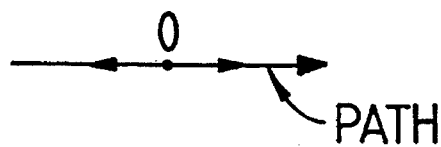
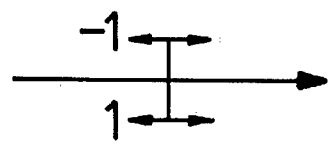
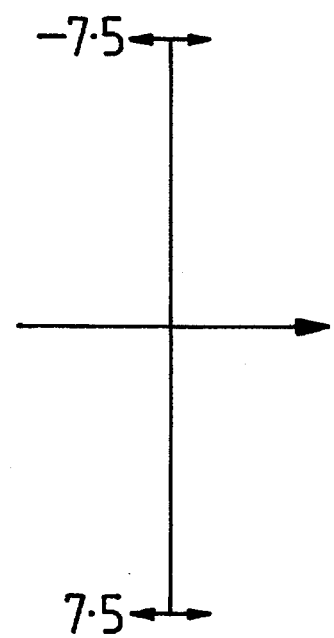
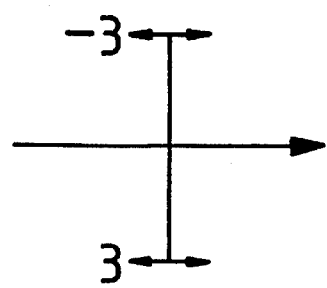

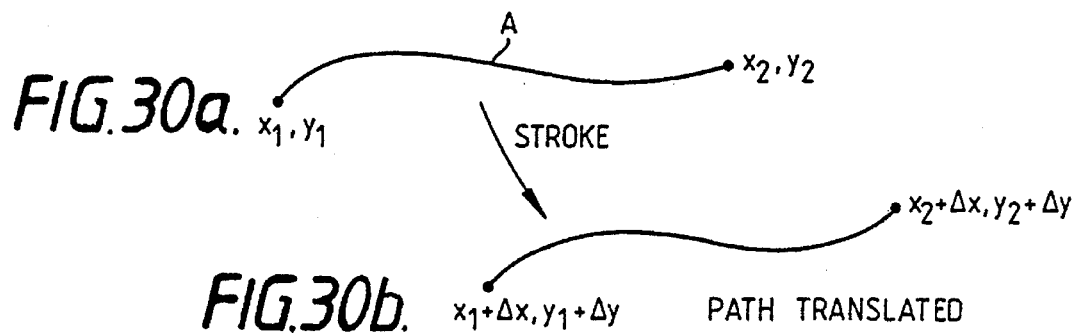
FIG.30a.
FIG.30b. PATH TRANSLATED
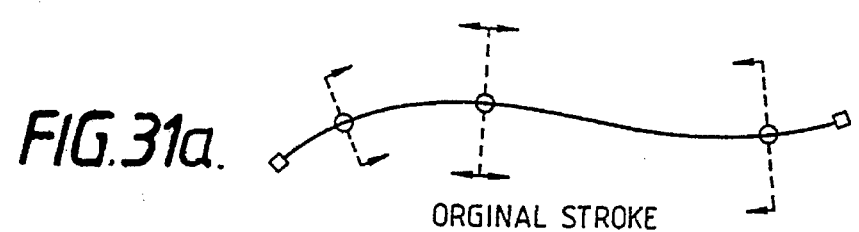
FIG.31a. ORGINAL STROKE
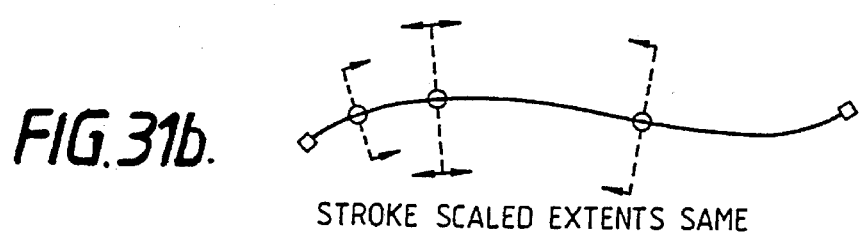
FIG.31b. STROKE SCALED EXTENTS SAME
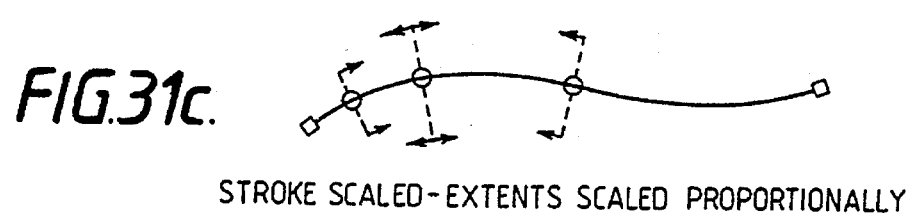
FIG.31c. STROKE SCALED-EXTENTS SCALED PROPORTIONALLY
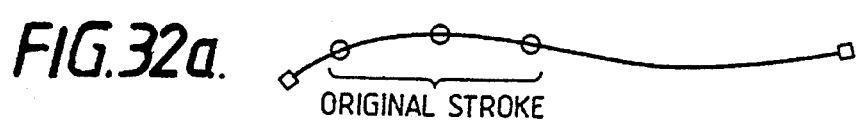
FIG.32a. ORIGINAL STROKE
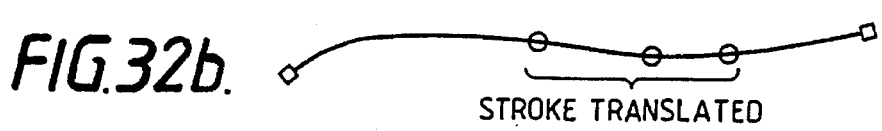
FIG.32b. STROKE TRANSLATED

| LINE No. | EXTENT ATTRIBUTE DATA | TRANSPARENCY DATA |
|---|---|---|
| | | |
| | | |

APPARATUS AND METHOD FOR DEFINING THE FORM AND ATTRIBUTES OF AN OBJECT IN AN IMAGE

This is a continuation of application Ser. No. 07/800,227 filed Nov. 29, 1991 now abandoned.

FIELD OF THE INVENTION

This invention relates to apparatus for, and a method of, image generation and processing, particularly but not exclusively for use in computer illustration or in cartoon animation.

DESCRIPTION OF BACKGROUND ART

Prior to the advent of digital computers, the tools available to the graphic artist included pencils or pens (generally producing a substantially uniform line), and brushes or airbrushes (producing a controllably nonuniform line, variable by varying the pressure and/or speed applied to the tool).

Digital image processing apparatus is known which provides simulations of these manually operable graphics tools. For example, British Patents 2059625, 2140257, 2113950 and 2147122 describe aspects of the "Paintbox" system available from Quantel Limited. With this system, an operator selects the characteristics of the graphics tool he wishes to imitate and then manipulates a pressure sensitive stylus over a digitising pad to input a desired line. As the stylus is moved over the tablet, the apparatus senses the stylus position and the pressure applied thereto, reads image data from a corresponding mapped area of an image store (e.g a frame buffer) modifies the data in accordance with the sensed pressure, and writes it back into the store. The system is arranged and intended to simulate a conventional graphics tool such as a paintbrush or airbrush, and the artist exerts control over the parameters of the line "drawn" in the image store in the same way, so that the width and other attributes of the line are controlled as the stylus moves, and the stored image data comprises a direct representation of the line itself, corresponding to a manually painted line.

It is known in computer graphics to represents objects as parametric curves, the curve shape being specified and controlled by data representing the positions of points on the curve and the tangents thereat; as disclosed in, for example, "Interactive Computer Graphics", P Burger and D Gillies, 1989, Addison Wesley, ISBN 0-201-17439-1.

In "Hairy Brushes", Strassman, 1986 Siggraph Conference Proceedings (Vol 20, No 4, Page 225–232), a system for emulating paintbrushes of a particular kind is described in which a brush stroke is first defined by data specifying the linear trajectory of the brush (as point positions and tangents), and the pressure applied to the brush (which in turn specifies the width of the stroke normal to the line running along the trajectory), and then the colour profile laterally across the brush stroke is specified by the user defining a profile of individual bristle colours laterally across the brush stroke. It is suggested that profiles could be defined at the start and end of the stroke, and the colour profile along the stroke be interpolated from the end values.

As that system is intended to simulate particular types of existing brush, it makes a distinction between properties of the stroke (its trajectory and its pressure - dictated width) and those of the brush (its colour profile).

WO84/02993 shows a system for generating images, in which an image path is dictated by Bezier control points. It is possible to vary the width of the entire stroke defined by the path, as a whole, but not to provide a varying width along the stroke; the object of that proposal is to create a stroke of uniform width.

U.S. Pat. No. 4,897,638 shows an image processing system in which it is possible to specify a varying stroke width, but only at the control points used to specify the curvature of the path.

SUMMARY OF THE INVENTION

In one aspect, the present invention provides image processing apparatus and a method of image processing in which the width of an object, for example a representation of a brush stroke, can be varied independently of the path of that object. The width of the object is variable along the path, and the apparatus and method is arranged to generate intervening width values from stored width values corresponding to the boundaries of the object at positions spaced along the path. The positions on the path need not correspond to the points defining the path, and consequently offer the user much greater flexibility in defining the desired object shape with a reduced amount of data for defining both the path and the shape. Preferably the width or extent positions are stored as values defining a length along the path, and in any case it is preferred that it should be possible to vary the positions of the points at which width values are specified without varying those width values; this enables the shape of the object or stroke to be rapidly and conveniently edited.

In another aspect, the invention provides a method and apparatus for image processing in which attributes of an object in an image to be generated are manipulable independently of its path, and are displayed symbolically to enable interactive manipulation thereof.

In yet another aspect, the invention provides a method and apparatus for drawing lines parametrically, in which one line is connectable to another so as to be movable therewith without altering the other to which it is connected.

In a further aspect, the invention provides a method and apparatus for parametric line drawing, in which parametric control points may be defined and selectively activated or de-activated.

In a yet further aspect, the invention provides a method and apparatus for creating and using mask or matte images in which the matte is defined by control points or vectors and its transparency/opacity is defined at discrete points and interpolated therebetween so as to allow the creation of complex transparency profiles in masking or combining images.

By storing attribute data in a sparse manner and employing subsequent interpolation, embodiments of the invention enable rapid interactive editing of an image or matte and since the stored data is in a resolution independent format it may readily be converted for output to different types of output printing or display device, whilst nonetheless complex and subtle visual effects may easily be created.

Other aspects and preferred embodiments of the invention will be apparent from the following description and claims.

BRIEF DESCRIPTION OF THE DRAWINGS

The invention will now be illustrated by way of example only with reference to the accompanying drawings in which:

FIG. 3C shows a detail of FIG. 3B;

FIG. 4 shows schematically the arrangement of data in a memory forming part of the apparatus of FIG. 1;

FIG. 16 shows schematically a line displayed upon the display of FIG. 3A;

FIG. 17 shows schematically the arrangement of attribute data within the table of FIG. 4;

FIG. 19 shows schematically the arrangement of data within the memory of FIG. 1 produced during the process of FIG. 18;

FIG. 20 shows schematically the positions from which that data is derived in the display of FIG. 16;

FIG. 21 shows schematically the arrangement of data corresponding to further stage in the process of FIG. 18;

FIGS. 26A–C show attribute settings corresponding to the objects of FIGS. 24B–D and 25D—D;

FIG. 30 shows schematically supervisory display indicating the effect of translating an object path;

FIGS. 31A–C show schematically supervisory displays indicating the effects of scaling an object;

FIGS. 32A–B show schematically a supervisory display indicating the effects of translating attributes of an object relative to its path;

PARAMETRIC CURVES

Before discussing the invention in detail a brief description of parametric curves will be given; such curves form part of a common general knowledge of the skilled worker, and are referred to in, for example, "Interactive Computer Graphics", P Burger and D Gillies, 1989, Edison Wesley, ISBN 0-201-17439-1, or "An Introduction to Splines for Use in Computer Graphics and Geometric Modelling", by R H Bartels, J C Beatty and B A Barsky, published by Morgan Kaufmann, ISBN 0-934613-27-3 (both incorporated herein by reference).

Figure 36A:
FIGS. 36A–E illustrate curve approximations.
Figure 36B:
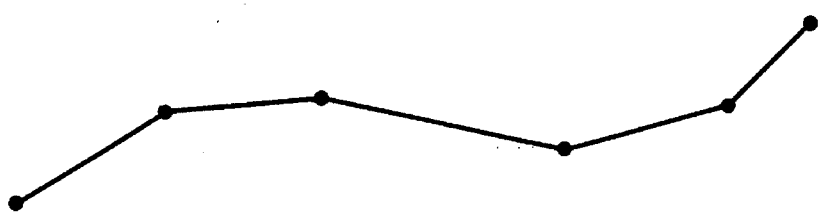
Figure 36C:
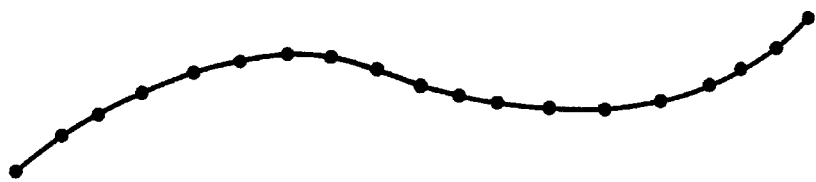

Referring to FIG. 36A, a fairly smooth freehand curve is shown. Referring to FIG. 36B, one way of representing the curve would be to draw a series of straight line segments, meeting at points. However, the number of straight line segments has to be large, as illustrated in FIG. 36C, before the simulation is at all convincing.

Figure 36D:
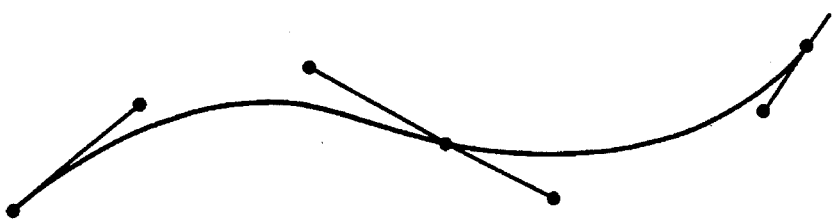

Alternatively, the curve may be represented as a series of curve segments running between points. If, as in FIG. 36D, adjacent curve segments have the same slope at the point at which they join, the curve can be made smooth. One well known type of curve approximating technique employs a cubic curve in which the coordinate variables x and y are each represented as a third order or cubic polynomial of some parameter t. Commonly, the value of the parameter is constrained to lie between 0 and 1. Thus, each curve segment is described as:

$$x = a_x t^3 + b_x t^2 + c_x t + d_x \quad (1)$$

$$y = a_y t^3 + b_y t^2 + c_y t + d_y \quad (2)$$

Each segment has two end points, at which t=0 and t=1. The coordinates of the t=0 end point are therefore $x_0 = d_x$, $y_0 = d_y$, and those of the t=1 point are given by:

$$x_1 = a_x + b_x + c_x + d_x \quad (3)$$

$$y_1 = a_y + b_y + c_y + d_y \quad (4)$$

At the end points, the slope of the curved segment is also fixed or predetermined so that each segment can be matched to its neighbours to provide a continuous curve if desired.

The shape of the curve between the end points is partially dictated by the slopes at the end points, but also by a further item of information at each point which is conveniently visualised as the length of a tangent vector at each point. The curve between the two points may be thought of as having at its end clamped at the end points, at fixed slopes thereat, whilst the tangent vector exercises a pull on the direction of the curve which is proportional to its length, so that if the tangent vector is long the curve tends to follow the tangent over much of its length. The tangent vector may be derived from the above equations (1)–(4) and vice versa; for example, where the end of the Bezier tangent vector at the t=0 point has coordinates $x_2, y_2$, and that at the end of the t=1 point has coordinates $x_3, y_3$, the coefficients a, b, c, d are given by:

$$d_x = x_0 \text{ (likewise } d_y = y_0) \quad (5)$$

$$b_x = 3(x_0 - 2x_2 + x_3) \text{ (and likewise } b_y) \quad (6)$$

$$c_x = 3(x_2 - x_0) \text{ (and likewise } c_y) \quad (7)$$

$$a_x = 3x_2 - x_0 - 3x_3 + x_1 \text{ (and likewise } a_y) \quad (8)$$

The differential of the curve equation with respect to the variable t is:

$$c + 2bt + 3at^2 \quad (9)$$

The differential values at the t=0 and t=1 points are, respectively, $$3(x_2 - x_0) = c_x;$$

$$3(y_2 - y_0) = c_y;$$

$$3(x_1 - x_3) = c_x + 2b_x 3a_x;$$

$$3(y_1 - y_3) = c_y + 2b_y + 3a_y$$

From these equations, by inspection, it will be seen that the length of the tangent to the Bezier control points ($x_2, x_2$), ($x_3, x_3$) is ⅓ that of the actual tangent vector. Although the actual tangent vector could be employed, it is mathematically more convenient to employ the Bezier tangent vector (which has the same direction but ⅓rd the magnitude).

In the so called Hermite form of a cubic equation, the data used to define a curve segment is the coordinates of the end points, the slope of the tangent vector at each end point, and the length of each tangent vector. In the Bezier format, the data used to define a curve segment are the coordinates of the end points, and the coordinates of the ends of each tangent vectors. Conversion between the Hermite and Bezier format is merely a matter of polar to rectangular conversion, and vice versa.

Figure 37A:
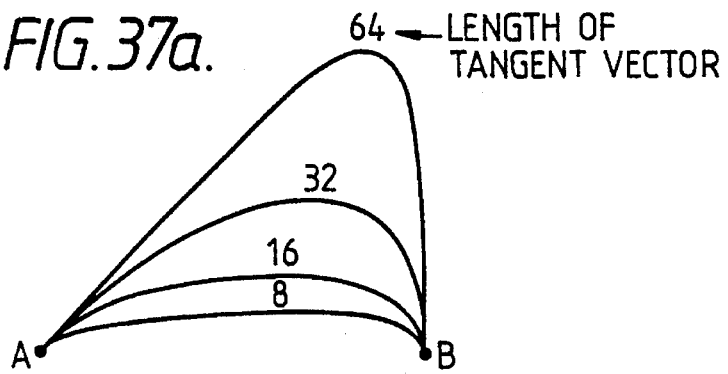
FIGS. 37A and 37B illustrate the effect of varying the control variables used in parametric cubic curves.

FIG. 37A shows the effect of varying the magnitude or lengths of the tangent vectors, whilst keeping their angle constant. It will be seen that the effect is to "pull" the curve towards the tangent vector, more or less strongly depending on the length of the tangent vector.

Figure 37B:
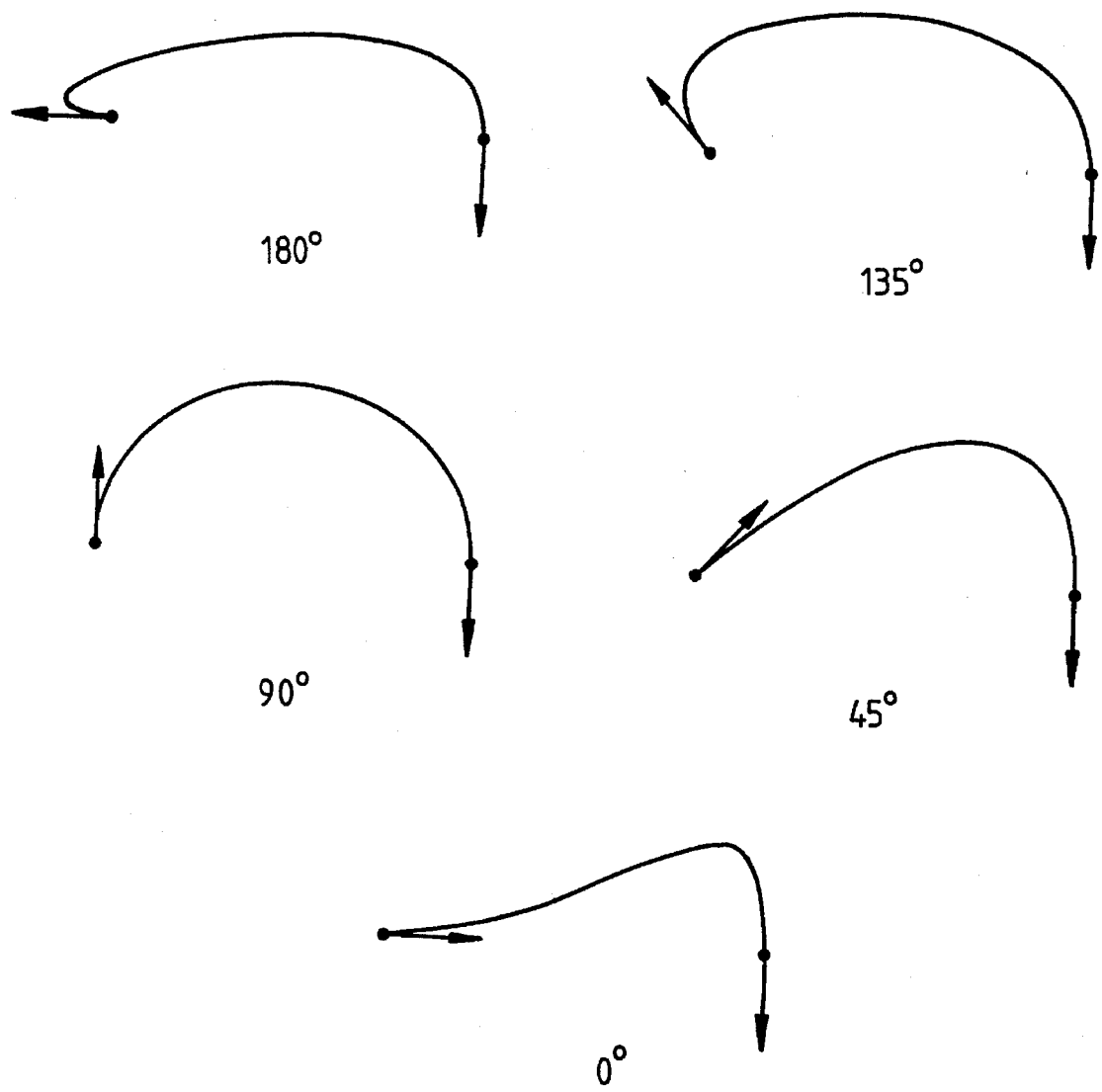

FIG. 37B shows the effect of varying the angle of the tangent vector whilst keeping its magnitude fixed.

Other types of cubic curve are also known; for example, the B-spline, which is defined by two ends points and a plurality of intervening control points through which the curve does not pass. However, the Bezier curve description is used in many applications because it is relatively easy to manipulate; for instance, in matching an approximated curve to an existing curve, the coordinates and tangent angles at points along the curve can directly be measured and employed. The PostScript command language used to control many laser printers employs this curve description, accepting values defining the coordinates of curve segment end points and the coordinates of corresponding tangent end points.

In general, a smooth curve is defined by a number of such end points, and two adjacent such segments will share a common end point. If the curve is to be smooth, the tangent angles defined at the end point in relation to each curve segment will be equal, although the tangent vector lengths will in general not.

Figure 36E:

However, as shown in FIG. 36E, it is possible to represent a line with a curvature discontinuity by providing that the tangent angle at end point is different for each of the two segments it defines.

For present purposes, the main usefulness of this form of curve representation is that a smooth, bold curve can be defined using only a small number of coefficients or control points, and parts of it can be amended without extensive recalculation of the whole line.

Apparatus for performing the invention will now be described.

GENERAL DESCRIPTION OF APPARATUS

Figure 1:
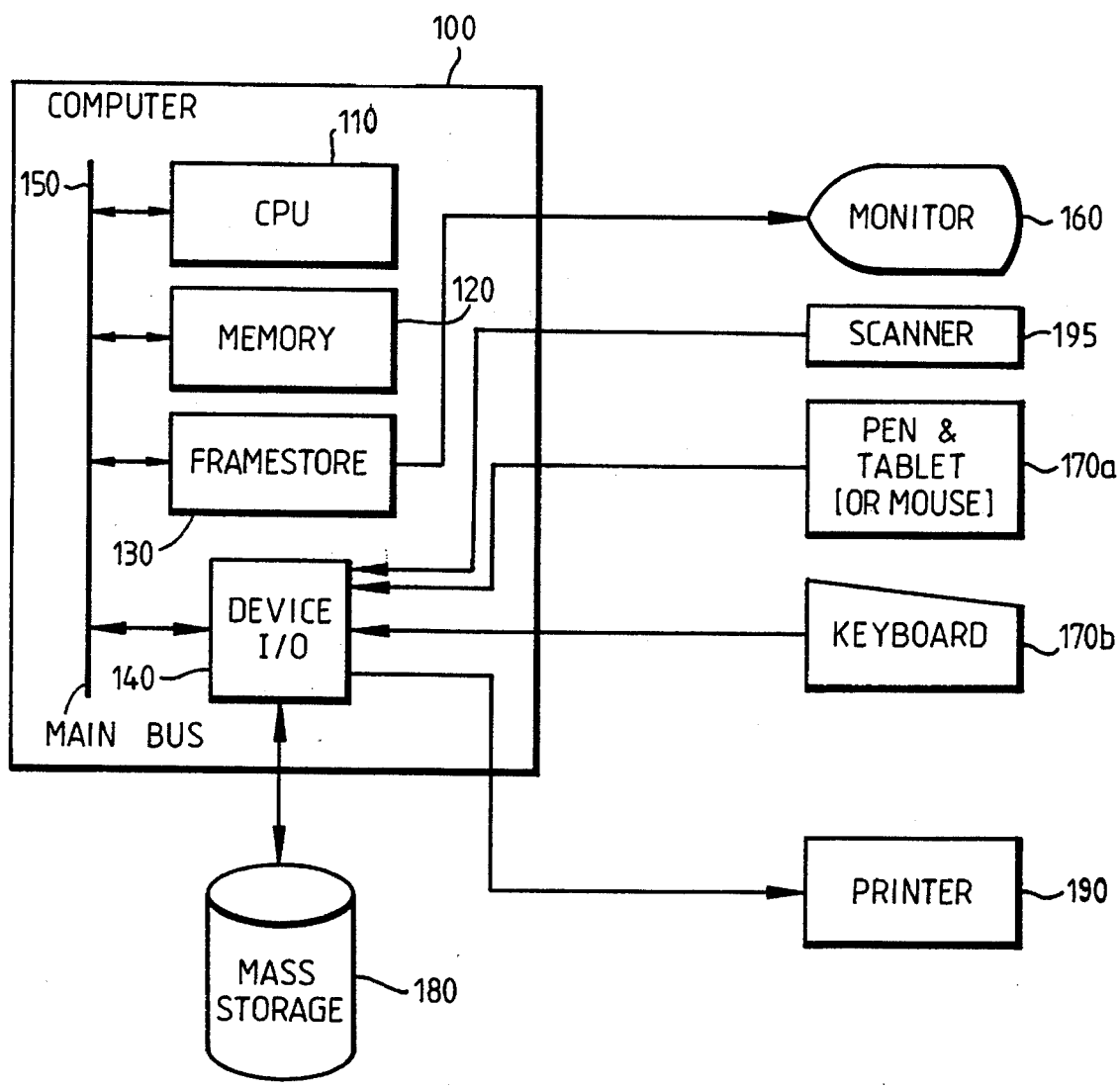
FIG. 1 shows schematically the elements of apparatus according to an embodiment of the invention.

Referring to FIG. 1, apparatus according to an embodiment of the invention comprises a computer 100 comprising a central processing unit 110, a memory device 120 for storing the program sequence for the CPU 110 and providing working read/write memory, a frame store 130 comprising a series of memory locations each associated with, or mapped to, a point in an image to be generated or processed, and an input/output controller 140 providing input and output ports for reading from and writing to external devices, all intercoupled through common parallel data and address buses 150.

A monitor 160 is connected to the computer 100 and its display updated from the frame store 130 under control of the CPU 110. At least one user input device 170a,170b is provided; typically a keyboard 170b for inputting commands or control signals for controlling peripheral operations such as starting, finishing and storing the results of an image generation or image processing operation, and a position sensitive input device 170a such as, in combination, a stylus and digitising tablet, or a "mouse", or a touch sensitive screen on the monitor 160, or a "trackerball" device or a joystick. A cursor symbol is generated by the computer 180 for display on the monitor 160 in dependence upon the signal from the position sensitive input device 170a to allow a user to inspect an image on the monitor 160 and select or designate a point or region of the image during image generation or processing.

A mass storage device 180 such as, for instance, a hard disk device is preferably provided as a long term image store, since the amount of data associated with a single image stored as a frame at an acceptable resolution is high. Preferably, the mass storage device 180 also or alternatively comprises a removable medium storage device such as a floppy disk drive, to allow data to be transferred into and out from the computer 100.

Also preferably provided, connected to input/output device 140, is a printer 190 for producing a permanent visual output record of the image generated. The output may be provided on a transparency or on a sheet of paper.

A picture input device 195 such as a scanner for scanning an image on, for example, a slide, and inputting a corresponding video image signal to the computer 150 may also be provided.

One example of a suitable computer 100 is the NeXTCUBE computer including the NeXTdimension colour board, available from NeXTComputer, Inc., USA. This arrangement provides direct formatted outputs for connection to a videocassette recorder or other video storage device, and accepts video input signals. Further, it includes means for compressing images for storage on a disk store 180, and for decompressing such stored images for display.

Figure 2:
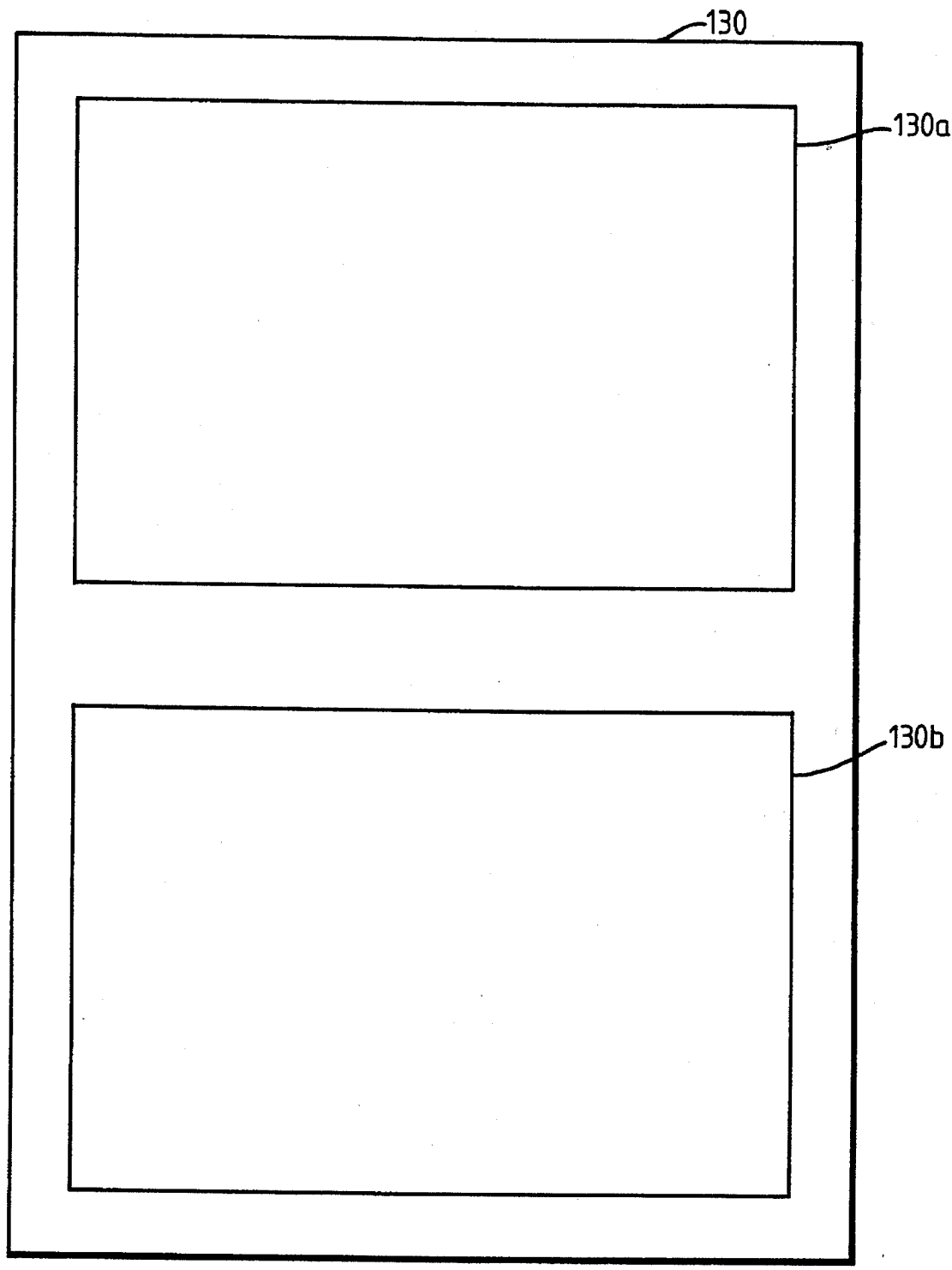
FIG. 2 shows schematically the arrangement of an image store forming part of FIG. 1.

Referring to FIG. 2, the frame store device 130 comprises a pair of image stores 130a,130b. The image store 130a stores the image point, or pixel, data for the image to be generated or processed. The second area, 130b, stores a supervisory or control image displayed during generation or processing of the image stored in the store 130a. The supervisory image may be represented at a lower resolution than the generated image and/or in monochrome and hence the image store 130b may be smaller than the store 130a.

Figure 3A:
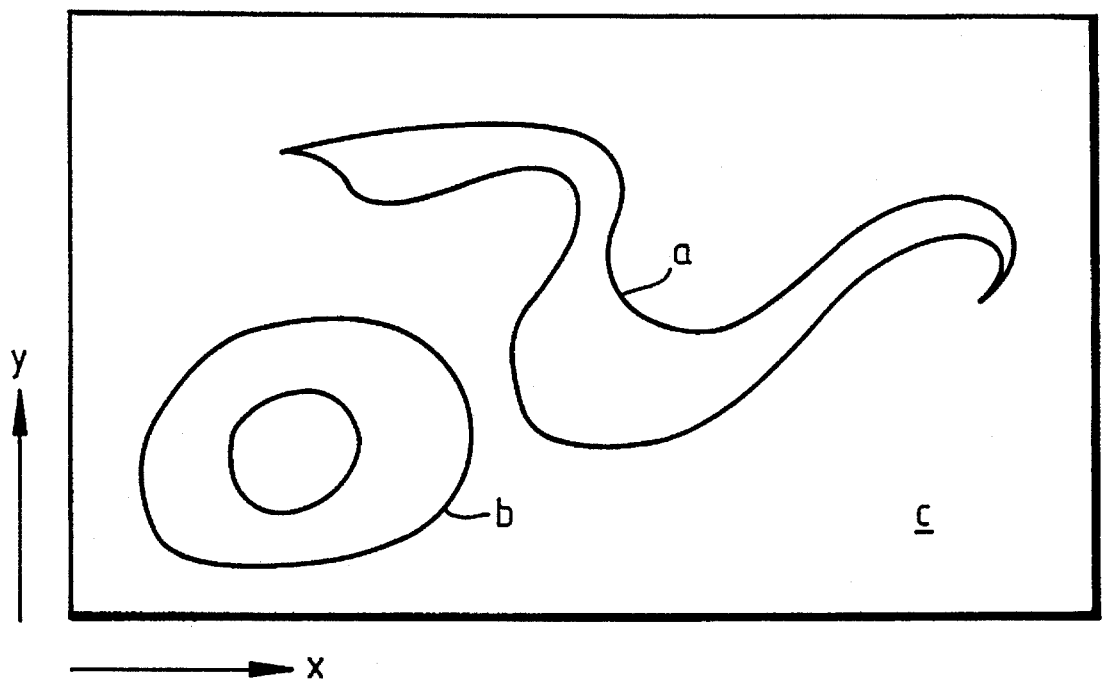
FIGS. 3A and 3B show schematically displays produced by the apparatus of FIG. 1 on a monitor forming part thereof.

Referring to FIG. 3A, the appearance of the contents of the generated image store 130a, when displayed on the monitor 160 or output by the printer 180, comprises, as shown, objects a,b each having a trajectory and an extent, against a background c. The objects a,b and background c also possess colour (or in a monochrome system, brightness).

Figure 3B:
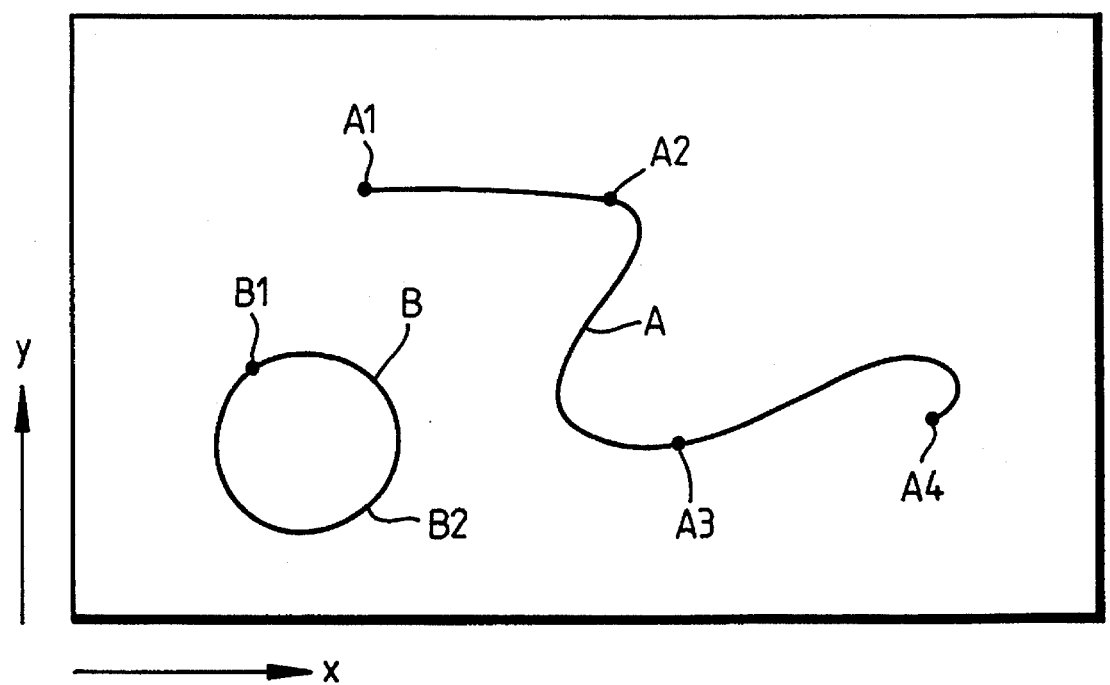

The supervisory display illustrated in FIG. 3B comprises, associated with each object, a line A, B and, disposed upon the or each line, a number of points $A_1, A_2, A_3, A_4, B_1, B_2$.

The contents of the generated image frame store 130a therefore comprise a plurality of point data defining colour and/or intensity of each of a plurality of points to be displayed to form the display shown in FIG. 3A, for example, 500×500 image point data, each comprising colour or brightness information as a multi-bit digital number. Typically, several bits representing each of Red (R), Green (G) and Blue (B) are provided. Preferably, the frame store 130a is of the type which stores additionally a transparency value for each image point to allow the generated image to be merged with another image. The address within the store 130a of given point data is related, or mapped, to its position in the display of FIG. 3A, which will hereafter be referred to in X (horizontal position) and Y (vertical position) Cartesian co-ordinates.

Likewise, the contents of the supervisory image store 130b comprise point data for a plurality of points making up the image of FIG. 3B; in this case, however, the display may comprise only a monochrome line and the point data may for each point merely comprise a single bit set to indicate either a dark point or a light point.

Referring to FIG. 3B, a line shown on the supervisory display image in FIG. 3B is therefore represented by a plurality of pixel values at corresponding X,Y positions within the supervisory image store area 130b. However, this representation of the line is difficult to manipulate if the line is to be amended. A second representation of the line is therefore concurrently maintained in the working memory area 121 of the memory device 120. This representation comprises a plurality of data defining the curve in vector form. Conveniently, the curve A is represented by the position of points ("control points") between which intervening curve values can be derived by calculation.

In this embodiment of the invention, display frames, consisting of line drawings of objects, are created and/or edited with reference to stored control point data (preferably data stored in the Bezier format referred to above). In other words, a stored representation of a display frame comprises a plurality of control points which define line segments which make up a line representation.

For each line A,B, a table 122 is provided in the working memory 121 storing the control point data for that line as shown in FIG. 4. Conveniently, the curve connecting the points is a spline curve, as discussed above, and preferably a Bezier curve; it is therefore defined by $$x = a_x t^3 + b_x t^2 + c_x t + d_x$$

$$y = a_y t^3 + b_y t^2 + c_y t + d_y$$

where a,b,c,d are constants and t is a parameter allocated values between 0 and 1.

In the Bezier curve format the data are stored as a plurality of point data each comprising point X,Y co-ordinates, and data representing slope value for the tangent to the curve at those coordinates, and a tangent magnitude parameter indicating (broadly speaking) the extent to which the curve follows the tangent. This format is used, for example, in control of laser printer output devices. The data may be stored as point coordinates x and y, and tangent angle and length (Hermite form), but is conventionally and conveniently stored as point coordinates x and y and tangent end coordinates x,y (=x+r cosθ, y+r sin θ) (Bezier form) as shown in FIG. 4. In the following, 'Bezier' format will be used to describe both. Full details will be found at "An Introduction to Splines For Use in Computer Graphics and Geometric Modelling" R H Bartels et al, especially at pages 211–245, published by Morgan Kaufmann, ISBN 0-934613-27-3.

Each control point is thus represented by data comprising positional data $(x_i, y_i)$ representing the position within the area of the display of that control point, and tangent data $(x_{ei}, y_{ei}, x_{fi}, y_{fi})$ defining two tangent end points associated with the curved segments on either side of the control point. The tangent extent point data $(x_{ei}, y_{ei}, x_{fi}, y_{fi})$ are stored as position data X, Y defining the position of the tangent end point. It would also be possible to store instead the x,y offsets from the control point position.

Complex curved lines can be represented by a number of such control points, two (at least) for each inflexion in the line. The control points stored in the line table 122 each define, between adjacent points, a line segment described by a corresponding cubic equation, and are the values at which the parameter t in that equation is 0 and 1. As intervening points in the line (e.g POINT 2) play a part in defining two neighbouring line segments, each is effectively two control points and consequently has data defining two stored tangents.

Although the above described Bezier format is particularly convenient, other parametric ways of representing a curve by control points may be employed, such as the B-spline form, in which the curve control points are not required to lie upon the curve which they characterise.

SUPERVISORY DISPLAY

Path Display

Figure 5:
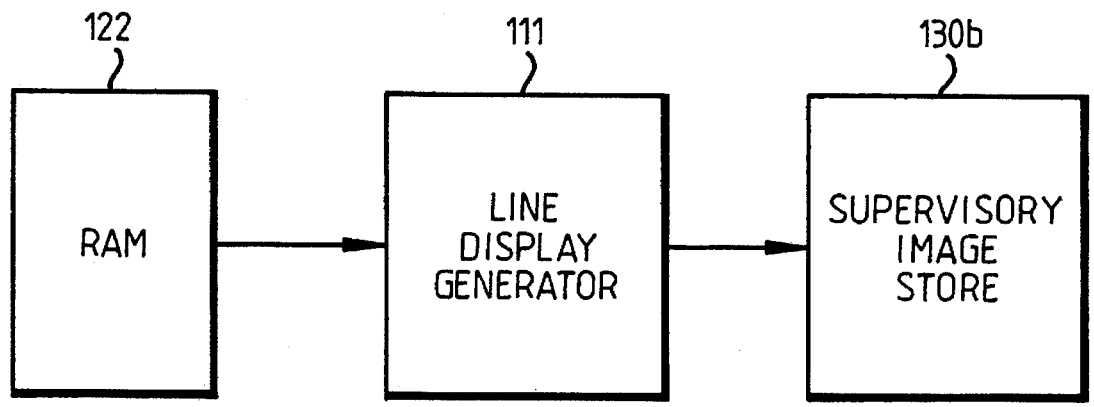
FIG. 5 shows schematically the functional elements of apparatus for generating the display of FIG. 3B.

Referring to FIG. 5, to generate the supervisory display shown in FIG. 3B, supervisory display generating means ill reads the control point data from the corresponding line table 122 in the memory 120, and calculates the values of intervening points on the curve. It then accesses the supervisory display image store 130b and sets the values of the corresponding image points therein, to cause display of the generated line on the monitor 160. In practice, the line generating means 111 comprises the CPU 110 operating under control of a program stored in a program store area 129 of the memory 120.

If the display device onto which the supervisory display is to be shown is arranged to accept a vector input signal, of course, the supervisory display image store 130b is unnecessary and the generating means 111 merely outputs the vector information from the table 122 to the display, for example as a command in the "Postscript" graphics computer language.

Separate monitor devices 160a, 160b could be provided, one for each of the supervisory display and generated display; for instance, the supervisory display monitor may be a monochrome personal computer monitor provided with the computer 100 and the monitor 160b for the generated image a high resolution colour monitor. Alternatively, the computer 100 may be arranged to alternately select one of the supervisory display and generated image display for display on the monitor 160, by alternately connecting the frame stores 130a or 130b thereto. Normally, the supervisory display would be shown, except where it is desired to view the effect of editing an object in the generated image.

Alternatively, a single monitor 160 could be arranged to display both displays adjacent or one overlaying the other as a window. In a further alternative, the outputs of both the frame stores 130a, 130b may be connected so that the supervisory display overlies the generated image; in this case, the supervisory display may be indicated by dashed lines or in any other convenient manner so as not to be confusable with the generated image.

Figure 6:
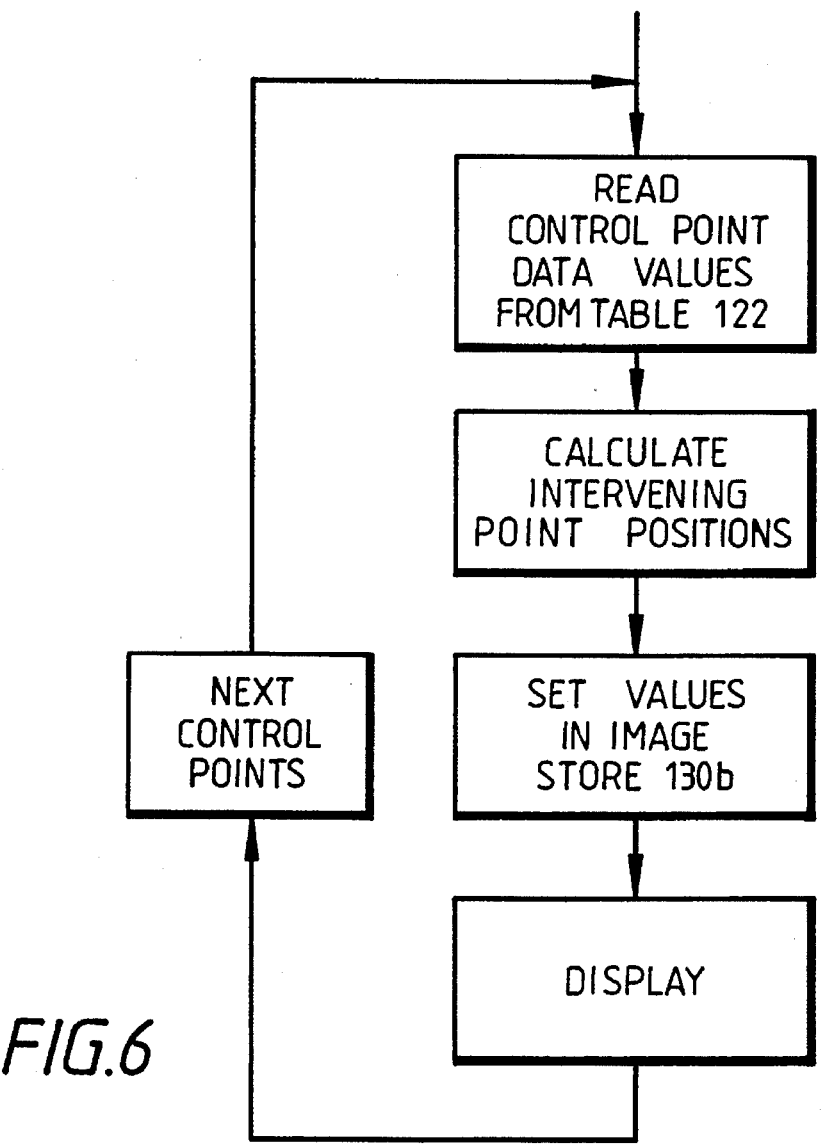
FIG. 6 shows schematically the process by which the apparatus of FIG. 1 and FIG. 5 produces that display.

The general flow of operation in generating the path lines shown in the supervisory display on the display device 160, from the data held in the table 122, is shown in FIG. 6.

In one method of generating the line, the position and tangent data for a pair of adjacent control points is read from the table 122, and the parameters a,b,c,d of equation 1 are derived therefrom. A large number of intervening values of the parameter t between 0 and 1 are then sequentially calculated to provide x,y coordinates of intervening points along the line, and these are quantised to reflect the number of image points available in the supervisory display, and corresponding point data in the supervisory image store 130b are set. Once all intervening points between that pair of control points have been calculated, the supervisory display generator 111 accesses the next pair of points in the table 122. This method is relatively slow, however; faster methods will be found in the above Bartels reference.

The curve or path vector data held within the line tables 122 may have been stored therein from different sources. For instance, the data may be read from a file within the mass storage (for example disk) device 180. Alternatively, they could be derived by fitting a spline approximation to an input curve represented by data derived, for instance, from a scanner or from a user operated digitising pad and stylus. However, a particularly preferred method of allowing the input and modification of the point data will now be described.

Path Input and Editing

Editing may involve either modifying the trajectory of existing lines or (more rarely) adding new lines. It is therefore necessary to amend the data held in the frame table 122, and desirable to amend the image data in the image store 130 so as to enable the user to view the effects of the change. It is found that the best way of providing the user with means for amending the frame data stored in the table 122 is to allow him to employ a position sensitive input device 170a, so as to appear to directly amend the displayed representation of the frame on the screen monitor 160.

Figure 7:
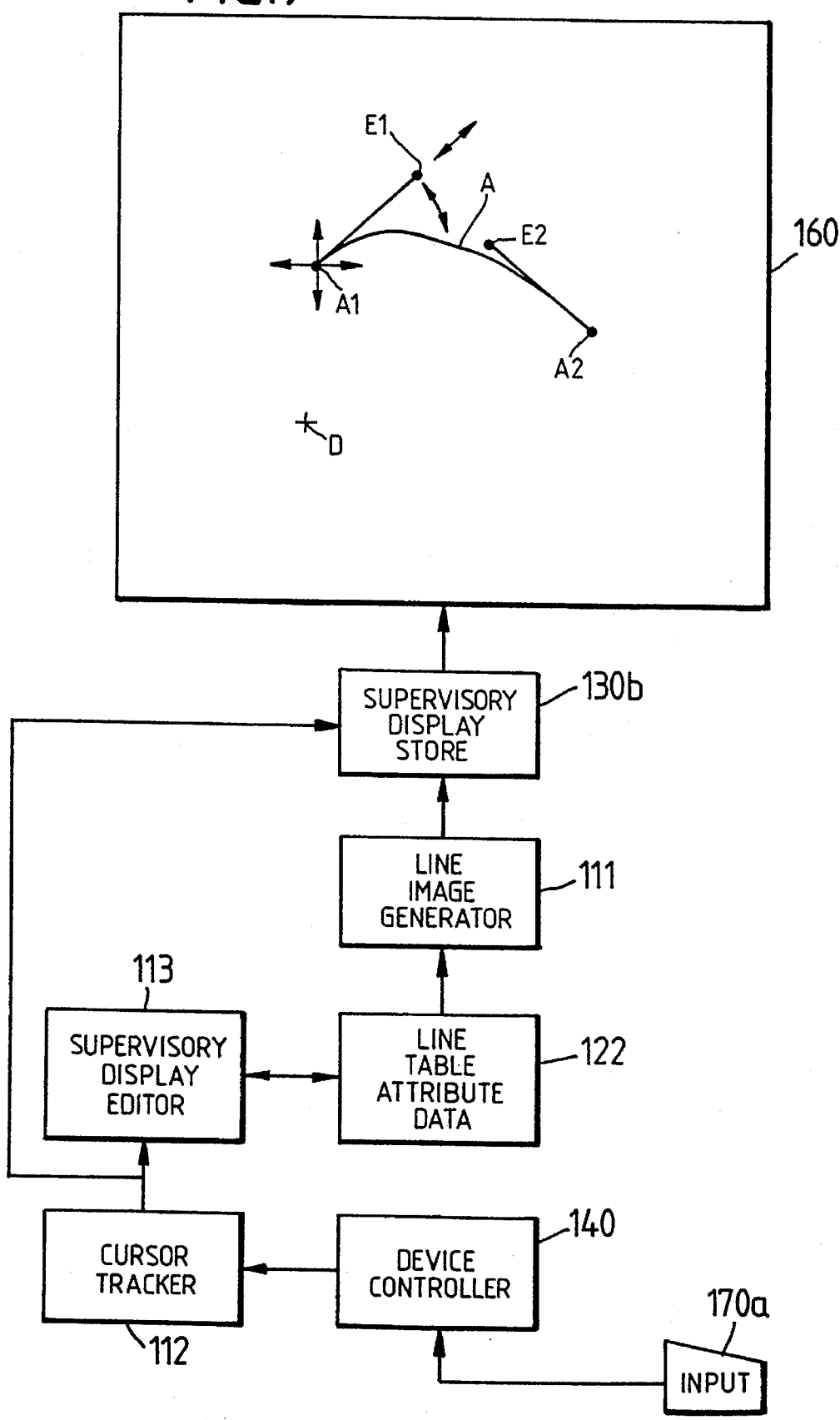
FIG. 7 shows schematically the functional elements of the apparatus of FIG. 1 for allowing input of data to produce that display.
Figure 8:
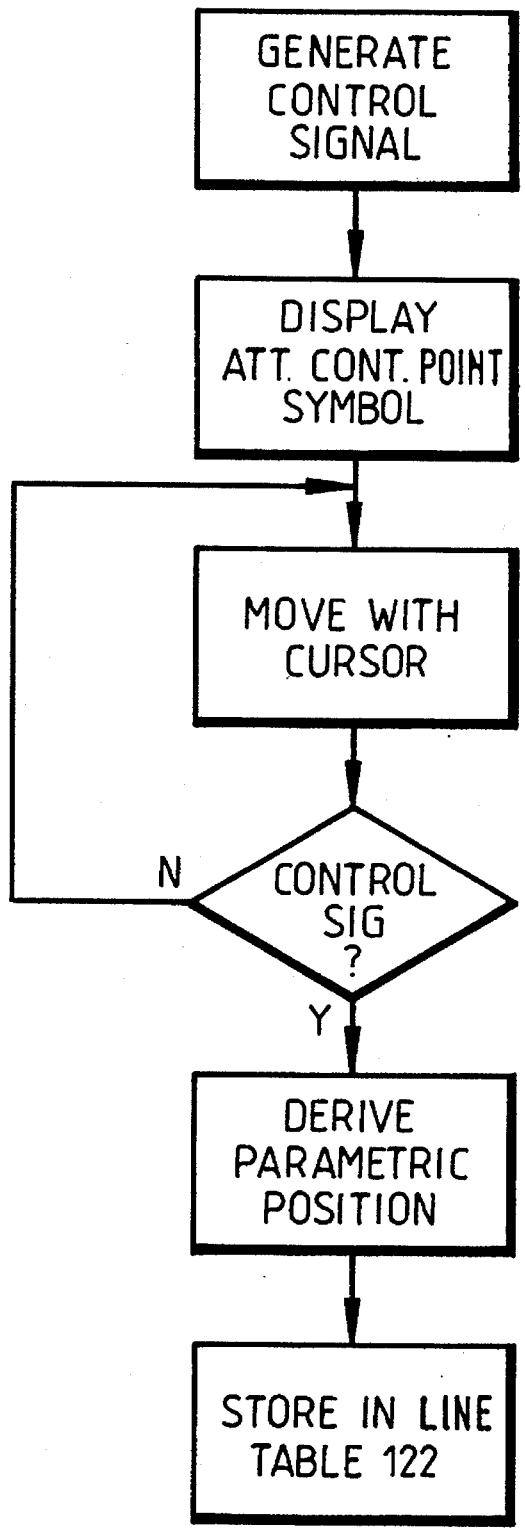
FIG. 8 shows the process performed by the apparatus of FIG. 7 for inputting such data.

In this embodiment, referring to FIGS. 7 and 8, a user manipulates the position sensing input device 170a, for example a "mouse", by moving the device 170a so as to generate a signal indicating the direction and extent of the movement. This signal is sensed by the device input/output controller 140, which provides a corresponding signal to a cursor position controller 112 (in practice, provided by the CPU 110 operating under stored program control) which maintains stored current cursor position data in x,y co-ordinates and updates the stored cursor position in accordance with the signal from the device input/output controller 140. The cursor position controller 112 accesses the supervisory display store area 130b and amends the image data corresponding to the stored cursor position to cause the display of a cursor position symbol D on the supervisory display shown on the monitor 160. The user may thus, by moving the input device 170a, move the position of the displayed cursor position symbol D.

In a preferred embodiment, the supervisory display line generator 111 is arranged not only to write data corresponding to the line A into the supervisory display store 130b, but also to generate a display of the control point data. Accordingly, for each control point $A_1, A_2$, the supervisory image generator 111 writes data representing a control point symbol (for example, a dark blob) into the image store 130b at address locations corresponding to the control point co-ordinates x,y.

Further, the supervisory image generator 111 preferably, for each control point, correspondingly generates a second control point symbol $E_1$ located relative to the $A_1$ along a line defined by the control point tangent data at a length determined by the control point magnitude data; preferably, a line between the two points $A_1$ and $E_1$ is likewise generated to show the tangent itself.

To enter a line A, the user signals an intention so to do (for example by typing a command on the keyboard 170b, or by positioning the cursor symbol at a designated area of a displayed control menu), positions the cursor symbol d at desired point on the display 160, by manipulating the position sensitive input device 170a and generates a control signal to indicate that the desired point has been reached. The cursor position controller 112 supplies the current cursor position data to the table 122 as control point position co-ordinates, and the supervisory display generator 111 correspondingly writes data representing a control point symbol into the image store 130b at address locations corresponding to the control point co-ordinates. The user then inputs tangent information, for example via the keyboard 170b, or in the manner described below. When a second path control point has been thus defined and stored in the table 122, the supervisory image generator 111 will correspondingly generate the line segment therebetween on the supervisory display by writing the intervening image points into the supervisory display store 130a.

To amend the shape or path of the line A displayed on the supervisory display, a user manipulates the input device 170a to move the cursor position symbol D to coincide with one of the control point symbols $A_1$ or $E_1$ on the display 160. To indicate that the cursor is at the desired position, the user then generates a control signal (for example, by "clicking" a mouse input device 170a). The device input/output controller 140 responds by supplying a control signal to the cursor position controller 112. The cursor position controller 112 supplies the cursor position data to a supervisory display editor 113, (comprising in practice the CPU 110 operating under stored program control) which compares the stored cursor position with, for each point, the point position (X,Y) and the position E of the end of the tangent.

When the cursor position is determined to coincide with any point position A or tangent end position E, the display editor 113 is thereafter arranged to receive the updated cursor position from the cursor controller 112 and to amend the point data corresponding to the point $A_1$ with which the cursor symbol coincides, so as to move that point to track subsequent motion of the cursor.

If the cursor is located at the point $A_1$ on the curve A, manipulation by a user of the input device 170a amends the position data $(X_1,Y_1)$ in the line table 122, but leaves the tangent data unaffected. If, on the other the cursor is located at an end of tangent point $E_1$, manipulation by a user of the input device 170a alters tangent end point data in the line table 122 within the memory 120, leaving the position data (x,y) unaffected.

In either case, after each such amendment to the contents of the line table 122, the supervisory display generator 111 regenerates the line segment affected by the control point in question within the supervisory display image store 130b so as to change the representation of the line on the supervisory display.

Once a line has been amended to a desired position, the user generates a further control signal (e.g by "clicking" the mouse input device 170a), and the supervisory display editor 113 thereafter ceases to amend the contents of the memory 120. The cursor controller 112 continues to update the stored cursor position.

This method of amending the line representation is found to be particularly simple and quick to use.

GENERATED IMAGE

The relationship between the contents of the supervisory image store 130b and the generated image store 130a will now be discussed in greater detail.

Referring to FIGS. 3A and 3B, the display of FIG. 3B represents only lines, and corresponds to, for example, the output of an animation program or a PostScript (TM) page design program. The objects a,b shown in FIG. 3A correspond to the lines A,B shown in FIG. 3B insofar as their general trajectory or path is concerned, but differ therefrom by displaying one or more of the following additional attributes:

Extent : Each object a,b in FIG. 3A has a finite width. This width is not necessarily constant along the object.

Colour : Each object a,b in FIG. 3A may be coloured, and the colour may vary along the line of each object. The profile of colour across the width of the object may also be non-constant.

Opacity : An object a,b may be given the appearance of a semitransparent object positioned in front of the background c, by providing that the colour of a part of the object a, be influenced by the colour of the background c, to an extent determined by an opacity parameter varying between 0 (for a transparent or invisible object, the colour of which is entirely dictated by the colour of the background c) and unity (for an entirely opaque object, the colour of which does not depend on that of the the background c). The effect of the opacity of the object is significant when the object is moved, since parts of the object exhibiting some transparency will show an altered appearance depending upon the colour of the background c.

The manner in which these attributes of the generated line shown in the display of FIG. 3A may be manipulated by a user will now be discussed in general terms.

The objects a,b to be displayed are represented within the frame store 130a, in the same form in which they are normally represented within computer painting systems as an array of stored image point data. However, changing the representation of attributes in this form requires a very large amount of data processing since a large number of pixel values must be amended. Further, it is not possible to change the position or shape of a line whilst leaving other of the above listed attributes unaffected.

Figure 9:
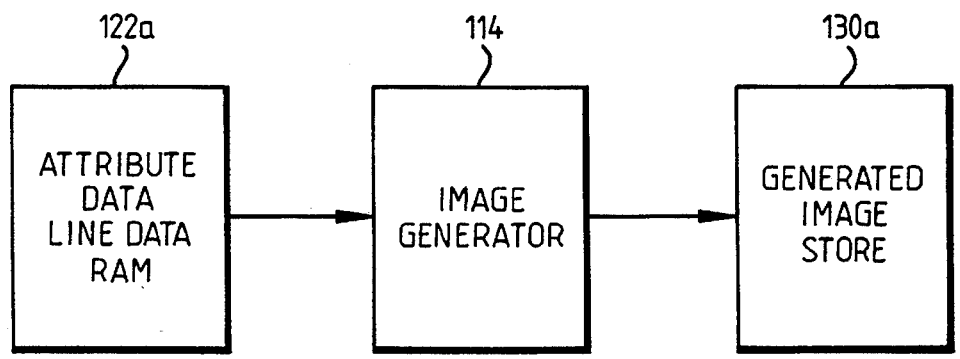
FIG. 9 shows schematically the functional elements of the apparatus of FIG. 1 for producing the display of FIG. 3A.

Rather than storing colour information for every image point in the object a or b, this embodiment accordingly stores information corresponding to attributes of the object associated with predetermined points along the line A shown in the supervisory display, and the corresponding values at intervening points in the object a are generated therefrom by an image generator device 114 shown in FIG. 9 comprising, in practice, the CPU 110 operating under stored program control, and the generated image data stored at corresponding positions within the generated image store 130a for display on the generated image display on the monitor 160.

Referring to FIGS. 10–13, the nature of the attribute data will now be discussed in greater detail.

ATTRIBUTE DATA

Lateral Extent

Figure 10:
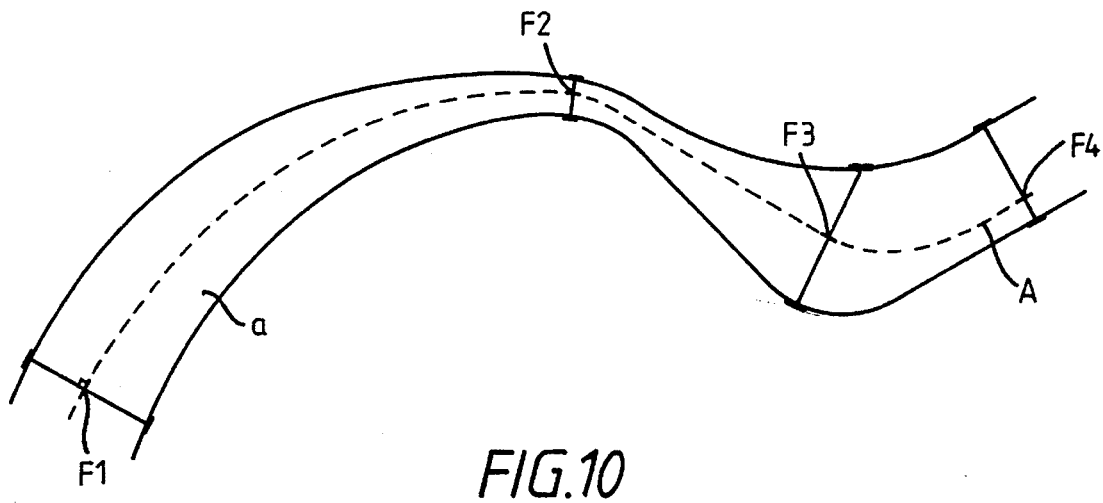
FIG. 10 illustrates schematically the relationship between the displays of FIG. 3A and 3B.

Referring to FIG. 10, a line A on the supervisory display and a corresponding object a on the generated image display are shown superimposed. The object a has, at any point along the line A, a lateral extent on either side of the line A. It is found that a good approximation to most object shapes can be provided by specifying the lateral extent only at a small number of points $F_1$, $F_2,F_3,F_4$ along the line A, and calculating the values of lateral extent at intervening points along the line by linear or other interpolation between the values at those points $F_1$–$F_4$. If the width of the line is to be variable along the line, at least two such points $F_1,F_2$ must be specified. Thus, for each such width or extent point, the data stored comprises an indication of the position of the point along the line A, and an indication of the width or extent on either side of the line $e_1$, $e_2$. Conveniently, these widths are taken normal to the tangent to the line at the corresponding point F, but they could be taken at a different predetermined angle to correspond to a brush held at such an angle.

It is possible to specify two extent values both lying on the same side of the line. In this case, the generated image will not include the path of the line but will be offset from it. The extent values therefore define the positions of the edges of the object, relative to the line, but not necessarily about the line.

The data specifying the width of or extent of a given line therefore comprises extent control data comprising extent values corresponding to spaced apart width control points $F_1$–$F_4$. It should particularly be noted that the positions of these width control points $F_1$–$F_4$ need not for any reason correspond to the curve control points $A_1$, $A_2$ specifying the curvature of the line A. In general, the points at which visual attribute values are defined are usually different to those at which the path positions are defined.

The invention thus enables one to keep the number of curve control points at a minimum to keep the path smooth and unbroken, whilst providing sufficient intervening attribute control points to select a desired object appearance, and so the number of attribute control points may considerably exceed the number of curve control points.

The control point coordinates and their associated extent data are stored together with the curve control point data in the line table 122. The image generating means 114 therefore comprises means for reading the curve control point data, and generating curve points therebetween, as with the supervisory display generator 111, and further comprises means for reading the attribute control point data and for generating the attribute (e.g extent) values at points in between, and means for storing, in the generated image store 130a image data values corresponding to the object a comprising the line A surrounded by an area having the interpolated attribute values.

It is preferred that the interpolation between the stored extent values is performed in such a manner that discontinuities of curvature do not occur; for this purpose, the interpolation is preferably not linear but takes the form of a spline curve, for example, a cubic spline, i.e the lateral spacing e of the extent line from the path is defined by a cubic equation $e=at^3+bt^2+ct+d$. Accordingly, together with the extent values $e_1$, $e_2$, further data controlling the curvature is stored; preferably, in the form of tangent end point coordinates defining a tangent to the curve at each end the ends of the lateral extents $e_1$,$e_2$. It would also be possible to specify a a pair of tangent values at each extent value so as to permit a controlled discontinuity, if required. This also permits the curvature of the edges of the object to be controlled independently of that of the path defining the object. The lengths distance between the end of the extents $e_1$ or $e_2$ and their corresponding tangent end points is a predetermined constant (i.e unity) in this embodiment.

It would likewise be possible to specify the colour of the object a at spaced apart points along the line A. However, this permits only linear colour changes along the line A. It is preferred to specify colour as data which permits a variation of colour across the line A as well as along it. In a preferred embodiment, referring to FIG. 11 colour information is therefore stored representing the variation of colour through the width of the line at each of a plurality of points along the line A.

Figure 11:
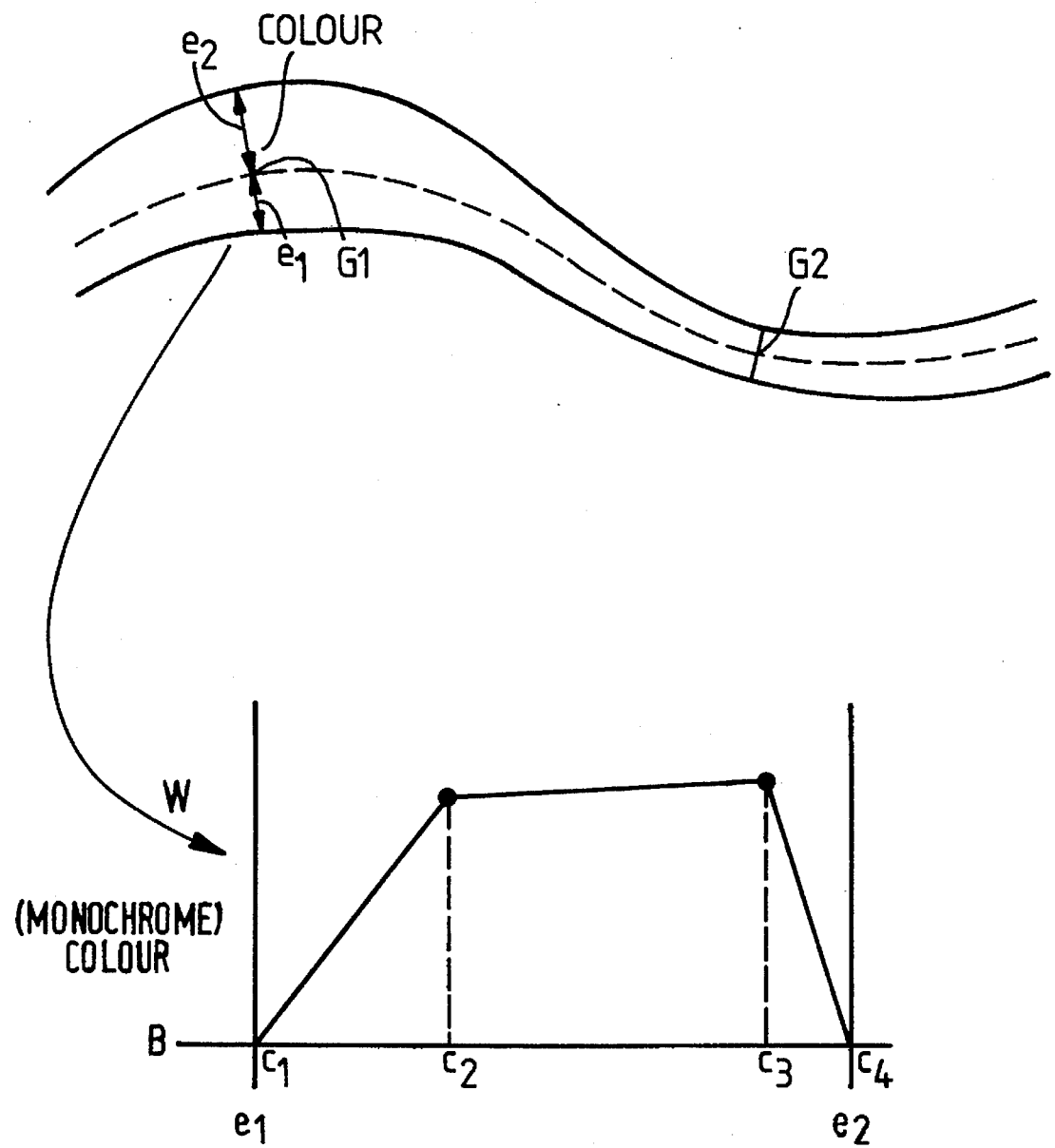
FIG. 11 illustrates schematically the representation of data specifying colour in the display of FIG. 3A.

Rather than storing colour data for each point along the section through the line, preferably the colour data stored comprises the colour value for each of a small number of points along the cross-section ($C_1$–$C_4$), and the image generating means 114 correspondingly generates the colour values at the intervening points by interpolation therebetween. Colour values are set at points $C_1$ and $C_4$ corresponding to the greatest lateral extents of the object a at a colour control point. The positions therebetween of the intervening points could be predetermined but are preferably selectable by the user, in which case an indication of the position along the cross-section between the two extents $e_1$,$e_2$ is stored with each value $C_2$,$C_3$. Preferably, the position data stored comprises a fraction of the distance between the two extents $e_1$,$e_2$. Thus, in this embodiment, if the extent data are changed (for example, to reduce the width of the line), the colour profile is automatically repositioned. For ease of understanding, the profile shown in FIG. 11 is on a monochrome scale from black to white; in general, colour value data are typically stored as a set of R, G, B values defining a colour by reference to primary colours.

Colour information specifying the variation in colour of the objects a,b is thus stored as a plurality of colour value data $C_1$–$C_4$, each associated with a lateral position transverse to the line A corresponding to that object at a colour control point $G_1$,$G_2$. The colour control points $G_1$,$G_2$ need not be co-located with the width control point; the extent data $e_1$,$e_2$ may be derived by the image generator 114 during image generation, by interpolation between width control points $F_1$,$F_2$.

The colour control point data associated with a given line are stored, in the same manner as the width control data, in the line table 122.

Opacity

Figure 12:
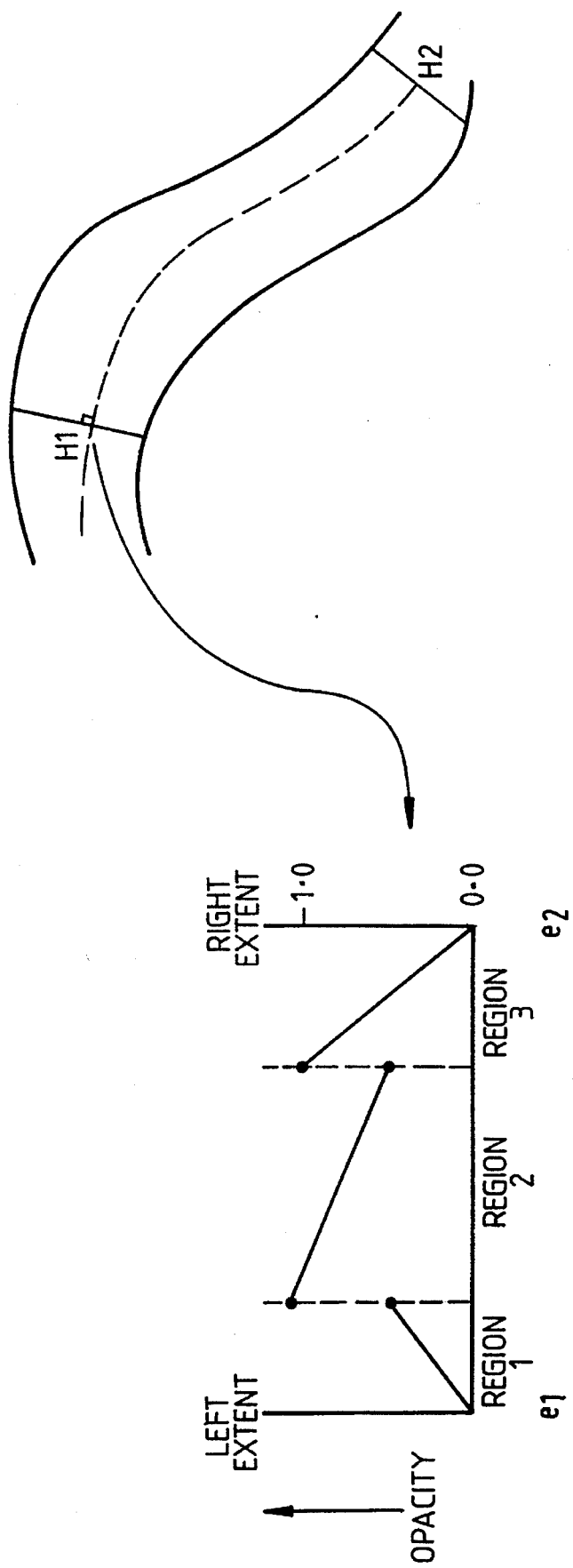
FIG. 12 illustrates schematically the arrangement of data representing opacity in the display of FIG. 3A.
Figure 13:
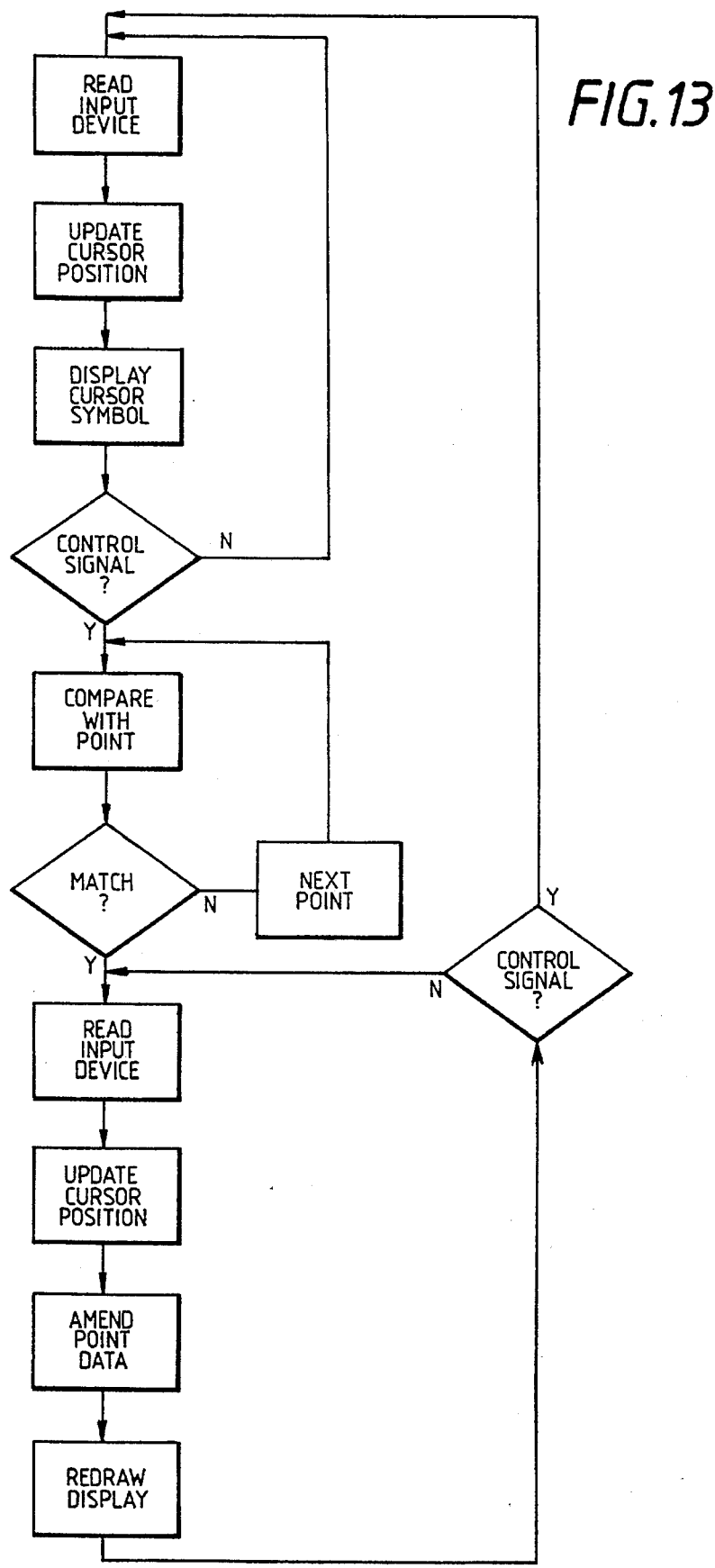
FIG. 13 illustrates schematically the process performed by the apparatus of FIG. 7 in editing the data shown in FIGS. 10–12.

Referring to FIG. 12, opacity or transparency data, specifying, as a fraction, the relative dependence of the colour of the object a on the colour data for the object a relative to the colour data for the background c, is likewise stored in the line table 122 corresponding to opacity control points $H_1$,$H_2$ in the same manner as described above for colour data, except that an opacity value is stored rather than a colour value. It is therefore possible to vary the degree of transparency of the object across its lateral extent, as well as along its length.

The image generator 114 is therefore arranged preferably to initially derive the extent of the object a at either side of the line A using the extent data, by interpolating between extent data values at extent control points, then to derive colour data values by interpolating across the line A and along the line A between colour control points, and to do likewise to derive transparency values, and finally to set the colours of image points stored in the generated image store 130a by reading the stored background colour, and forming for each image point the interpolated colour value multiplied by the interpolated opacity value, together with the background colour value multiplied by unity less the interpolated opacity value.

The process of setting and amending the values of the above attributes will now be discussed in greater detail.

Attribute Input and Editing

Referring to FIG. 8, to set up the attribute values for an object a to be displayed on the monitor 160, the user generates a control signal (typically by typing an appropriate command on the keyboard 170b, or by positioning the cursor symbol on a specified part of the screen of the monitor 160 and "clicking" a mouse input device 170a) indicating that an attribute is to be input or added to the object.

The user positions the cursor symbol at a point on the line A shown on the supervisory display and generates a further control signal (e.g by "clicking" the mouse 170a). The supervisory display editor 113 receives the cursor position from the cursor controller 112, and writes a corresponding attribute control point symbol into a corresponding position in the supervisory display image store 130b, which is consequently subsequently displayed on the monitor 160.

The stored cursor position indicating the position along the line at which the control point is placed by the user is then processed for storage in the attribute line data within the line table 122 in the memory 120. The cursor position is not directly stored since, if the user subsequently repositioned the line as discussed above, the attribute control point would no longer lie on the line. Instead, an indication of the relative position along the line, between its two neighbouring curve control points, is derived and this indication is stored so that the position of the attribute control point is defined relative to the position of the line, regardless of subsequent redefinitions of the line position.

This may be achieved, for example, by accessing the line table, reading the Bezier control point information, deriving therefrom the cubic spline equation 1 above and solving for a value t at the cursor X,Y coordinates if the cursor is not exactly on the line. The value of t at the closest point on the line is derived, for example to set $(x-x_i)^2+(y-y_i)^2$ to a minimum. The value of the parameter t is then stored as an entry in the attribute data within the line table 122.

The values of colour, width and opacity are initially set to a predetermined flag value (indicating to the supervisory display generator 111 that the attribute control point has no effect), and are then alterable by the user.

Preferably the alteration is incremental and graphically illustrated; for example, to set the extent at an attribute control point on either side of the line, the user moves the input device 170a so that the cursor controller 112 positions the cursor symbol at the control point, generates an appropriate control signal (by typing a command in the keyboard 170b) and thereafter causes the cursor symbol to move outwardly from the line A a desired distance to indicate the desired extent at that point.

The current cursor position is employed to calculate a line, normal to the line A, drawn from the attribute control point, to approximately track the cursor position. In this manner, the user may interactively increase or reduce the width of the object a by increasing or reducing the length of the displayed extent line by moving a control device 170a (for instance, a mouse). When the desired value is found, the user generates a further appropriate control signal (via the keyboard 170a).

The length e, of the extent line is then calculated by the supervisory display editor 113, for example by calculating the square root of the sum of squares of the differences in X and Y coordinates of the attribute control point and of the end of the extent line. This value is then written into the extent data stored in the line table 122.

The curvature of the extent can be readily amended by amending the extent tangent end point positions, using the device 170a as if editing a path tangent, and viewing the extent line on the monitor 160.

Colour and transparency data, when in the above described format, require the input both of positions along the extent lines at the control point and of colour or opacity values at those positions. Preferably, the positions are specified by placing the cursor symbol at the desired position along the displayed extent line and generating a control signal; the cursor position is converted to a fraction of the distance between the two extents at that attribute control point by the supervisory display editor 113, as discussed above, by calculating the ratio of the difference between X or Y coordinates of the cursor position and one such extent point, divided by the difference in X or Y coordinates between the two extent points. The position data is then written to the attribute data table 122. Colour or opacity numerical values at the selected points may for simplicity be typed in via the keyboard 170b.

Figure 14:
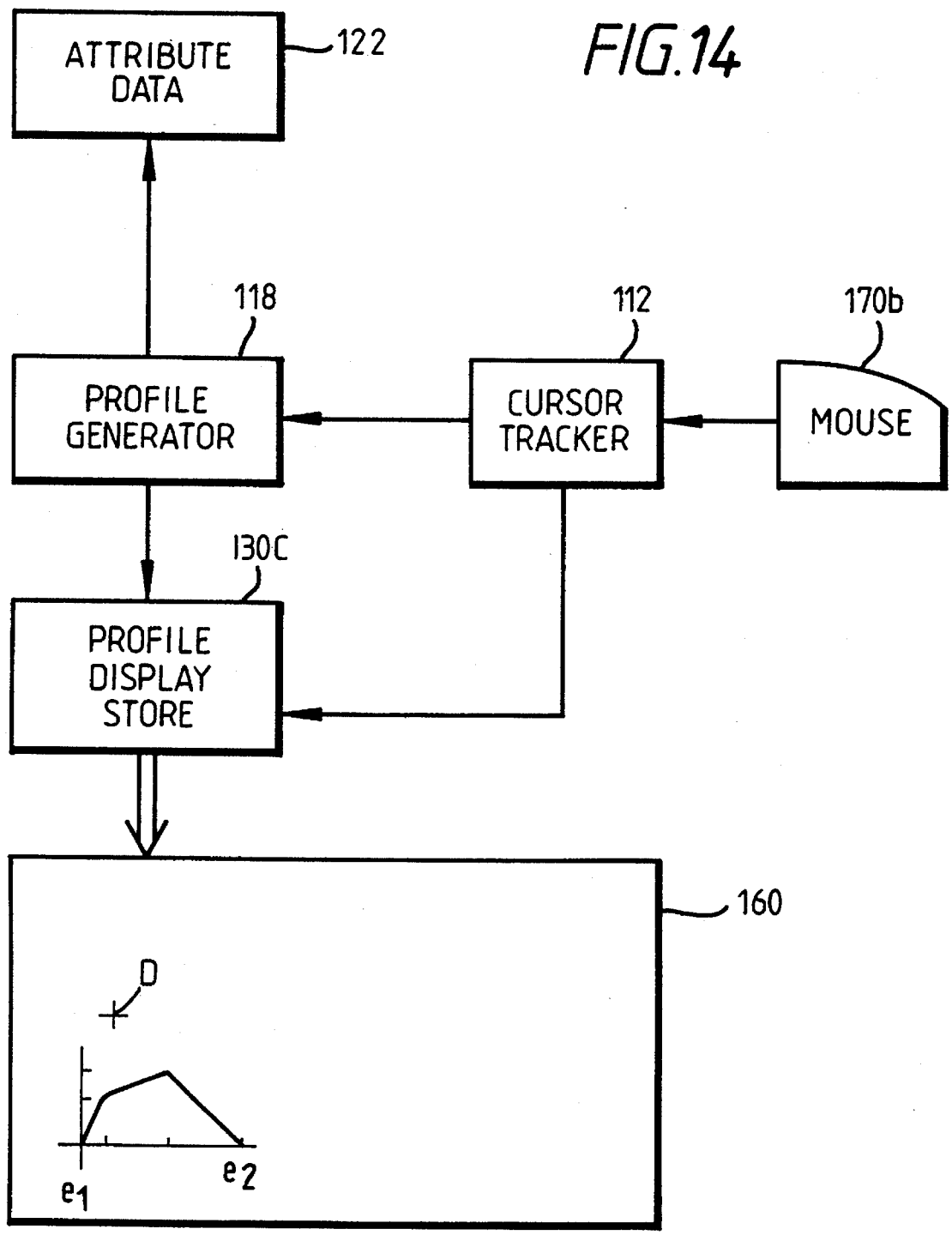
FIG. 14 shows schematically the arrangement of apparatus forming part of the apparatus for FIG. 1 for entering or editing the data represented in FIGS. 11 and 12.
Figure 15:
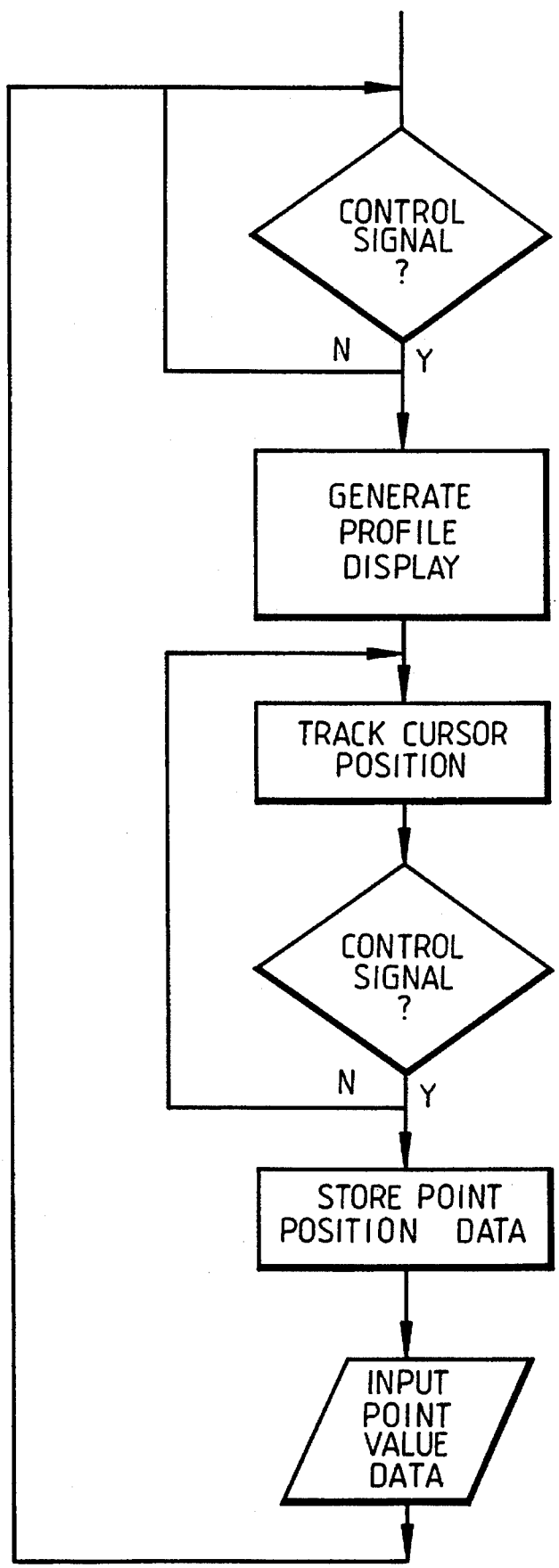
FIG. 15 shows schematically the process performed by the apparatus of FIG. 14.

Referring to FIGS. 14 and 15, an alternative and preferred method of inputting opacity data is illustrated. When the user generates a control signal indicating a desire to input opacity data, a profile generating means 118 (comprising, conveniently, the CPU 100 acting under stored program control) causes the display 160 to display the contents of a profile display store 130c (as, for example, a display "window" overlying the supervisory display). The contents of the profile display store 130c comprise image data defining a horizontal and vertical axes. The display represents the profile of opacity across the brush, corresponding to a cross-section along the line A. The horizontal axis represents position across the line A between the two lateral extents $e_1,e_2$. The vertical line represents opacity. Both axes are conveniently scaled between 0 and 1.

The cursor position controller 112 is arranged to write data into the profile display store 130c to cause the display of a cursor symbol D at a position therein defined by movements of the position sensitive input device 170b. By positioning the cursor symbol at a point between the axes, and generating a control signal, the user signals an opacity value at a given distance across the object a transverse to the line A. The corresponding position between the extents $e_1,e_2$ and opacity value thereat are derived by the profile generator 118 from the current cursor position supplied by the cursor tracker 112 and are written into the attribute data held within the line data store 122. The profile generator 118 likewise causes the generation, at the current cursor position, of a point symbol. The cursor may then be repositioned, but the point symbol remains. When two or more different point symbols are displayed and, correspondingly, two or more opacity data values and positions are stored within the line table 122, the profile generator 118 preferably calculates by interpolation, the coordinates of image data within the profile display store corresponding to intervening points along an interpolated line between the points for which opacity data is stored, and sets the value of those image points within the profile display store 130c, so that when displayed on the display device 160, so as to represent the profile which would be followed at that point. Generating a schematic cross-section display of this type is found to be of assistance to a user in visualising the transparency of, for example, an object corresponding to an airbrush stroke. The interpolation performed by the profile generator 118 is preferably the same as that which will be performed by the image generator 114.

To permit discontinuities in the colour or opacity across the extent of the object to be defined, preferably, the line table 122 is dimensioned to allow storage of two attribute values for each such lateral position $C_2,C_3$; as shown in FIG. 12, one value is used to perform interpolation to one neighbouring point and the other to the other neighbouring point.

A corresponding profile display could be provided to allow the input and amendment of other attributes; for instance, brightness (of a monochrome object) or colour (of a coloured object).

Preferably, predefined attribute data specifying width, colour profiles and opacity profiles are also stored on the mass storage device 180 corresponding, for example, to particular paintbrushes or airbrushes, or to particular previously defined objects. Rather than manually enter and edit the attribute control data, the user may enter an appropriate command (via the keyboard 170b) to read such predetermined data from the mass storage device 180 into the line data table 122.

Preferably, the data stored for each attribute control point can specify all, or only a subset of the available attributes;

for instance, it may be used to specify only width at a point, or only colour and opacity. Thus, the variations across the object a of these attributes may be separately controlled, and independently edited. In such a case, the default predetermined value assigned to each attribute is a flag indicating that the attribute is not set.

Image Generation

The process by which the image generator 114 generates or "renders" the image stored in the generated image store 130a from the attribute and line data held in the line table 122 in the memory 120 will now be discussed in greater detail.

A typical line is shown in FIG. 16, as it would be displayed upon the supervisory display on the monitor 160. The line A is terminated by a pair of points $A_1$, $A_4$ defining curvature and there are two further control points $A_2$, $A_3$, at intervening positions along the line to permit three points of inflexion. The points $A_2$ and $A_3$ each include tangent extent data defining two different stored tangent angles and magnitudes to permit the line to include discontinuities.

They thus act as two points $A_2a$, $A_2b$ and $A_3a$, $A_3b$ in controlling the path of the line.

Three extent or width control points $F_1$,$F_2$,$F_3$ are provided; width points $F_1$ and $F_3$ are co-located with the curve control points $A_1$ and $A_4$ and the width control point $F_2$ lies between the curve control points $A_2$ and $A_3$.

Colour control points $G_1$,$G_2$,$G_3$ are provided; $G_1$ is co-located with $A_1$ and $F_1$,$G_2$ lies between $A_2$ and $A_3$ and $G_3$ lies between $A_3$ and $A_4$.

Opacity control points $H_1$,$H_2$,$H_3$ are provided; $H_1$ is co-located with $A_1$ and $H_3$ with $A_4$, and $H_2$ lies between $A_2$ and $A_3$.

Although in this example attribute control points are located with the curve control points $A_1$,$A_2$ on the ends of the line, this is not in general necessary.

The data stored in the line table 122 for this line is shown in FIG. 17. In this table the curve control points $A_1$–$A_4$ are represented as in FIG. 4, and the attribute data is represented as defined at six attribute control points $P_1$–$P_6$. $P_1$ corresponds to colocated width, colour and opacity control points $F_1$, $G_1$, $H_1$. $P_2$ corresponds to colour control point $G_2$. $P_3$ corresponds to opacity control point $H_2$. $P_4$ corresponds to width control point $F_2$. $P_5$ corresponds to colour control point $G_3$. $P_6$ corresponds to width and opacity control point $F_3$, $H_3$.

At each attribute control point $P_1$–$P_6$, therefore, some attribute data are set and some (marked by "–") are not set. The width data comprises a pair of extent values $e_1$ $e_2$ and, for reasons discussed above, a corresponding pair of tangent end point values. The colour data comprises a list of colour values $C_1$,$C_2$,$C_3$ ... and corresponding parametric position values $X_1$,$X_2$,$X_3$ ... defining the position of the corresponding colour values as a fraction of the total length between the two extent values $e_1$,$e_2$ at that point.

The opacity data likewise comprises opacity values $O_1$,$O_2$, $O_3$ and corresponding position values $X_1$,$X_2$,$X_3$. A predetermined number of positional data could be stored (for example, three as shown), or the data could be stored as a list of variable length.

Figure 18:
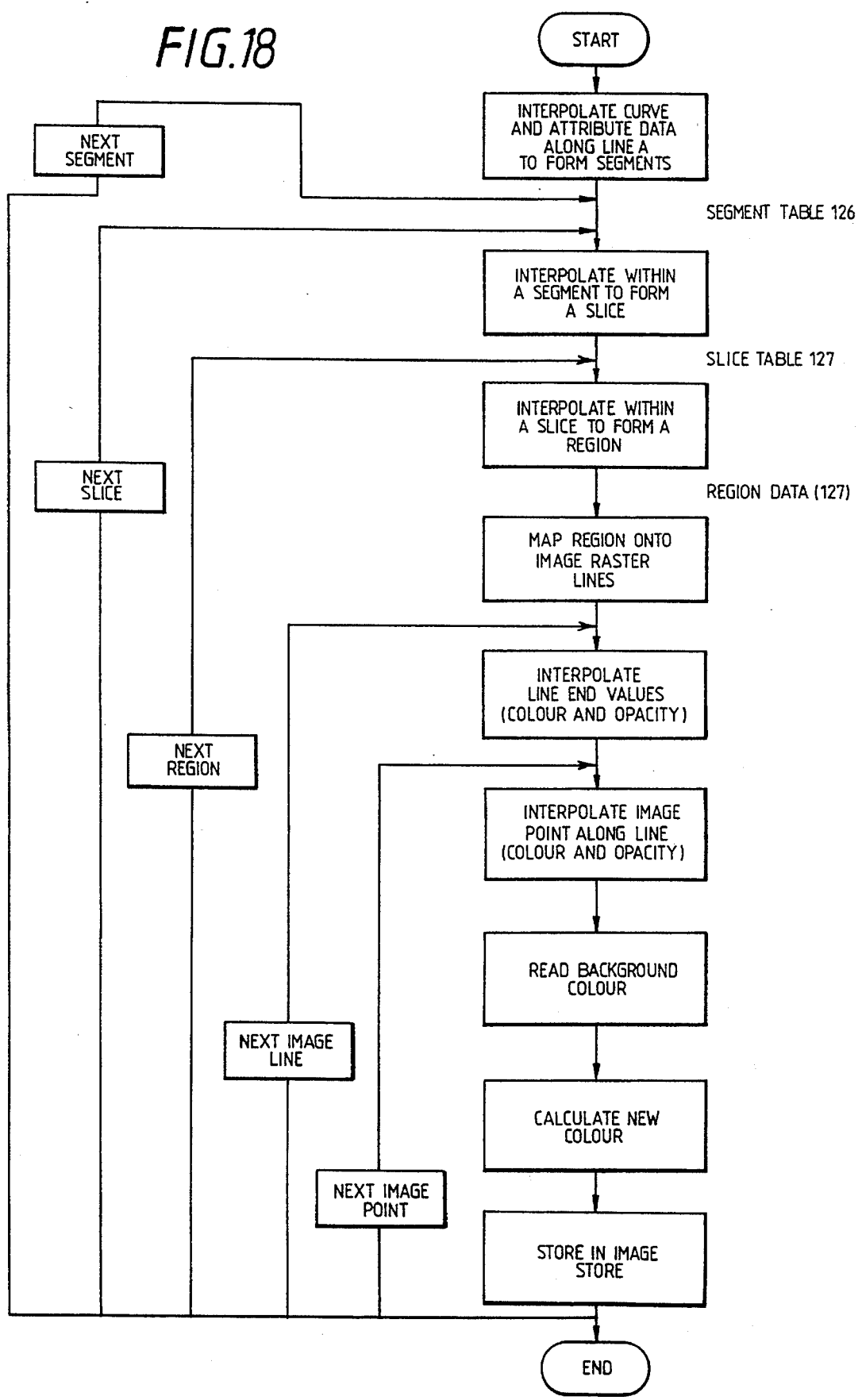
FIG. 18 shows schematically the flow of operation of the apparatus of FIG. 9.

Referring to FIG. 18, the first step performed by the image generator 114 when the image is to be generated in the generated image store 130a is to split the line A into a series of sections or segments, each bounded by a curve or attribute control point but not including any further such points, such that at the start and end of each section, the curve or path control data and/or the attribute data are known. It is convenient for this purpose to split the line at each of the curve control points $A_1$–$A_4$ and, where different, each of the attribute control points $G_2$,$H_2$,$F_2$,$G_3$.

Accordingly, at each path control point all attribute values must be derived and at each attribute control point path control values must be derived together with values for those attributes not set. A table 126 (shown in FIG. 19) is provided for storing data at each point. At the point $A_1$, all curve and attribute data is already available.

The first segment is defined between the point $A_1$ and the point $A_2$ (the tangent $A_2a$). The length of this section is determined and stored in a working store 125, by for example determining the positions of 20 points at equally spaced values of the curve parameter along the line, and deriving between each point and the next the linear distance by deriving the square root of the sum of the squares of the X,Y coordinate differences therebetween. The next section lies between point $A_2$ (tangent $A_2b$) and $G_2$. The path of the line between $A_2$ and $A_3$ is derived, in the form of equation 1 from the curve control points $A_2$ and $A_3$ (tangents $A_2b$ and $A_3a$), and the value of the parameter T and the point $G_2$ is substituted in to derive its X and Y coordinates. The constants a,b,c,d are then rederived to normalise the parameter values to run through 0 at $A_2$ to 1 at $G_2$, and these values are stored as curve data for that section.

The next curve segment lies between $G_2$ and $H_2$, and the constants a to d of the curve section between $A_2$ and $A_3$ are likewise rederived so as to normalise the parameter value between 0 at $G_2$ and 1 at $H_2$.

At this stage, therefore, the segment table 126 comprises a series of entries, one for each of the curve or attribute control points, each including data defining the curvature, position and all attributes of the object at that point.

Referring to FIGS. 20 and 21, the next step is to split each segment (defined by a pair of adjacent points in the table 126) into a plurality of slices along the line A. Each slice is processed in turn, to derive image data corresponding to the image area within the slice, and to write such image data into the generated image store 130a.

The number of slices within each segment is such that the curvature of the object over a slice is reasonably well approximated by a straight line. A predetermined number (for example, 20) of slices of equal length may be created, or the number of slices may be controlled in dependence upon the curvature of the segment (derived from the magnitude and angle of the tangents at the control points at either end of the segment).

Preferably, however, the length of each slice is individually calculated in turn so as not to deviate from a straight line by more than a predetermined amount. Thus, if the path and extents are relatively straight over a segment, relatively few slices are generated, considerably reducing the amount of processing to be performed where the curvature of a line is small. Where the extent values stored include tangent data, so that the extents are interpolated as curves rather than as straight lines, the curvature of the extents is preferably also taken into account in determining the length of slices. The maximum deviation from a straight line is preferably set in dependence upon the resolution of the image to be generated, and the hence the size of the generated image store 130a; preferably, the deviation is not more than one pixel width and where the image is to be represented in to antialised form, preferably less than half a pixel width.

Figure 38:
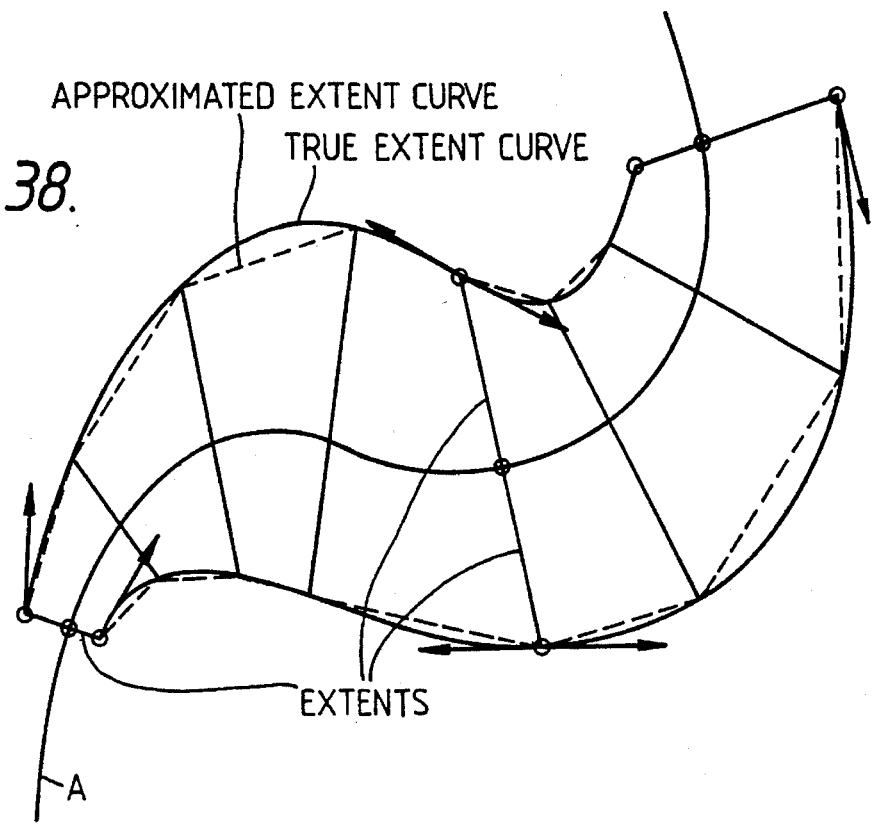
FIG. 38 corresponds to FIG. 20 and shows schematically the error due to approximation by straight line.

Referring to FIG. 38, the straight line approximation to the object defined relative to the path A is shown in dashed lines. The error is largest where the curvature of the line is largest. We have identified the following factors, in the above described embodiment, as giving rise to the error:

1. The curvature of the path A; the greater the curvature, the greater the error in approximating the path itself by a straight line.

2. The product of the curvature of the path and the distance of the extent from the path; even a relatively small path curvature can give rise to an error in approximating the extent when the extent is spaced away from the line.

3. The deviations of the extents themselves from straight lines, defined by the tangent values at the extents.

Figure 39:
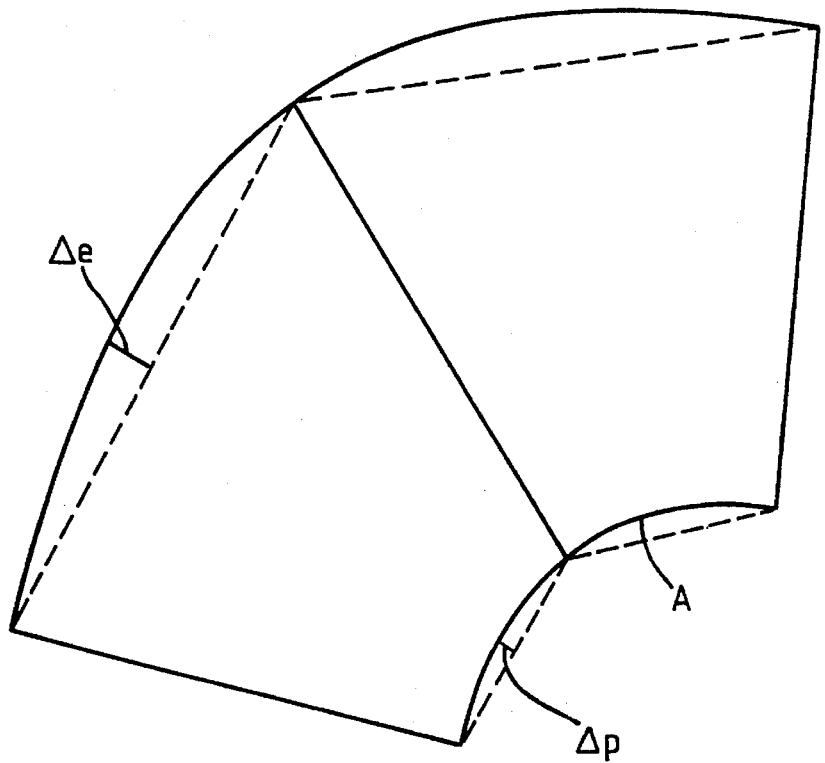
FIG. 39 shows in great detail a portion of FIG. 38.

Referring to FIG. 39, the error in approximating the path by a straight line is indicated as $\Delta_p$, and the error in approximating the extent or boundary by a straight line is shown as $\Delta_e$; the latter is larger due to the second identified factor above.

Figure 40:
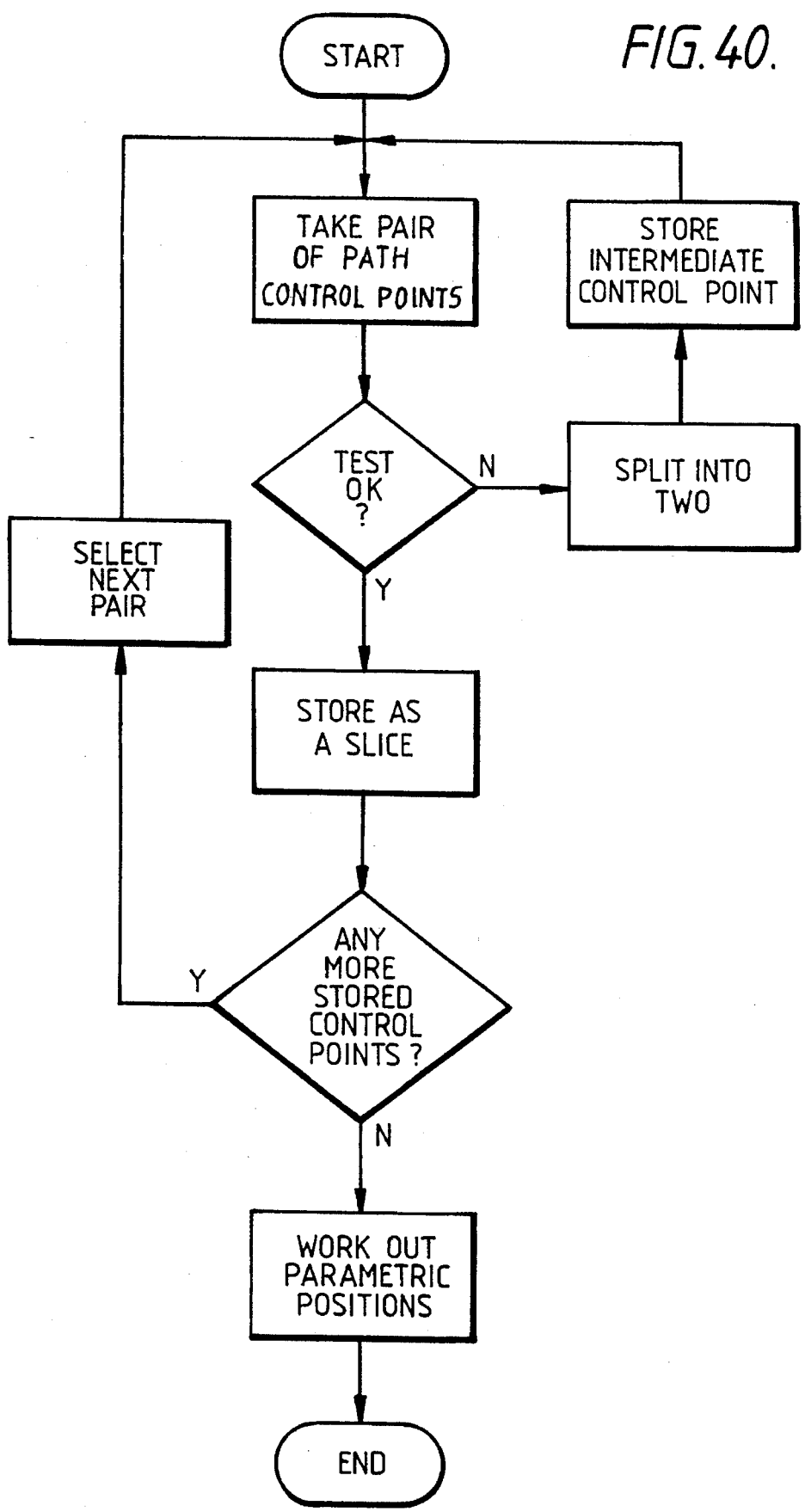
FIG. 40 is a flow diagram showing schematically the process of a portion of FIG. 18 in greater detail.

One possible method for splitting a segment into slices will now be described. Referring to FIG. 40, the process comprises starting with a pair of points on the path A (initially the ends of the segment), testing whether the error between an approximated outline and the true outline of the object would be acceptable if the path between those two points were treated as a slice, and, if so, storing those two points as representing a slice.

If the error in taking the path between those two points as a slice would be unacceptable, on the other hand, the path is split into two by finding the path control data (i.e. the point coordinates and tangent data) for an additional path control point lying between the first two. The additional control point data are temporarily stored.

Next, a first half of the path from one of the original points to the newly derived intermediate path is taken, and the test is repeated. If the test is still not satisfied, that half of the path is then again split into two, and the intermediate control point data derived and temporarily stored, and the process continues thus in a recursive fashion until a curve slice is found which is sufficiently short that it meets the error criterion.

At this point, the intermediate stored control point at the end of the newly found slice is stored together with the original segment end point to define the slice. Then, the neighbouring portion of the path which is defined by the same intermediate control point (i.e. the "other half" portion to that just selected as a slice) is selected as the next portion of the path to be tested.

If this portion of the path does not meet the test, it is split as previously until a portion of the path which does meet the test is derived.

If, on the other hand, it does meet the test, its end points are stored to define the next slice of the path and the neighbouring portion (next "other half") of the path defined by the newly stored control point is selected.

The process of FIG. 40 thus proceeds to recursively divide the path within a segment into slices, from one end of the segment working towards the other. This process of splitting into halves is found to be computationally effective because previously calculated and stored intermediate control point values are re-used as the process works along the segment.

Once the positions of the end points of all the slices have been derived, the parametric positions of the end points along the segment are calculated for subsequent use as described below.

Figure 41:
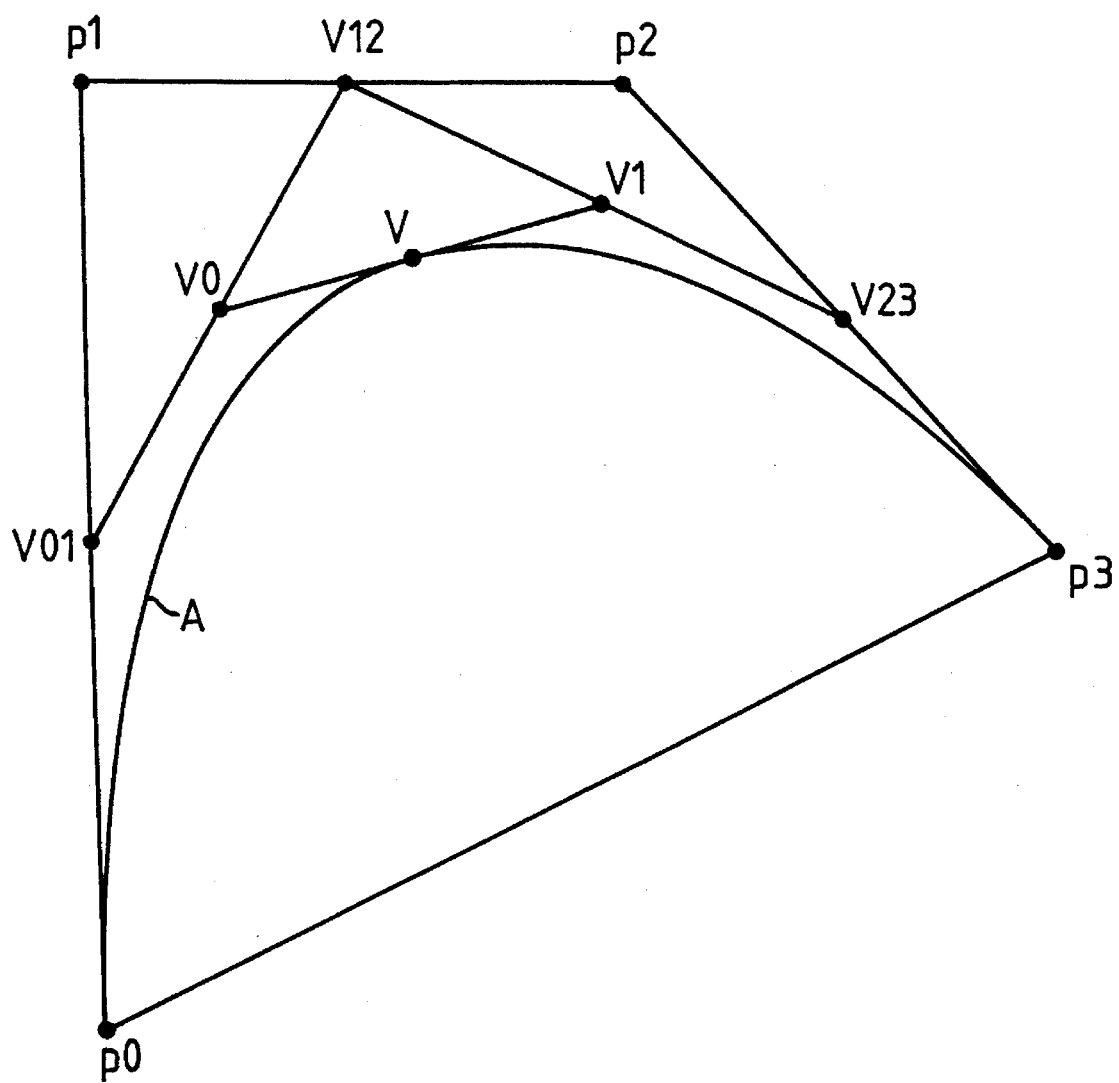
FIG. 41 illustrates a step of splitting a curve within FIG. 40.

Referring to FIG. 41, the process of splitting a portion of the path A into two and deriving intermediate control point data will now be discussed in greater detail.

If $P_0$ and $P_3$ are the control points at the end of a segment of the line A and $P_1$ and $P_2$ are the Bezier control points which define the tangent end position (which, as discussed above, occur at a distance ⅓ the length of the true tangent vector ), the desired intermediate control point is located by firstly deriving the value, S, of the control parameter at the split point as:

$$S=(|P_1-P_0|+0.5|P_2-P_1|)/(|P_1-P_0|+|P_2-p_1|+|P_3-P_2|)$$

where $|P_1-P_0|$, for example, indicates the length between the points.

Having found the scalar value, S, the coordinates of the intermediate control point V are derived as follows (referring to FIG. 41):

$$V_{01}=P_0+S(P_1-P_0)$$

$$V_{12}=P_1+S(P_2-P_1)$$

$$V_{23}=P_2+S(P_3-P_2)$$

$$V_0=V_{01}+S(V_{12}-V_{01})$$

$$V_1=V_{12}+S(V_{23}-V_{12})$$

$$V=V0+S(V_1-V_0)$$

where all V and P above are vectors ($V_x$, $V_y$, $V_z$).

Figure 42:
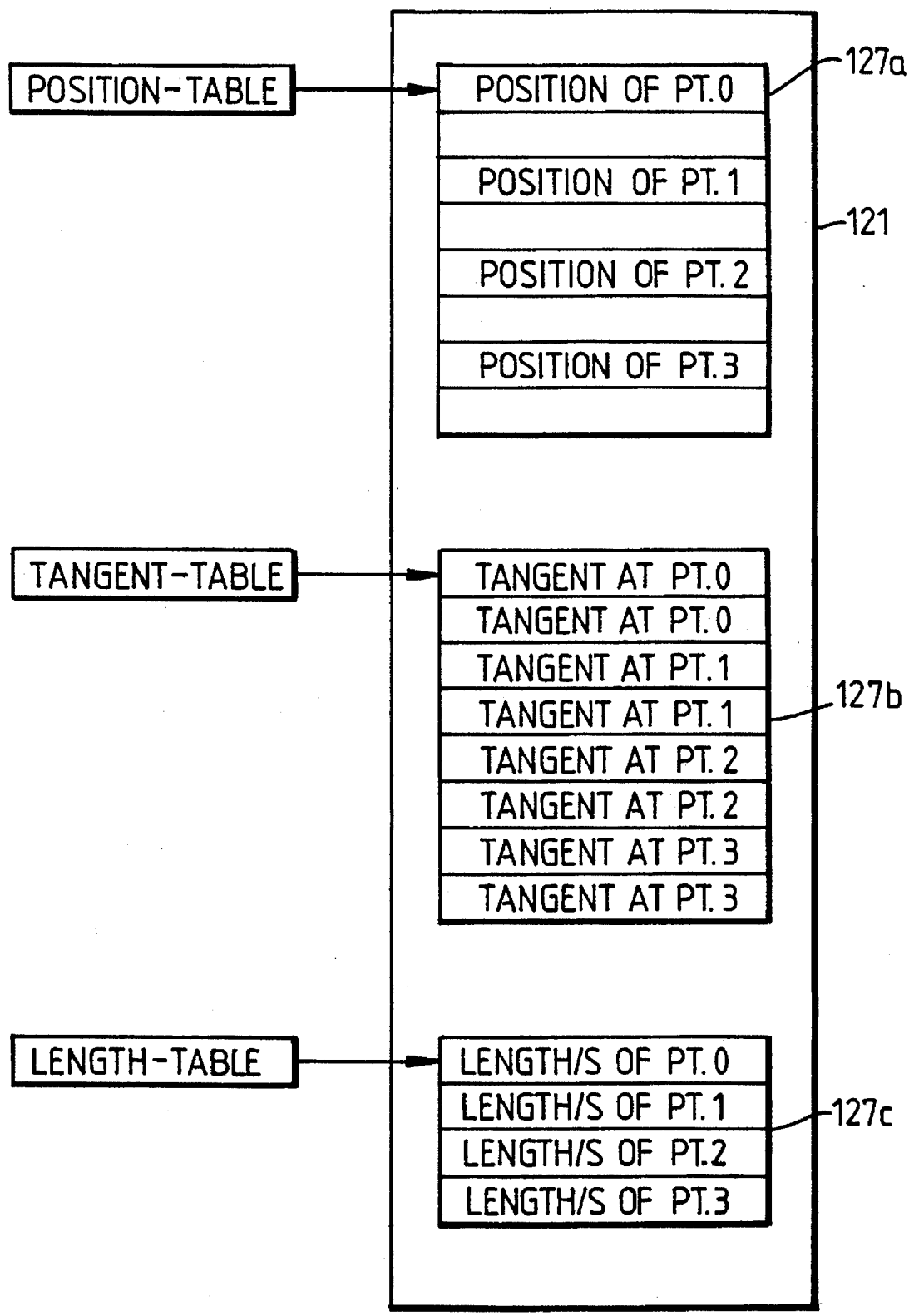
FIG. 42 illustrates schematically the arrangement of data within the memory of FIG. 1 produced during a process of FIG. 40.

The path A is now described by three path control points at $P_0$, V and $P_3$. The first slice is described by the points $P_0$ and V and the tangent end points $V_{01}$ and $V_0$, and the second slice is defined by the points V and $P_3$ and the tangent end points $V_1$ and $V_{23}$. Referring to FIG. 42, within the working memory 121, during the process of FIG. 40 three tables 127A–C are provided; the first table 127A holds the X and Y coordinates of the points $P_0$, V, $P_3$ along the path A, a second 127B holds the corresponding coordinates of the two tangents at each point, and a third 127C holds the length of the line segments to each point from its predecessor.

On deriving a new intermediate path control point, it is therefore necessary to insert a new point into the point position table 127A, a corresponding pair of tangent values into the tangent table 127B, and to amend one tangent value for each of the neighbouring points in the tangent table 127B.

Referring once more to FIG. 40, the process of deriving the parametric positions along the path A of the control points will now be discussed in greater detail.

In a first step, each length value in the length table 127C is read in turn, and a total of all the lengths is accumulated.

In a second stage, each length in the table 126C is again read, divided by the total accumulated length and the resulting fraction between 0 and 1 is re-stored in the corresponding entry in the table 127C.

Figure 43A:
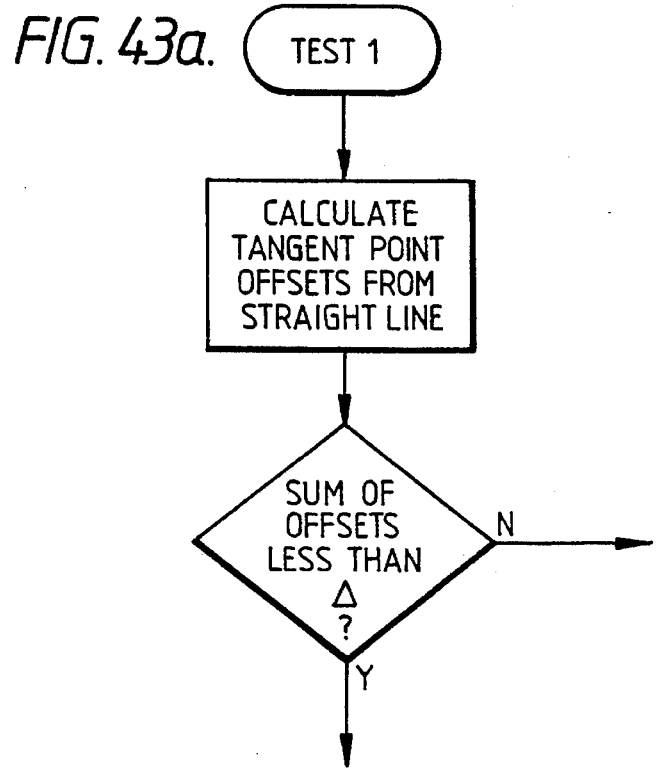
FIGS. 43A–C are flow diagrams showing alternative tests for use in the process of FIG. 40.
Figure 44:
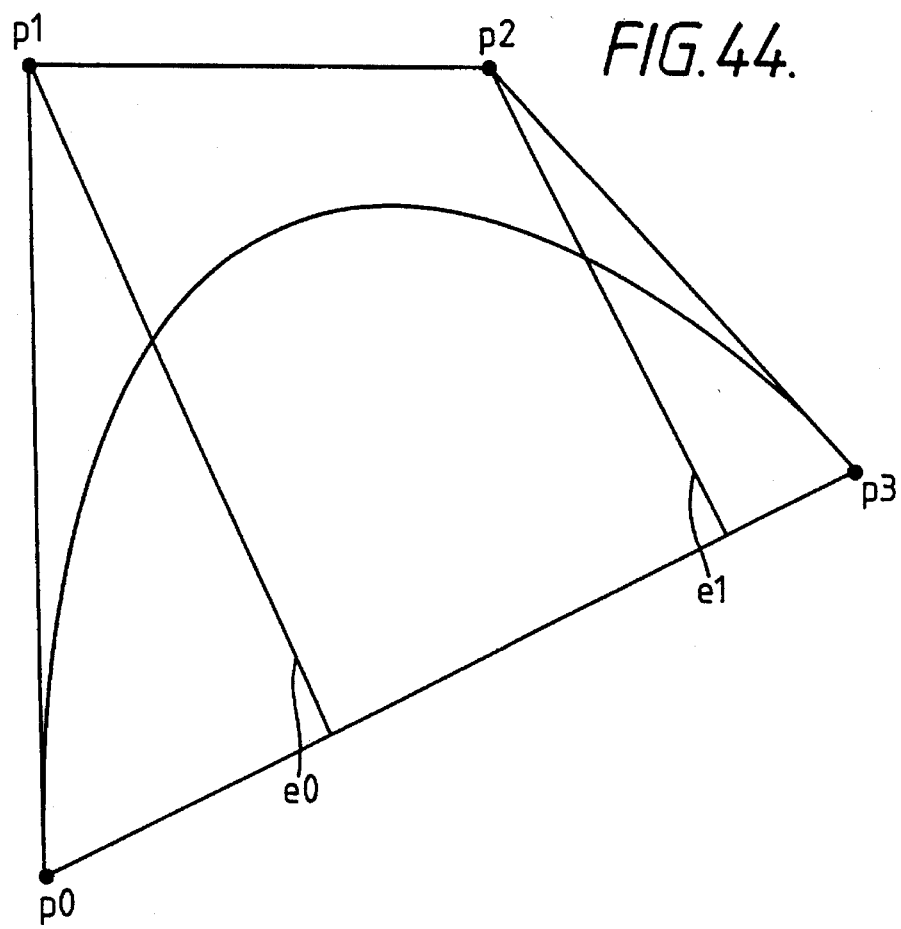
FIG. 44 illustrates the test of FIG. 43A.
Figure 45:
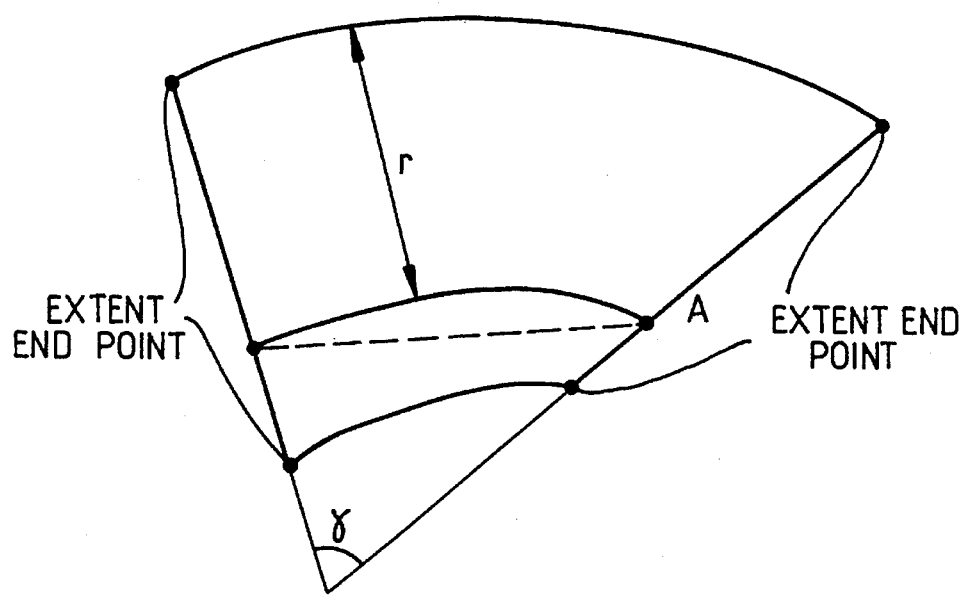
FIG. 45 illustrates the test of FIG. 43B.

Referring to FIGS. 43A and 44, a first test within the process of FIG. 40 is arranged to determine the error due to the curvature of the path in approximating the path by a straight line segment. This test makes use of the property of the Bezier description of a cubic spline that the curved segment defined by a pair of control points and associated tangent end points $P_0$–$P_3$ lies wholly within the bounding box defined by those four coordinates. The maximum error due to approximating the curve segment by the line $P_0$–$P_3$ is therefore less than the distance from the further of $P_1$ or $P_2$ from the line $P_0$–$P_3$. This distance can accordingly be used as an estimate (actually, an overestimate) of the error due to approximating the curve by the line segment. In fact, we have found that the visibility of the error is particularly large when both points $P_1$ and $P_2$ are spaced at a substantial distance from the line $P_0$–$P_3$ (in other words, that both the tangents to the line segment are long). Accordingly, we prefer to use as an error measurement the sum of the two distances $e_0$ and $e_1$ shown in FIG. 44. The lengths $e_0$ and $e_1$ are found from simple geometry using the coordinates of the four points $P_0$–$P_3$.

As shown in FIG. 43A, the test merely comprises deriving $e_0$ plus $e_1$ from the data stored in the tables 127A and 127B, and comparing this with a predetermined error threshold $\Delta$ corresponding to a predetermined proportion of one pixel width.

Figure 43B:
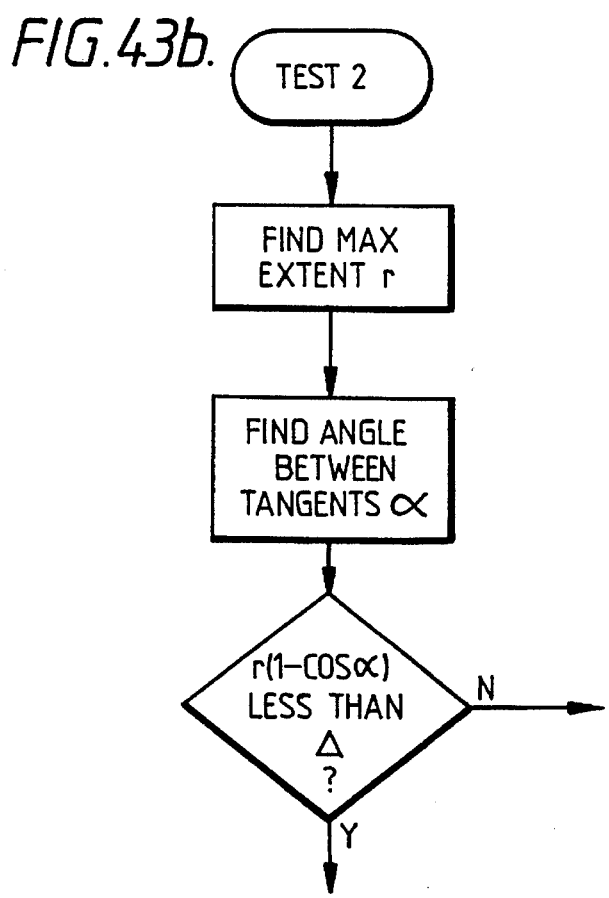

Referring to FIGS. 43B and 39, a second test measures the error in approximating the curve between two extent points by a straight line segment due to the curvature of the path. This error arises from the curvature of the extent line, which itself is defined by the curvature of the path and the lengths of the extents, at either end of the slice. The curvature of the path is represented by the angle subtended between the normals to the tangents at the path control points at either end of the slice. This angle $\alpha$ is the same as the angle subtended between the tangents themselves, and is derived by calculating the tangent values from the X and Y coordinate differences between the curve control point and tangent end point in each case.

The maximum extent value is found, separately, for each of the extents on either side of the path, as shown in FIG. 39. Since, in the above described embodiment, the extents on either side of the path are defined not only by extent position values but also by extent tangent data, the value of the extent (i.e the spacing from the path) can rise to a maximum in between the two values at which it is defined at either side of the slice. Accordingly, the maximum extent value at either side of the path is found by the following steps:

1. The extent values at either end of the slice are found, by solving the cubic equation defining the extent curve from the extent values at either end of the segment, using the value of the parametric length held in the table 127C for the slice in question.

2. Any maxima between the two slice end points are located by solving the differential of the extent cubic equation.

3. The extent values at each maximum or minimum thus found are compared, together with the extent beginning and end point values, and the largest of these is taken as the maximum extent point value.

To check the error, a value $\Delta_e$ is derived as $\Delta_e = r(1-\cos\alpha)$, where r is the maximum extent value thus derived and $\alpha$ is the angular difference subtended between the tangents as described above.

As shown in FIG. 43B, if the error $\Delta_e$ thus derived is smaller than the predetermined error $\Delta$, the test is satisfied; if not, referring to FIG. 40, the path is split once more and the test is repeated on a first slice thereof.

Figure 43C:
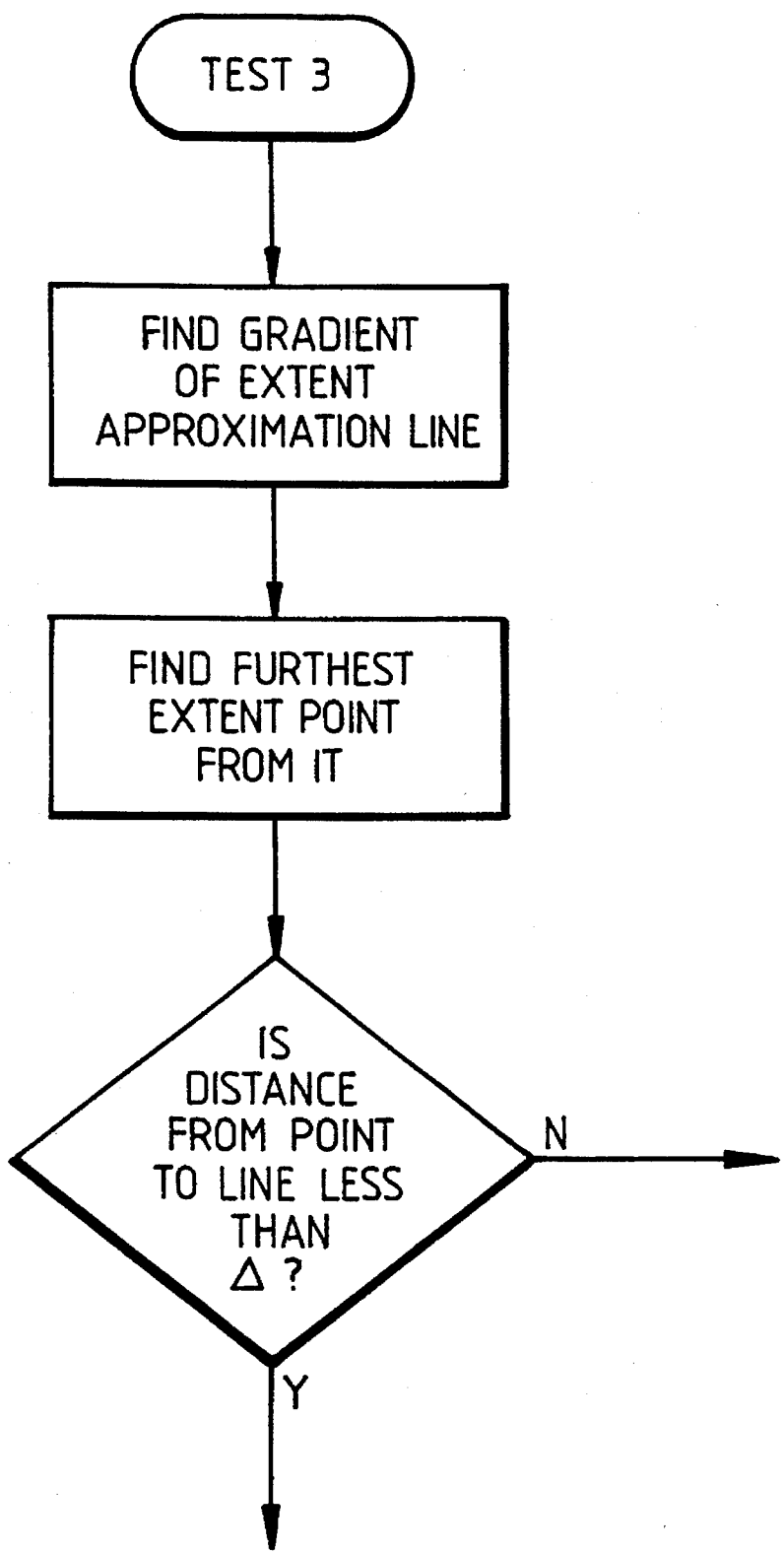

Refering to FIG. 43C, in a third test, the error in approximating the extent curves by a line parallel to the path is tested; this error arises since in this embodiment the extents are defined as Bezier curves.

Figures 46, 48:
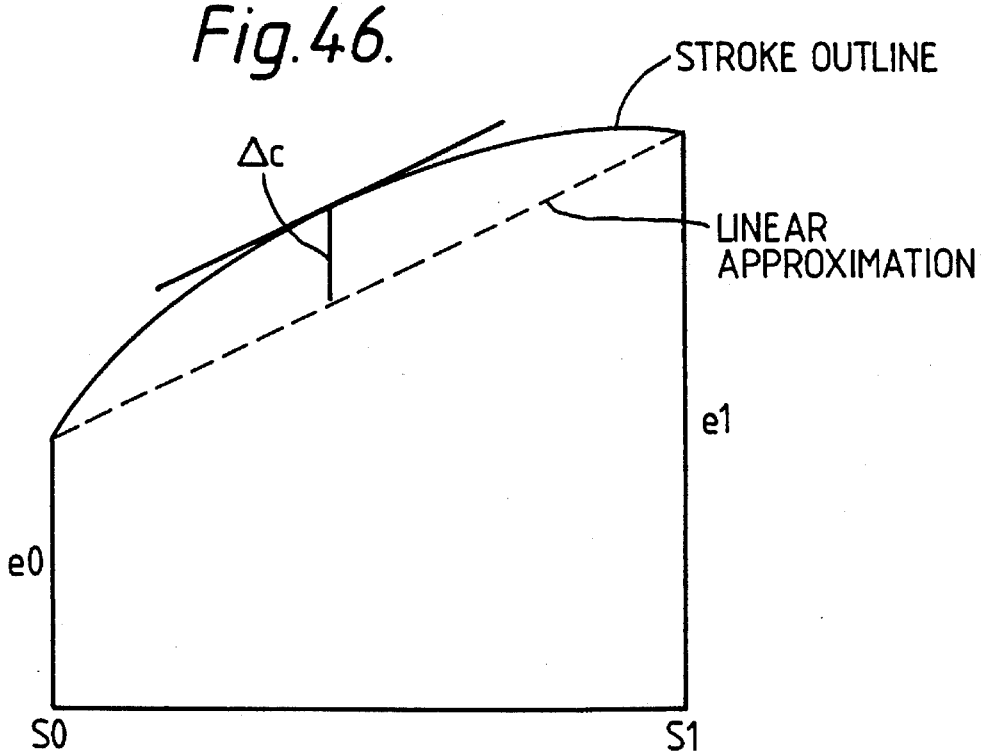
FIG. 46 illustrates schematically the test of FIG. 43C.
FIG. 48 illustrates schematically the arrangement of data within the memory of FIG. 1 for defining a matte or mask image.

Referring to FIG. 46, in which the parametric distance along the path is shown as the abcissa, if the extent along the path were generated by linear interpolation between the two extent end point values $e_0$ and $e_1$ at either end of the slice, the resulting linear approximation is shown in FIG. 46 as a dashed line. The true variation of the extent along the path is shown as a solid line. It will be seen that the point at which the difference between the two is greatest is where the gradient of the true extent curve is parallel to that of the linear approximation. Accordingly, the equation of the extent variation is $e(S)=a\, S^3+b\, S^2+c\, S+d$, and its gradient is $e'(S)=3aS^2+2b\, S+c$. The gradient of the approximation is $g=(e_1-e_0)/(S_1-S_0)$ where $e_0$=extent length at start of curve
$e_1$=extent length at end of curve
$S_0$=parametric position of start of curve
$S_1$=parametric position at end of curve and the parametric positions of the maximum error is therefore found by solving $g=3a+2b\, S+c$ for S.

A measure of the error is then given by $\Delta_c=|(e0+(S-S0)g)-e(S)|$; it should be noted that this measure generally overestimates the true error, since it is not the shortest distance between the tangent and the approximation line, but this is acceptable since it will always tend to produce a smooth result. Alternatively, the true error (shortest distance) could be derived, by simple geometry, although this calculation is slightly more complex and hence slower.

As previously, if this measure of the error exceeds the predetermined error $\Delta$, the path is once more split and the test is repeated on a slice thereof.

Figure 47:
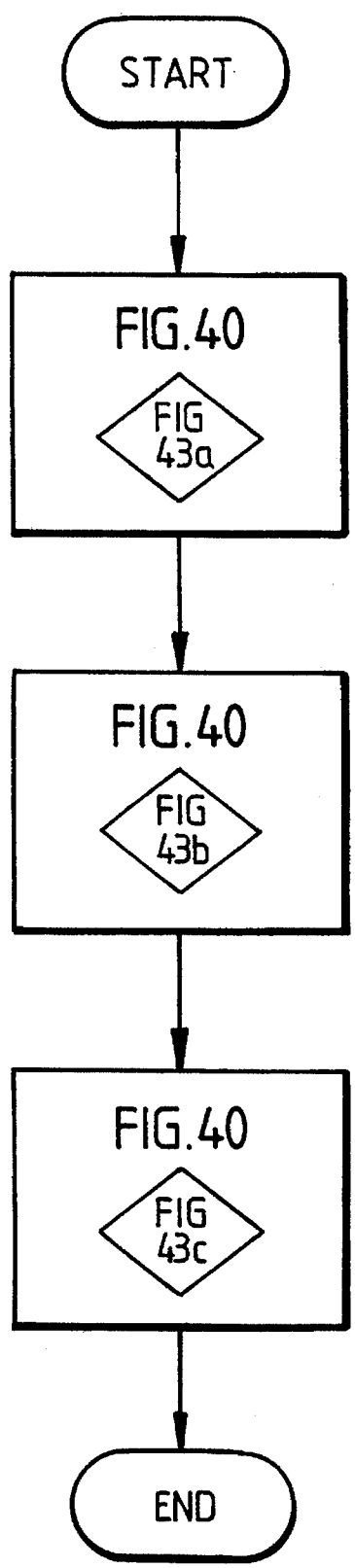
FIG. 47 is a flow diagram indicating schematically the manner in which the processes of FIGS. 40 and 43A–C are combined.

Referring back to FIG. 40, the "test" box may include the three tests of FIGS. 43A–C in succession, but we prefer instead to provide, as shown in FIG. 47, that the process of FIG. 40 is executed sequentially three times, using the tests of FIGS. 43A–C in turn. Once the computer 100 has completed the process of FIG. 47, the next step is to determine, at each slice, the position of the four vertices marking the two extents of the width at each end of the slice. This is achieved for each successive slice by finding, as above, the value of the parameter, t, at each end of the slice from the table 127C; deriving the position of the end of the slice along line A from the table 127A, and the tangents at that point from the table 127B, interpolating the width at that point by interpolation between the values at the two control points defining the segment, as a pair of extent values, deriving the positions of the extents of the widths by calculating the ends of a straight line normal to the tangent to the curve, and storing these coordinates.

The colour and opacity data in the table 126 are likewise interpolated to derive position and value data for points along the extent lines bounding the slice.

Referring to FIG. 21, the slice is therefore subdivided into a number of quadrilateral regions defined by four points at the vertices thereof, each point being defined by X,Y coordinates and, at each point, values of colour and opacity being defined. The image data to be stored in the generated image store 130a may now be calculated by linear interpolation from this data.

Figure 22:
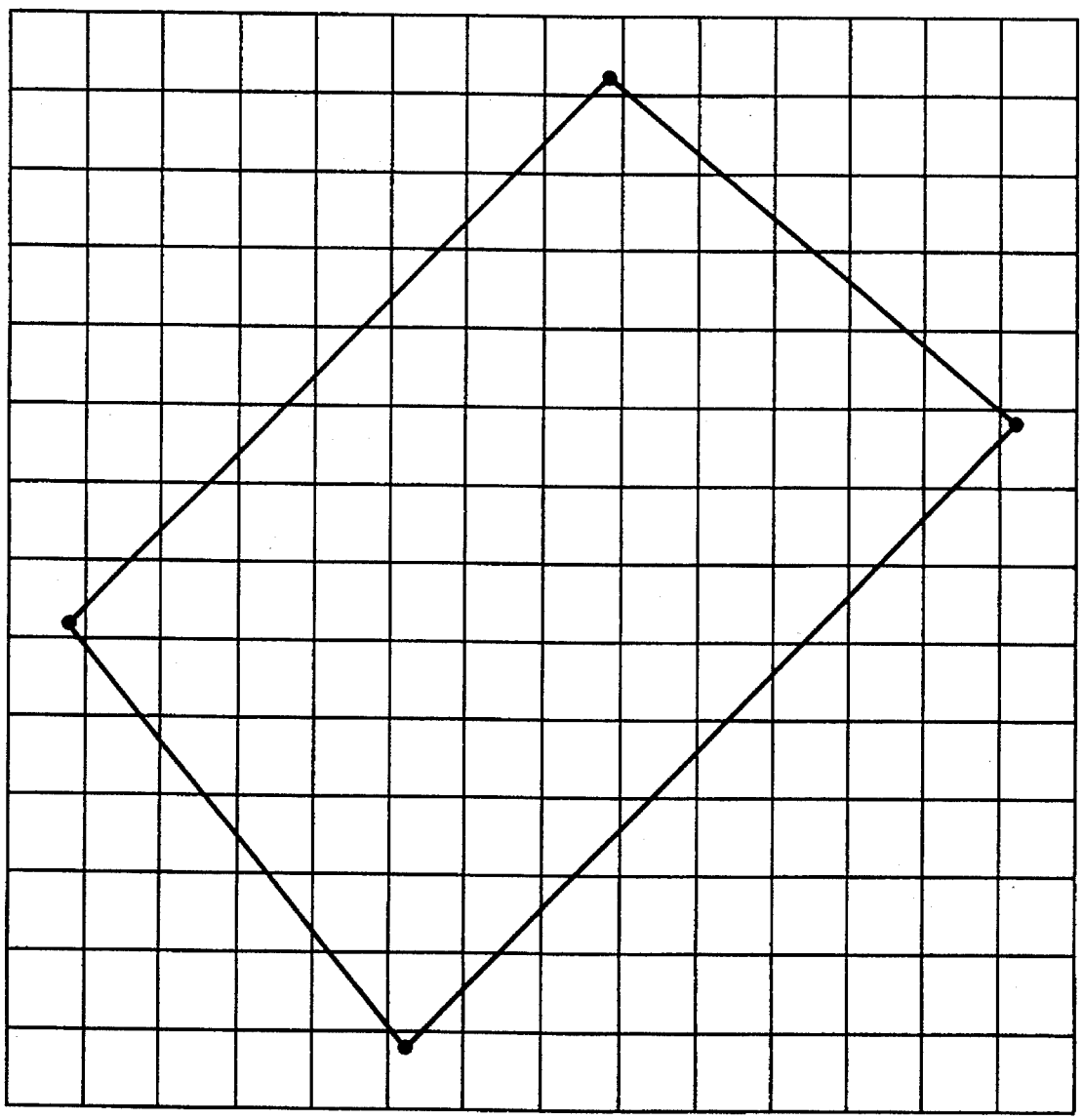
FIG. 22 shows schematically the relation between points held in the table of FIG. 21 and image points stored within the generated image frame store of FIG. 2.

Referring to FIG. 22, each quadrilateral region is therefore mapped onto a matrix of image points, depending upon the resolution of the image store 130a. The x,y co-ordinates of the corners of the quadrilateral are therefore calculated in units of the matrix of image points (but remain in higher precision, retaining their fractional part).

The interpolation is then performed, line by line of image points, by calculating the colour and opacity values at positions along the quadrilateral edge corresponding vertically to the ends of each line by linear interpolation between the two corner points values at the ends of the edge, and then calculating interpolated colour and opacity values at each image point along the line from the line end values. The calculated colour value is multiplied by the calculated opacity value. The colour value stored in the image store 130a is then read and multiplied by unity less the opacity value, and added to the above calculated colour multiplied by opacity value. The sum is then written back into the generated image store 130a.

The image points through which the edges of the quadrilateral pass do not lie wholly within the quadrilateral. They likewise do not lie wholly within neighbouring quadrilaterals. Preferably, for each such image point along the edges of a quadrilateral, a measure of the proportion of the area of the image point which lies within the quadrilateral is taken. The image point is then assigned a colour which depends upon the calculated colour for that area multiplied by the proportion of the image point lying within the quadrilateral, so that if the image point forms part of two neighbouring quadrilaterals its final colour depends upon those calculated for each quadrilateral in the ratio of the area of the image point which lies within each.

To avoid the appearance of a jagged, or rastered, line at the quadrilateral edges, well known anti-aliasing techniques may be adopted, for example, similar to the "A buffer" technique described in "The A Buffer, An Anti-Aliased Hidden Surface Method", L Carpenter, Computer Graphics (SIGGRAPH 1984), Vol 18 3 (July 1984), p103–108, but not employing the hidden line removal feature of that technique.

More information on suitable methods of rendering image areas defined by quadrilaterals, in the above manner, will be found in "Procedural Elements For Computer Graphics", David F Rogers, published by McGraw Hill, ISBN 0-07-053534-5, at pages 70–73.

After all image data line across the quadrilateral region have been written into the store 130a, the next line is processed in the same manner. After all the lines of a region have been written into the image store 130a, the next region within the slice is interpolated in the same manner. After all the regions of a slice have been processed, the coordinates of the next slice are calculated and placed in the slice table 127 to replace those for the existing slice. After all the slices for one segment are processed the next segment in the segment table 126 is processed. After all the segments in the segment table 126 have been processed, the representation of the object a in the generated image table 130a is complete.

Figure 23:
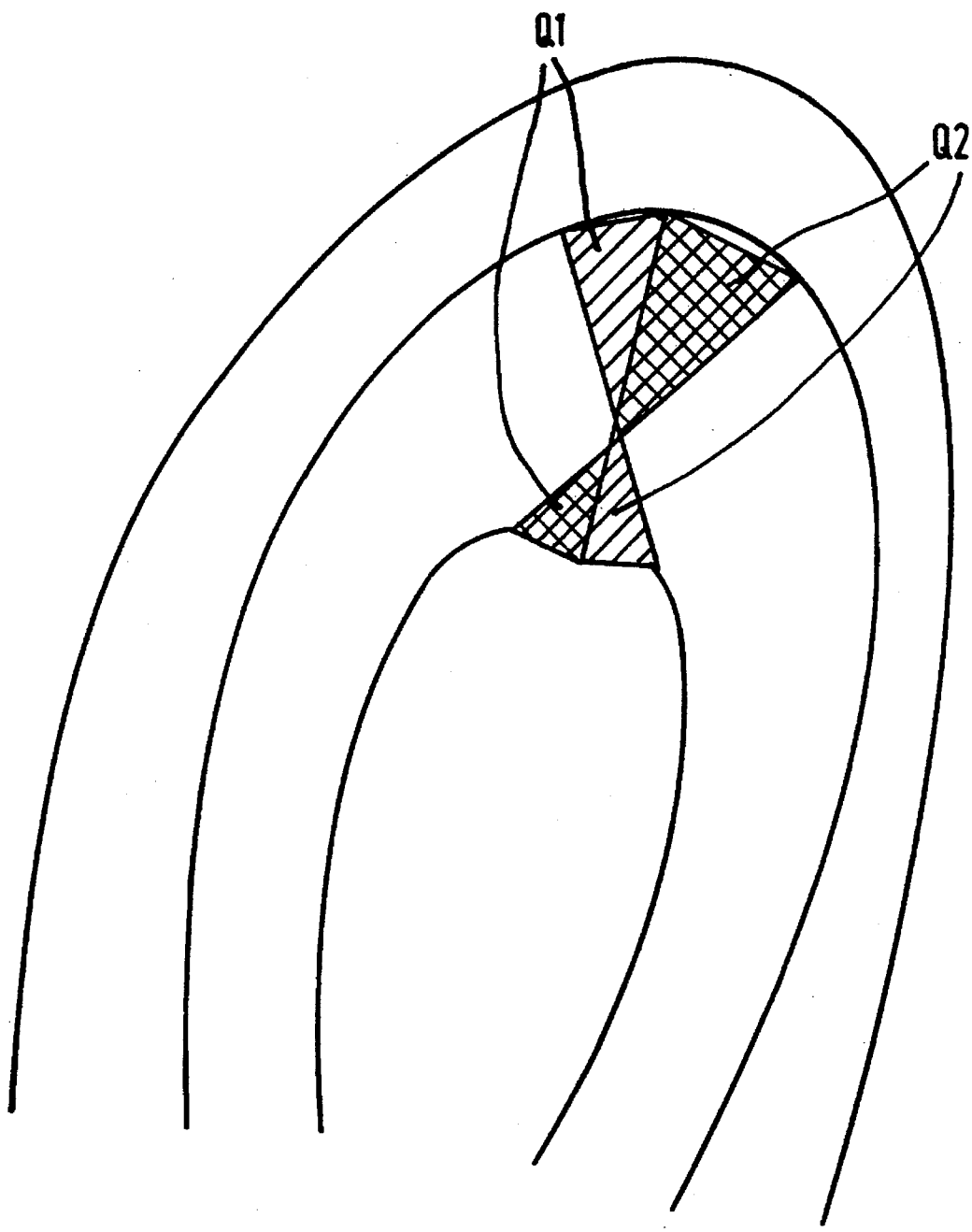
FIG. 23 shows schematically a problem encountered during the process of FIG. 18.

Referring to FIG. 23, when the curvature of the path is particularly sharp, relative to its width, a problem can occur; a similar problem is referred to as "the annoying bow-tie case" in the above referenced Strassman article. Essentially, rather than defining a quadrilateral a "bowtie" or figure of eight may occur. A consequence is that certain image points stored within the generated image store 130a are accessed twice by the image generator 114, in relation to different quadrilaterals $Q_1, Q_2$. This can lead to a noticeable discontinuity, particularly if one or both quadrilaterals have a degree of transparency, as the background colour is then doubly attenuated. Whilst this problem is generally not critical one way of reducing the effect of the problem would be to provide a further store storing data defining the background colour, and to provide that where transparency is specified, rather than reading the existing image point data in the frame store 130a and employing this as background colour data, the stored background colour data is employed instead. This would have the effect of making the object "opaque" to itself, but "transparent" to the stored background.

In an alternative method, an intermediate image store or image buffer is provided and the image generator 114 is arranged to calculate, as above, the interpolated colour and opacity values at each image point along each line of each quadrilateral. However, instead of calculating a final image point colour value based on both interpolated data and a background value, the interpolated colour and transparency values are instead stored in the image buffer for each point in the quadrilateral. Where a given image point in the image buffer is written to by two quadrilaterals one after the other, the later simply overwrites the earlier so that the stored data relates to the later written quadrilateral.

When the generation of the object is complete, the image generator 114 then merges the image from the buffer into the generated image store 130a, by setting the values of colour and opacity in the generated image store 130a as follows:

Colour and opacity values $C_1, O_1$ from the image buffer for an image point are read and colour and opacity values for the corresponding image point in the generated image store 130a ($C_2, O_2$) are likewise read. The new values of colour and opacity for that point to be stored in the image store 130a are calculated as follows:

$$C = C_1 O_1 + C_2(1 - O_1);$$

$$O = O_1 + O_2 - (O_1 O_2)$$

These values are written back into the generated image store 130a, and then the next image point in the image buffer is correspondingly processed.

Using this method, a given object is transparent to others but opaque to itself.

Where the invention is practiced upon general purpose digital processing apparatus, such as a microcomputer, rather than on dedicated image processing apparatus, this process is inevitably time consuming and preferably, therefore, the image generator 114 is operable thus to generate or amend the image in the generated image store 130a only on receipt of a control signal from the user, generated for example by pressing a key marked "RENDER" on the keyboard 170b. The image generator may be arranged to be capable of performing in two or more different modes; for example lower and higher resolution, or with and without anti-aliasing, to give a choice of speeds.

Referring to FIGS. 24, 25 and 26A–C, the effects of various attributes will be graphically illustrated, separately and in combination.

Figure 24A:
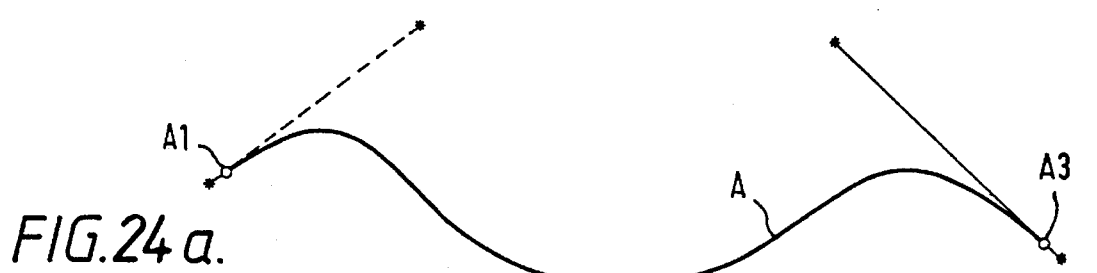
FIGS. 24A–E show a set of supervisory display representations of an object.

FIG. 24A shows the path of the object on a supervisory display. The path is defined by three path control points $A_1, A_2, A_3$; the tangents at the control points are illustrated. No attribute values are set, and consequently the image shown in FIG. 25A produced by the image generator 114 shows a line with substantially no width and dark colour.

Figure 24B:
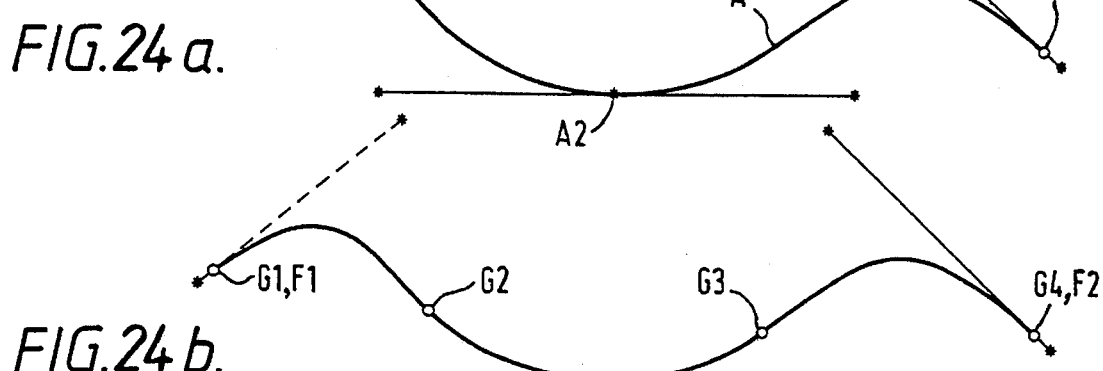

Referring to FIG. 24B and FIG. 25B a predetermined, constant extent is provided by defining the extent at two extent control points co-located with the curve control points $A_1, A_3$ with tangent end point values defining tangent angles of normal 90°, relative to the extent (i.e setting the extent curves parallel to the path). Colour profiles $G_1, G_4$ are defined at these two points, and at two intervening colour control points $G_1, G_3$. The profiles are shown in FIG. 26A.

Figure 24C:
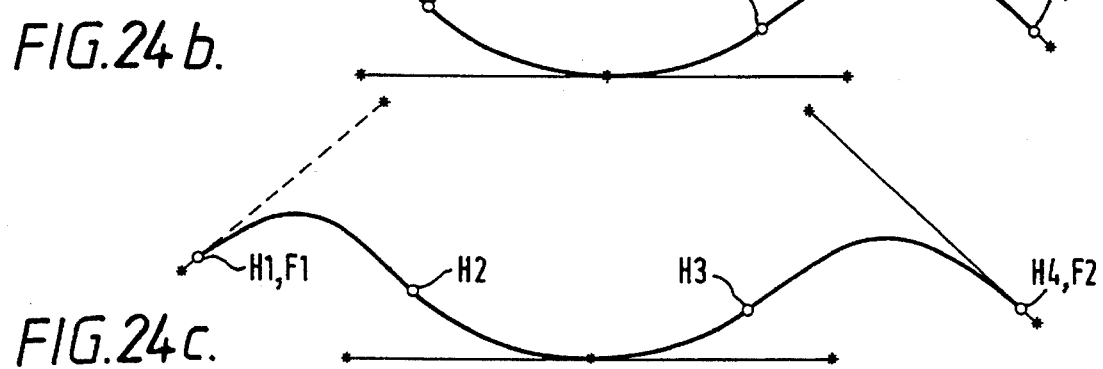
Figure 26B:
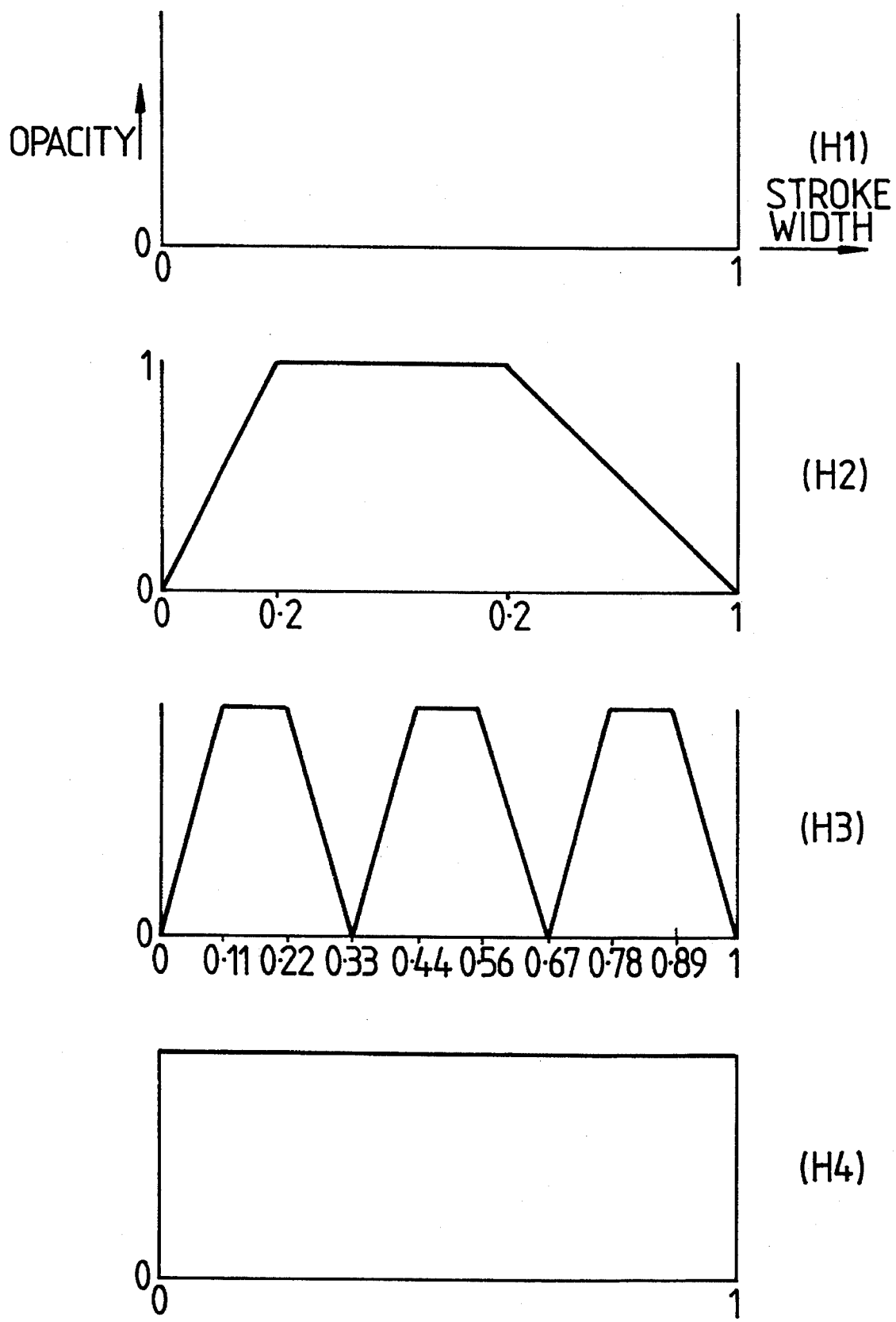

Referring to FIG. 24C, as above the same extent control points and values are employed as in FIG. 24B. Opacity profiles are set at the two end curve control points $H_1, H_4$, and at two intervening points, $H_2, H_3$. The corresponding profiles are shown in FIG. 26B. It will be seen from FIG. 25C that the object is rendered entirely transparent towards its left hand end, so that the background grid previously stored in the frame store 130b is visible, and opaque at its right hand end, with intervening transparent and opaque stripes produced by interpolation through point $H_3$.

Figure 24D:
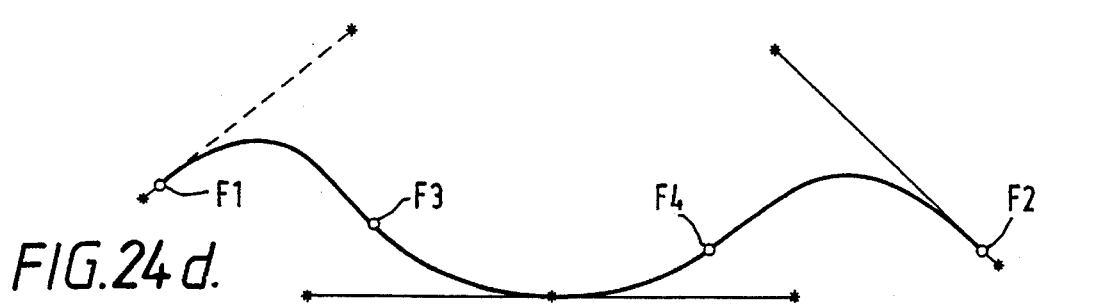
Figure 24E:
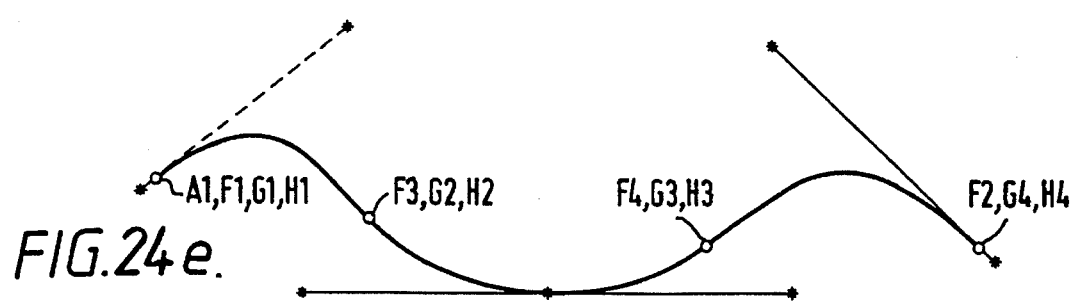
Figure 25:
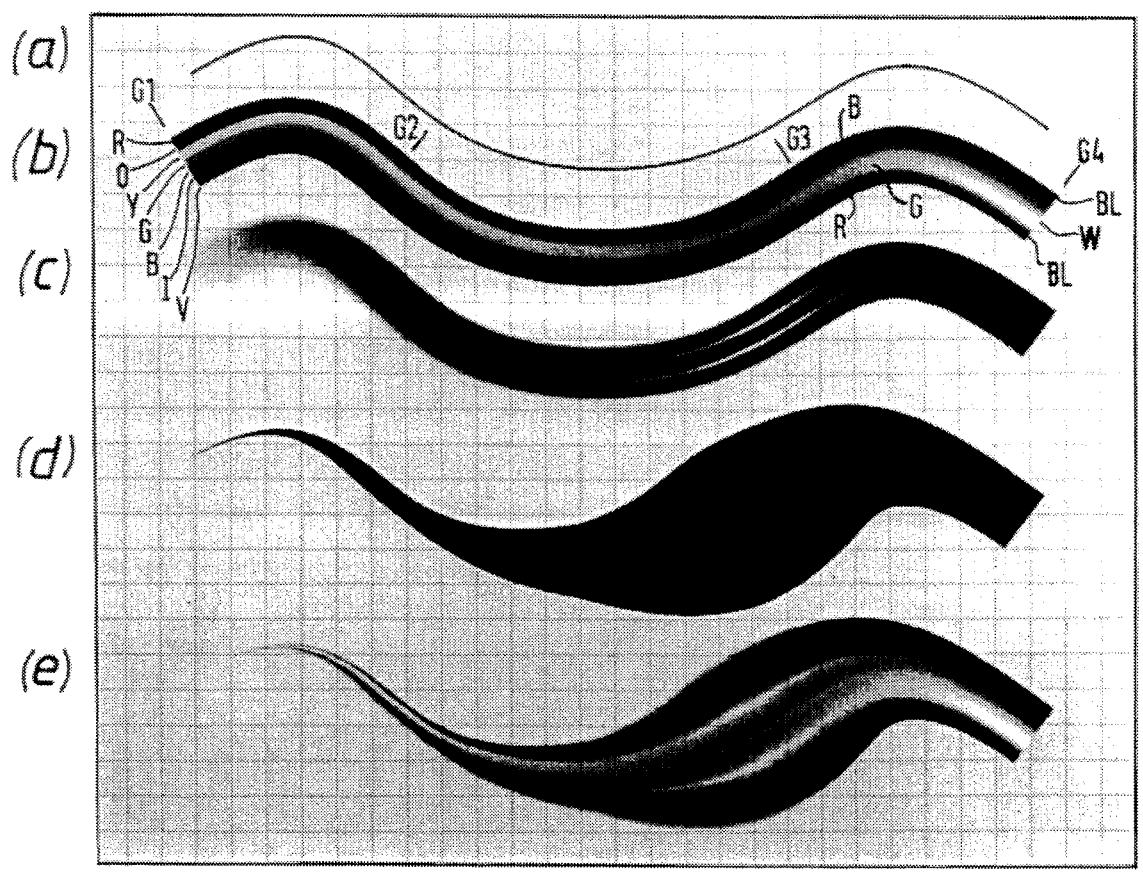
FIG. 25A–E show the corresponding generated images of the object.

Referring to FIG. 24D, the lateral extent of the object is set in this case to different values at each of four control points $F_1$–$F_4$ to taper to 0 at the left hand end point $F_1$, rise to a maximum value at $F_4$, and thereafter taper to a predetermined level at $F_2$ as shown in FIG. 26C.

Referring to FIG. 25E, when the colour profiles of FIG. 26A, the opacity profiles of FIG. 26B and the extent values of FIG. 26C are combined, a complex object is produced resembling a sophisticated brush stroke. It will be seen that the invention allows easy separation and manipulation of attributes of objects, but can equally be used to create complex and artistic displays.

Figure 27:
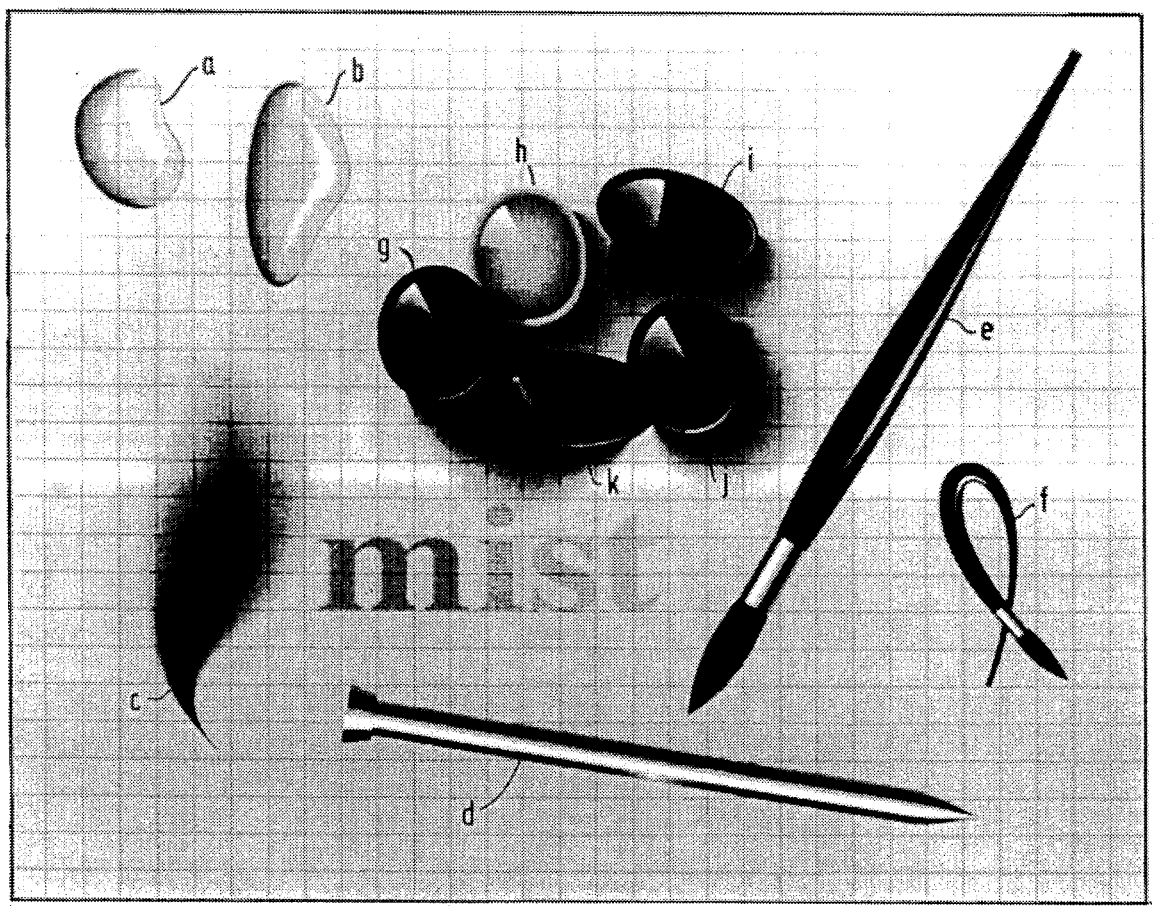
FIG. 27 shows schematically a generated image containing further objects.
Figure 28:
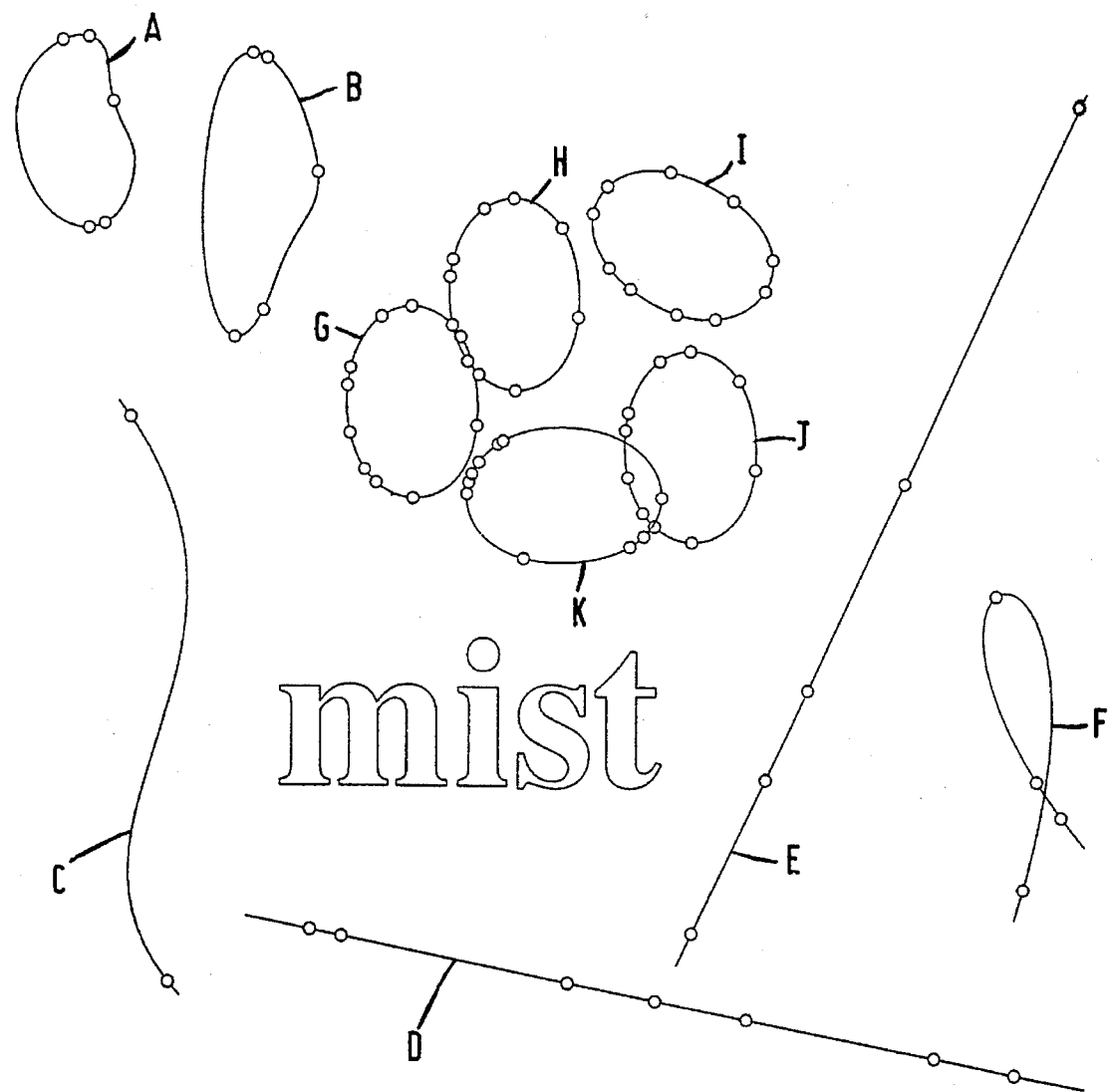
FIG. 28 shows the corresponding supervisory image.

Referring to FIGS. 27 and 28, further examples of the output produced by this embodiment of the invention are shown. Objects a–k of FIG. 27 correspond to lines A–K on the supervisory display shown in FIG. 28. Objects a and b show highlighted areas and shaded areas in substantially transparent objects, produced by relatively small numbers of transparency, colour, and extent control points. Object c shows an "airbrush" effect produced by two control points (as shown in FIG. 28) at which are specified extent values and colour and opacity profiles, the colour profile in this case being monochrome.

Referring to FIG. 27, a linear object (a nail) is represented as a straight path D, with an effective illusion of illumination being provided by the colour profiles giving bright and shaded areas of the object.

The object e shown in FIG. 27 is also represented by a linear path E and a relatively small number of extent control points; setting colour profiles provides the illumination highlights and shading, the colours (blue for the handle and brown for the tip) of the different parts of the object e and the appearance of hairs within the brush tip.

The object f shows substantially the same object as e, but with the curve control points amended to create a curve.

The objects g–k (respectively coloured blue, yellow, mauve, green and red) show highlighting created by colour profile control points, as previously discussed.

Automatic Editing

Thus far, editing of attribute by a user has been described. Since the positions or control points at which the attribute data is defined are themselves defined relative to a path A corresponding to the object, modifications of the path by the user will not affect the validity of the attribute data to a large extent. Preferably, the apparatus according to a preferred embodiment is arranged to effect predetermined amendments to the path and attribute data in response to corresponding user commands.

Object Translation

Figure 29:
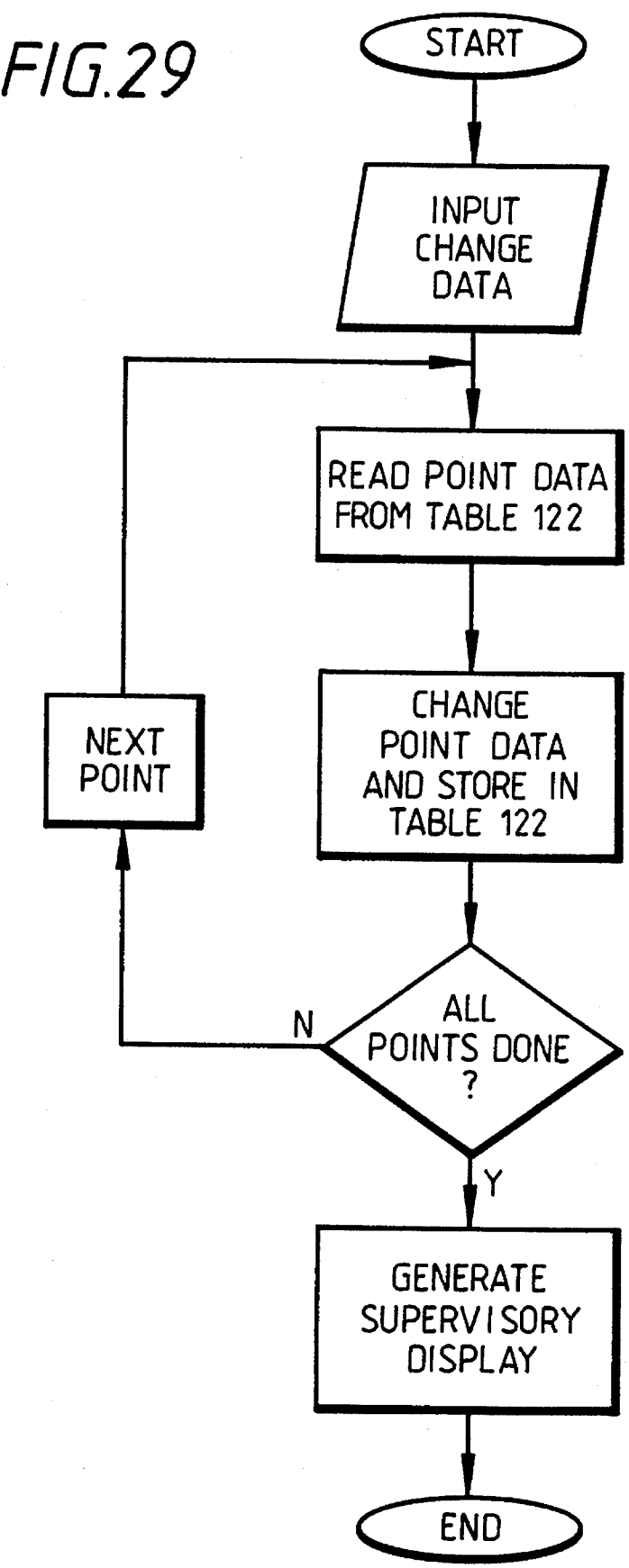
FIG. 29 shows schematically a flow of operations of an embodiment of the invention for automatically varying the appearance of an object.

To translate the entire object within the display, referring to FIGS. 29 and 30, it is merely necessary to amend the X,Y co-ordinate data relating to the path or line A within the line table 122 shown in FIG. 4. For example, if the object is to be shifted a distance corresponding to 50 units (for example millimetres) along and 50 up within a display, the supervisory display editor 113 reads each X,Y position within the line table 122, adds a corresponding increment of 50 to each co-ordinate and writes the co-ordinates back into the line table 122.

The new position for the object, or the distance the object is to be moved in each of the X and Y directions, may be specified by typing numeric values via the keyboard 170b, together with a key stroke indicating that a translation operation is to be performed. Alternatively, on receipt of a control signal indicating a translation operation, the supervisory display editor 113 may be arranged to accept from the cursor tracker 112 the cursor X,Y position as an indication of either the position to which line A is to be moved or the amount of a translation. In this case, the user indicates the translation by manipulation of the mouse or other position sensitive input device 170a.

Rotation

To rotate the object within a display, a user initiates a control signal indicating that rotation is to be performed and inputs, in the same manner as described generally above, data indicating the point about which rotation is be performed and the angle through which the object is to be rotated. The supervisory display editor 113 is arranged to recalculate the X,Y co-ordinates of each of the curve control points in the table 122, using strightforward trigonometrical algorithms, to derive co-ordinates of the rotated path and store these in the table 122. Further, the editor 113 is arranged to recalculate the tangent values at each point to add the angle of rotation to the tangent angle.

Scaling

To scale the line A to expand or contract the line, relative to some point, the supervisory display editor 113 needs to recalculate, as above, the X,Y position coordinates of each of the curve control points in the table 122 so as to multiply the differences between each co-ordinate and the corresponding co-ordinate of the reference position by the desired scaling factor. At the same time, the magnitude of the tangent data is likewise multiplied by the scaling factor. The user therefore inputs the scaling factor and the position relative to which the scaling is to be calculated (which is, in many applications, one of the ends of the object).

However, since this type of scaling (shown in FIG. 31B) of the line A leaves the extent data unmodified, the shape of the object (specifically, its aspect ratio) is altered. This is undesirable in many applications.

Accordingly, it is preferred that the supervisory display editor 113 should also amend the extent data, by multiplying each extent value in the line table 122 by the scaling factor and then storing the scaled extent data back in the table 122 as illustrated in FIG. 31C.

Alternatively, in another embodiment, the supervisory display editor 113 is arranged to accept an instruction to amend the extent values by multiplying each with a scale factor, whilst leaving the co-ordinates of the curve or path control points unchanged. In this way, it is possible to make an object thinner or fatter without changing its length.

Translation Along A Path

Referring to FIG. 32, it may be useful to move certain portions of an object, along the path A about which the object is defined. For example, the visibility of the object may be zero towards the ends of the path so that the object is not visible towards the ends of the path. To move a portion of the object (for example, the visible part), the supervisory display editor 113 is arranged to amend the attribute control point position data stored in the table 122, leaving other contents of the table unchanged. Where path or curvature control points lie between attribute control point positions, it is necessary to derive the line length as described above, and the actual X,Y positions of the attribute control points along the line, scale these positions and then recalculate the parametric attribute control point positions.

Automatic Lighting Effects

One particular use to which colour profiles can be put is in simulating the effect of illuminating the object, to give an impression of depth to the object as previously discussed and shown in FIGS. 27 and 28. To achieve this, parts of the object which are intended to be represented as having alignment such as to reflect light from the light source are represented as brighter, and others as darker; the impression of a curved surface is achieved by providing a gradation of brightness, by setting the colour value at one point to represent bright white and that at another point to represent dark. The effect of coloured lighting is achievable similarly.

Figure 33:
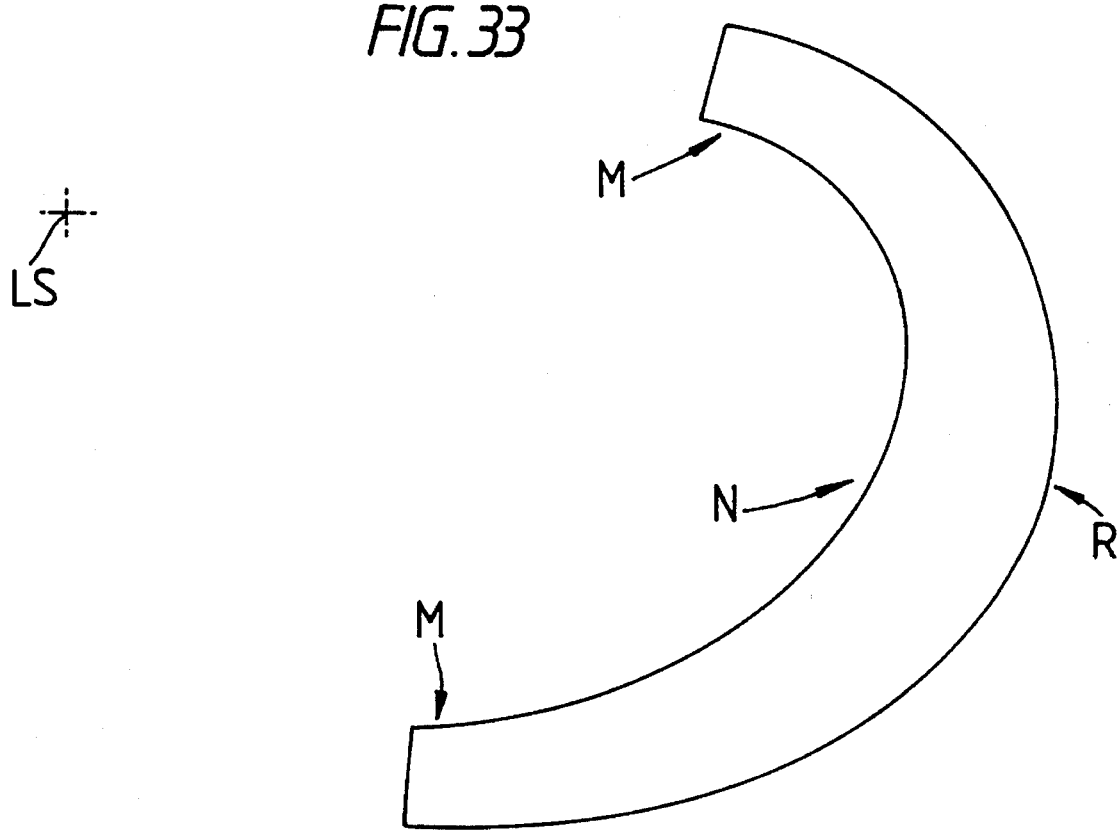
FIG. 33 shows schematically an illumination effect produced by an embodiment of the invention.

To provide such an effect automatically, referring to FIG. 33 a user specifies a light source position LS (for a representation of illumination from a point source) or direction for a representation of the effects of a parallel illumination source. What is required is that the brightness at points in the object should be determined by the inclination of the object at those points to the direction to the defined light source. Parts (N) of the object inclined normal to the direction to the defined light source position should be bright, whereas those parts (M) approaching parallel inclination thereto should be dark.

Preferably, the edges or extents of the object (R) which are the more distant to the light source LS are also darkened.

This may be achieved in several ways. Firstly, the supervisory display editor 113 may determine the inclination of the object at the existing points at which colour values are set, and amend those values. Secondly, the supervisory display editor 113 may create a further set of colour or opacity control points, specifically to add highlighting and shading to the object as desired. Alternatively, the highlighting or shading may be executed during the process of generating the image by the image generator 114, at the point, for example, where the quadrilateral corner points have been established; the modification being effected on the colour values at each of the quadrilateral corner points prior to interpolating within the quadrilateral.

In a further embodiment, the table 122 may be dimensioned to store depth information at points in the object a allowing the shading to be responsive also to the depth of the object in or out of the display 160. Such stored depth information could also or alternatively be employed for other purposes; for example, for determining, where two objects occupy an overlapping area of a display, which one is to be represented as hidden or partially obscured by the other. The depth information could be input by the user or alternatively, in the case where the object is derived from a three dimensional representation, supplied in accordance with that representation.

Composite Assemblies of Objects

Figure 34:
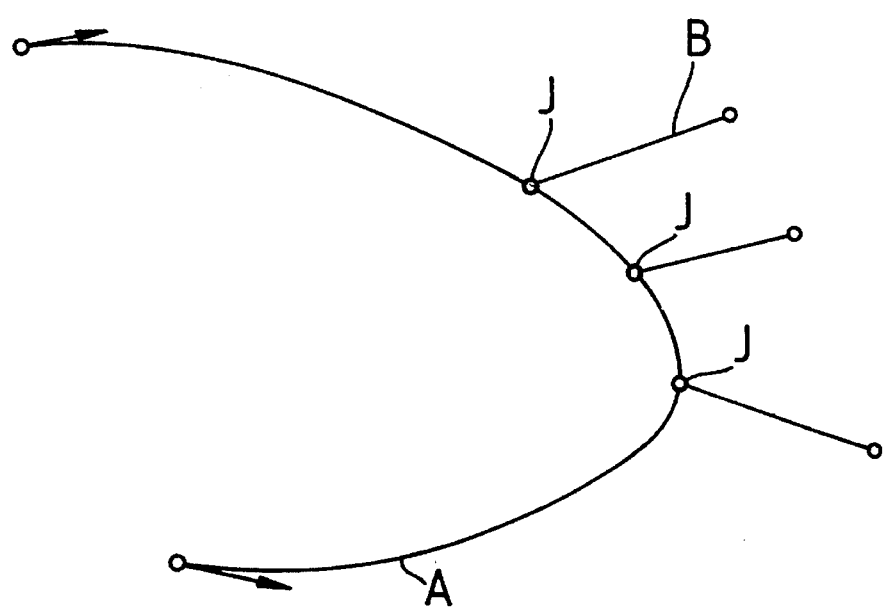
FIG. 34 shows schematically the connection of objects in a further embodiment of the invention.
Figure 35:
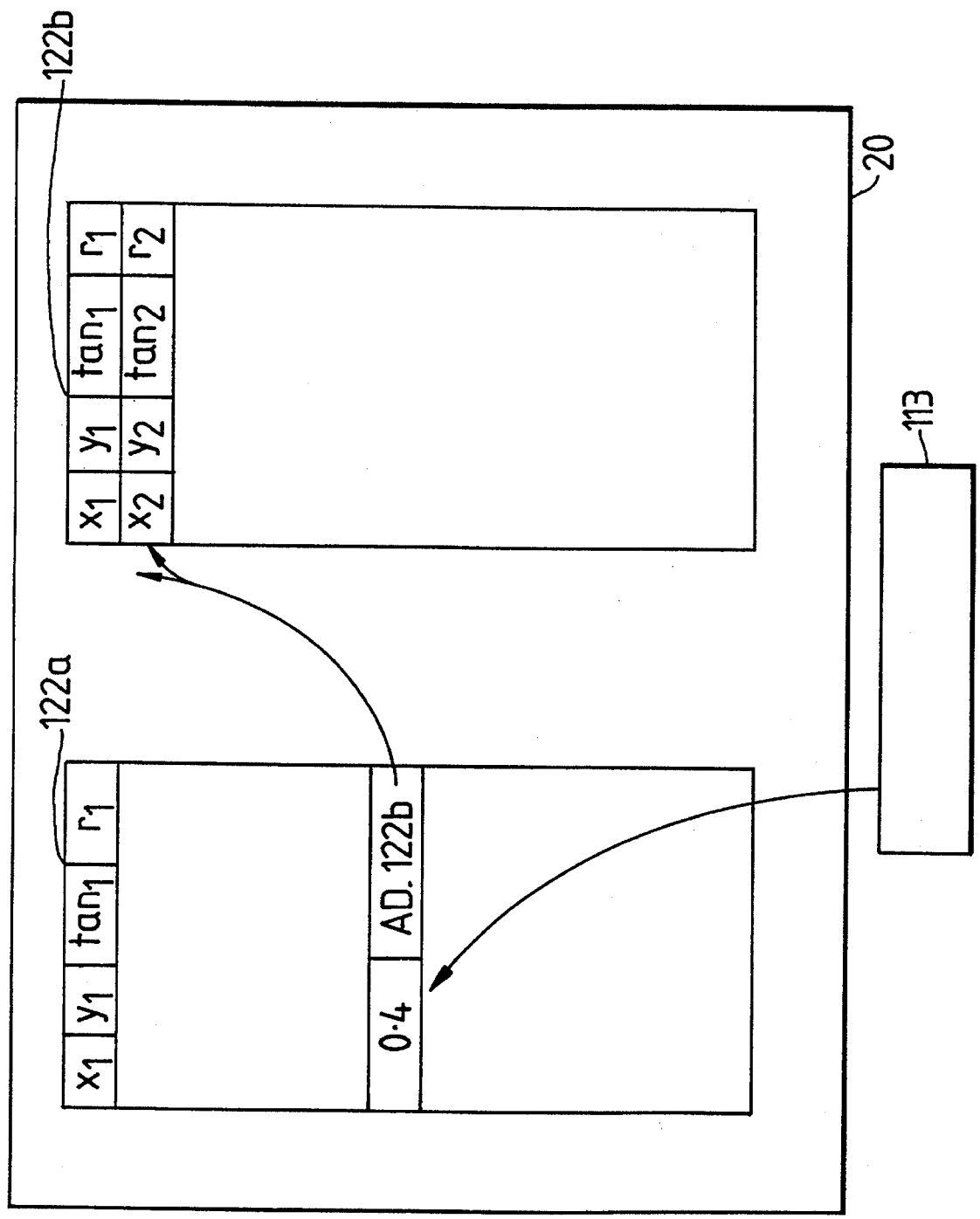
FIG. 35 shows schematically the arrangement of data within the memory 120 corresponding to the connected objects of FIG. 34.

Referring to FIG. 34, a flag may be stored indicating that one object is linked to another object or forms an assembly therewith and the two may be displayed connected on the supervisory display. In this case, upon a user moving scaling or otherwise varying (for example by another affine transformation) one object, parameters of the other are automatically correspondingly amended by the supervisory display editor 113.

Preferably, the flags indicate a hierarchical structure to the object; for example, one object (A) may represent a toe and another (B) a foot to which the toe is connected. In this case, when a user changes one object (for example, by moving the object), the supervisory display editor 113 examines the flag of the object or objects to which it is connected. Any objects ranked lower in importance than the changed object are correspondingly changed; objects ranked higher are left unchanged. Thus, in the above example, movement of a toe would not move the foot, but movement of the foot moves all the toes. Likewise movement of the leg moves both the foot and the toe.

Preferably, as shown, the objects which are linked together are displayed on the supervisory display with paths joined. At the join, a control point symbol is displayed. This symbol represents a path control point for the joining path, but has no effect upon the joined path. It is constrained to be moved along the joined path, to change the point of contact of the objects.

Data relating to this point within the display is therefore stored within two separate line tables; in the subsidiary object table, the stored data represents, as usual, position coordinates and tangent data whereas in the table relating to the line to which it is connected, the data stored is a position value (relative to the line, and preferably a value of the interpolated parameter t at that position along the line) and the address within the memory 120 of the line table corresponding to the joining or subsidiary object.

Accordingly, when the joining point position is changed by a user, the supervisory display editor is operable firstly to change the parametric position of the joining point within the joined object line table, and secondly, to access the subsidiary line table using the stored base address, calculate the actual positional coordinates of the joining point, and amend the x,y coordinates of the curve control points in the subidiary object by a corresponding amount.

Whenever an object is moved or transformed in any way, the supervisory display editor is likewise operable in this embodiment to recalculate the actual positions of the joining points of that object, and access the line tables of the subsidiary objects joined at those points, and correspondingly amend the curve control position data therein.

OTHER MODIFICATIONS AND IMPROVEMENTS

Extent Angles

Although in the foregoing the extent of the object has been defined and represented normal to the line or path A of the object, where the object is to appear as, for example, a brush stroke, the extents could be defined at an angle inclined to the line A; in this case the line store 122 will include also data defining the angle of inclination at each extent control point, and the supervisory display generator and image generator will be arranged to correspondingly process the inclination data.

Where the path of each extent of the object is defined by a spline curve, specifically by a Bezier curve, it would be possible to dispense with a further line defining the path of the object, and to define the attributes by reference to one or both of the extent curves, if the extent curves were defined by a two dimensional spline curve (e.g a Bezier curve); in this case, the extent tangent lengths would be variable and the extent points would define as absolute positions.

Mattes

Mattes or masks are used by artists to create an area within the display, inside or outside of which the object is rendered opaque. They therefore act as "windows" either allowing the object to be visible against the background or the background to be visible through the object.

Unlike the stencils or masks used by, for example, air brush artists, mattes in electronic graphics may be defined to be partially opaque so as to effect the transparency of an image with which they are associated. It is known to provide raster mattes, comprising a raster image array of pixel opacity values (which may be provided as an alpha plane in an image buffer), and vector mattes in which an outline of an entirely transparent or entirely opaque region is defined by linear vectors. The raster type of matte suffers from the disadvantage inherent in raster images, that minor changes to the shape, position or size of the matte may require the entire image array of many thousand pixel values to be recalculated. The vector type of matte merely defines a region, and consequently can only be used to define a difference between two opacity values (e.g opaque and transparent).

In the present invention, we provide a matte by defining a vector image (preferably of the type described above, comprising a path and extents spaced from the path) and associated opacity or transparency values at spaced apart points in the image, between which points the opacity is subsequently interpolated. Because the data defining the matte is stored in resolution independent form, as with the image data described above, it may simply and readily be amended without needing extensive recalculation of the entire image, by employing supervisory displays and input means as described above.

The, or each, matte thus comprises essentially an image containing an object defined by a path, extent attribute data and opacity/transparency attribute data. It is particularly convenient to provide that the opacity attribute data is stored in the same format as colour attribute data as described above. A separate line memory area 122 could be provided for the matte to enable it to be defined as a completely separate image from any other image, but since it is commonly the case that an area which is to provide a matte for a particular image is defined by parts of that image, it is generally more convenient for the line memory 122 to include all the lines which will be used to define a given image and its associated matte or mattes.

A matte table 129 (shown in FIG. 48) is provided within the memory 120 storing, for each matte, data specifying the lines within the line memory 122 defining the matte, and for each such line, attribute data specifying extents about the line of the matte and the relative transparency within the matte. The relative transparency may be specified at several points, and interpolated through the area of the matte along each line, to provide a varying degree of transparency or opacity. The image generator 114 is arranged to access this table, and derive the extents or boundaries of each matte whilst generating the image and to interpolate the relative transparency of the matte (in the same manner as described above with reference to FIGS. 16–23 and 38–47). When the transparency value for each pixel is determined, the computer 100 is arranged to multiply the transparency data defined for each object by the transparency data defined at each point by the matte.

The computer 100, in this embodiment may therefore provide means (e.g a button) for allowing the user to specify that a matte is to be constructed, and for correspondingly creating a matte table 129 within the memory 121. The extent and transparency data is then defined and edited in the same manner as described above with relation to image attribute data, the data values being written however to the matte table 129 rather than to the table 122.

Preferably, the computer 100 is arranged to allow the creation of more than one matte table 129 simultaneously within the memory 121 so as to allow several masks to be defined. When an image is to be rendered, the memory 121 is checked to ascertain whether a matte table 129 is present and, if so, the operations of generating the image pixel data and generating the matte pixel data are performed and then the two sets of pixel data are point wise multiplied to provide the final image.

Various modifications to the above described matte system may be provided. For example, the above described system for generating mattes may not include any image generation system but could instead receive a conventional raster scanned image within the framework 130; the advantages of providing an easily edited matte offering complex shapes and transparency profiles apply equally to such raster defined images.

Further, a given matte could act upon another matte rather than upon an image, allowing the creation of complex textures.

Finally, for compatability with the above described image generation system, the "transparency" data associated with the matte may be stored in the same format as, and correspond to, a component of the colour attribute so that the matte may be rendered and displayed on the monitor 160 as a monochrome image. For further consistency with the image generation system, the matte may also allow separate "transparency" data to be defined, allowing extra flexibility in defining the matte. The matte table 129 may thus be stored in a similar format to an image table 122.

The mattes created in this way therefore comprise electronic images including outline drawings surrounding portions of the image to be separated, with attribute data specifying the transparency associated with those portions. These matte images may be separately printed for subsequent optical combining, or may be employed directly, electronically, by providing that the image buffer 130 is of the type including a transparency plane and three colour planes, and by multiplying each pixel of the frame with which the matte is associated with the corresponding transparency value of the matte, and each pixel at the frame with which it is to be combined by the inverse of that transparency value, for example.

More particularly, the matte may be used to combine or composite together a pair of different images, where each pixel of each image comprises a red value (R plane), a blue value (B plane), and a green value (G plane), the process of compositing the two comprises multiplying each of the R, G and B pixel values of a first image by the transparency values of the corresponding pixels of the matte image, and multiplying each of the R, G and B values of the second image by unity less the transparency values of the corresponding pixels of the matte.

Next, each colour value of each pixel in the image buffer is set equal to:

$$C=C_1+(1-A_1)C_2$$

Where $A_1$ is the transparency value (derived from the matte at that pixel) and $C_1, C_2$ are the colour values multiplied by the transparency values as described above. If each pixel in the final image is required to have a transparency value, then this too can be derived from the transparency values of the original images added in a proportion determined by the transparency value of the matte at each point.

Image compositing finds application in, for example, electronic illustration systems, desktop publishing systems, illustration and design systems generally, business presentation graphics, audio visual systems and the like.

One use of the technique in animation or cinema is to take a character from one sequence of images and superimpose the character on another sequence of images in place of the existing picture as disclosed in our PCT application GB91/02122 (now published as WO-A-92/09965) filed on the same day as the present application and claiming the same priority.

Dormant Curve Control Points

It may be convenient to provide within the or each line table 122, entries for storing curve control points including an active/dormant flag region. By generating an appropriate control signal, the user can change the state of this flag. When the flag indicates that the point is active, the supervisory display generator and image generators 111, 114 treat the point as a curve control point and generate the respective images in dependence upon the value of the tangent at the point. The x,y position of the point, on becoming active, is derived by interpolation between its neighbouring curve control points.

However, when the flag is set to indicate that the point is dormant, the only action taken in response to the point is to display a corresponding symbol on the supervisory display. Thus, a user may provide alternative configurations of a line and switch therebetween merely by changing the flag state of such a dormant point.

Libraries of Attribute Point Sets

Conveniently, the appearance of certain objects (for example, types of brush stroke) may be stored as a predetermined set of profiles and/or extent values, on the mass storage device 180. On execution of an appropriate control signal, the corresponding attribute point data are read from the mass storage into a line table 122 at predetermined points along a line corresponding thereto, and may subsequently be amended by a user as described above.

Object Ends

In the particular case where the object to be represented is a brush stroke, it may be convenient to provide means for automatically generating a smooth end for the object in some convenient way.

Fills

As with mattes above, an area to be filled with a given colour may be designated as an area bounded by certain paths, and means for setting the values of image points within the generated image store 130*a* which correspond to points within the area defined by these lines to a predetermined colour are therefore preferably provided. To achieve this, the means are arranged to calculate the coordinates of the intervening points along the lines between the control points defining the lines.

Texture

Interesting visual effects are produced if the outline of an object, represented by its extent lines, is used as a window through which a further image is visible. This may be achieved, for example, by modifying the process of FIG. 18 so that image points within each quadrilateral are derived, not by interpolation but by looking up an image point at a corresponding address within a texture image buffer which stores a texture image as a plurality of image points.

Preferably, however, rather than merely allowing the texture image to become visible through the object, it is processed in various ways. For example, in one preferred embodiment of this type, the orientation of the path of the object at each quadrilateral is taken into account when accessing the texture image buffer, so that the texture image is warped to follow the path of the object; the inclination at each quadrilateral is derivable by interpolation between the extent tangents for each segment. In another embodiment, the texture image is expanded or contracted (for example, by spatial sub-sampling) to scale the texture image to the extent of the object along its path.

The texture image may, rather than being stored in raster form in a texture image buffer, be an image characterised, as above, as objects each defined by path and attribute data at control points. In this case, a raster image may be reconstituted, as a above, in the texture image buffer or alternatively the operations of generating the texture image and the generated image may be combined into a single rendering operation.

One example of a texture image is a picture of fur, to enable a 'furry' line or stroke to be created.

Alternative Method of Interpolating Stroke Profile Angle

A problem that can arise with the strokes as defined is that "creasing" can occur when wide strokes go around sharp bends. This problem can be fixed by interpolating the stroke profile angle using the angle in screen space, instead of the angle with respect to the path. The method of angle interpolation could be an attribute that can be set for each section of the stroke.

We claim:

1. A method of operating an image processing apparatus to generate image data defining an object, said object being defined by a general path and at least one attribute, said method comprising the steps of:

generating path data defining said path of said object;

generating under user control attribute data defining a value of said at least one attribute of said object at specified attribute points, each of said attribute points having a position relative to said path; and varying the position of a desired one of said attribute points under user control without changing said path.

2. A method according to claim 1, wherein each of said attribute points has a position on said path.

3. A method according to claim 1, further including the step of varying said path under user control while maintaining the positions of said attribute points relative to said path.

4. A method according to claim 1, wherein said at least one attribute is selected from the group consisting of an attribute of opacity, an attribute of color and an attribute of object extent.

5. A method according to claim 1, further including the step of varying the value of said at least one attribute under user control at one of said attribute points selected by the user.

6. A method according to claim 1, wherein said path is defined as a spline curve.

7. A method according to claim 1, wherein said path is determined at least partially by a plurality of path control points relative to said path.

8. A method according to claim 7, including generating said path by interpolating between said path control points, and wherein said path data defines said path control points and further comprises flag data for each of said path control points, said flag data being selectable between a first value whereby said path is generated in dependence upon said path control point and a second value whereby said path is generated independently of said path control point.

9. A method according to claim 7, wherein said path has a curvature, and for each of said path control points said path is further determined by tangent data defining said path curvature thereat.

10. A method according to claim 9, wherein said tangent data comprises data defining at least one tangent vector end point.

11. A method according to claim 1, wherein said value of said at least one attribute at each of said attribute points defines an extent of said object at a predetermined angle to said path thereby defining a boundary of said object displaced from said path.

12. A method according to claim 11, wherein said at least one attribute has first and second extent values thereby defining respective first and second boundaries of said object.

13. A method according to claim 12, wherein said first and second extent values are defined by the user such that said first and second boundaries are both displaced to one side of said path.

14. A method according to claim 11, further including the step of the user defining said predetermined angle.

15. A method according to claim 11, wherein said value of said at least one attribute further defines a tangent angle of said boundary at said respective attribute point relative to said path.

16. A method according to claim 1, wherein the relative position of each of said attribute points is defined by a scalar value specifying a distance along said path.

17. A method according to claim 1, further comprising the steps of:

generating a first display displaying an image including said object in accordance with said path and said attribute values; and generating an auxiliary display displaying a symbolic representation of said value of said at least one attribute at each of said attribute points.

18. A method according to claim 17, wherein said attribute value is varied by the user by manipulating said symbolic representation using a position sensitive input device.

19. A method according to claim 17, including arranging said auxiliary display to further display a symbolic representation of said path of said object in said image.

20. A method according to claim 19, wherein the user varies said path by manipulating said symbolic representation of said path using a position sensitive input device.

21. A method according to claim 19, including arranging said auxiliary display to further display a plurality of symbols on said symbolic representation of said path, each of said symbols representing a respective one of said attribute points.

22. A method according to claim 21, wherein the relative position of a selected one of said attribute points is varied by the user by manipulating said respective symbol using a position sensitive input device.

23. A method according to claim 1, wherein said step of varying the position of a desired attribute point is performed without varying said attribute value associated with said attribute point.

24. A method according to claim 1, further including the step of defining a value of a further attribute of said object at at least one further attribute point, said further attribute and said at least one further attribute point being different from said attribute and said attribute points.

25. A method according to claim 1, further including the step of defining values of at least one further attribute of said object under user control at a given one of said specified attribute points.

26. A method according to claim 1, further including the step of recording said image data on a recording medium.

27. An defining apparatus comprising:

means for storing data defining an image comprising a plurality of objects, at least one of said objects being defined by a general path and at least one attribute;

means for defining said path of at least one of said objects;

means for defining, under user control, a value of said at least one attribute of said at least one of said objects at specified attribute points, each of said attribute points having a position relative to said path; and means of varying the position, under user control, of a desired one of said attribute points without changing the said path.

28. An image defining apparatus according to claim 27, wherein each of said attribute points has a position on said path.

29. A method of generating an image representing an object said method comprising the steps of:

receiving path data defining a general path for said object to be represented in said image;

receiving attribute data specifying values for an attribute of said object at attribute points, at least one of said attribute points having a position specified in said attribute data in terms which are relative to said path and independent of said path data defining said path;

interpolating attribute values along said path between said values specified in said attribute data; and generating image output data in accordance with said path and said interpolated attribute values.

30. A method according to claim 29, wherein each of said attribute points has a position on said path.

31. A method according to claim 29, wherein said path is defined in said received path data by reference to path control points, said attribute points including points whose position does not coincide with any of said path control points.

32. A method according to claim 31, wherein each of said attribute points has a position on said path, said position being specified by a parameter indicating a proportional distance between two of said path control points.

33. A method according to claim 29, wherein said image output data comprises a plurality of image point values associated with corresponding points in said image, and wherein said steps of interpolating and generating are performed by dividing said object into a plurality of contiguous polygons along said path of the object, each polygon having a length and an attribute linearly interpolated along said length, said length being selected so as not to exceed a predetermined error criterion in said interpolated attribute values.

34. A method according to claim 29, wherein said at least one attribute is selected from the group consisting of an attribute of opacity, an attribute of color and an attribute of object extent.

35. A method according to claim 29, wherein said attribute is opacity and said object forms part of a matte image.

36. A method according to claim 29, further including the step of recording said image output data on a recording medium.

37. A method according to claim 36, wherein said image output data is recorded as a visible image.

38. A method according to claim 29, further including the step of generating a signal carrying said image output data.

39. A method according to claim 38, further including the step of recording said signal.

40. A method according to claim 39, wherein said signal is recorded on a video cassette.

41. An image processing apparatus comprising:

means for receiving path data defining a general path for an object to be represented in an output image;

means for receiving attribute data, said attribute data specifying values for an attribute of said object at attribute points, at least one of said attribute points having a position specified in said attribute data in terms relative to said path and independent of said data defining said path;

means for interpolating attribute values along said path between said values specified in said attribute data; and means for generating image output data in accordance with said path and said interpolated attribute values.

42. An image generating apparatus according to claim 41, wherein each of said attribute points has a position on said path.

43. An image generating apparatus according to claim 41, wherein said path is defined in said path data by reference to path control points, said attribute points including points whose position does not coincide with any of said path control points.

44. A method of generating image data defining an object, said object being defined by a general path and at least one attribute, comprising the steps of:

generating path data including control points defining said path of said object; and generating attribute data defining a value of said at least one attribute of said object at specified attribute points, each of said attribute points having a position which is relative to said path and which is independent of said control points defining said path of said object.

45. A computer-useable memory device wherein computer-readable instructions are stored for causing an image processing apparatus to generate image data defining an object, said object being defined by a general path and at least one attribute, said instructions including instructions for:

causing said apparatus to generate path data defining said path of said object;

causing said apparatus to allow a user to generate attribute data defining a value of said at least one attribute of said object at specified attribute points, each of said attribute points having a position relative to said path; and causing said apparatus to allow a user to vary the position of a desired one of said attribute points without changing said path.

46. A memory device according to claim 45, wherein the instructions for causing said apparatus to allow the user to generate attribute data are such that each of said attribute points has a position on said path.

47. A memory device according to claim 46, wherein the instructions for causing said apparatus to allow the user to generate attribute data comprise instructions for causing said apparatus to allow the user to define the relative position of each of said attribute points by a scalar value specifying a distance along said path.

48. A memory device according to claim 45, further including instructions for causing said apparatus to allow the user to vary said path while said apparatus maintains the positions of said attribute points relative to said path.

49. A memory device according to claim 45, wherein the instructions for causing said apparatus to allow the user to generate attribute data comprise instructions for causing said apparatus to allow the user to select said at least one attribute from the group consisting of an attribute of opacity, an attribute of color and an attribute of object extent.

50. A memory device according to claim 45, further including instructions for causing said apparatus to allow the user to vary the value of said at least one attribute at one of said attribute points.

51. A memory device according to claim 45, wherein the instructions for causing said apparatus to allow the user to generate attribute data comprise instructions for causing said apparatus to allow the user to define, by said value of said at least one attribute at each of said attribute points, an extent of said object at a predetermined angle to said path thereby defining a boundary of said object displaced from said path.

52. A memory device according to claim 51, wherein the instructions for causing said apparatus to allow the user to generate attribute data comprise instructions for causing said apparatus to allow the user to provide said at least one attribute with first and second extent values thereby defining respective first and second boundaries of said object.

53. A memory device according to claim 52, wherein the instructions for causing said apparatus to allow the user to generate attribute data comprise instructions for causing said apparatus to allow the user to define said first and second extent values such that said first and second boundaries are both displaced to one side of said path.

54. A memory device according to claim 51, further including instructions for causing said apparatus to allow the user to define said predetermined angle.

55. A memory device according to claim 51, wherein the instructions for causing said apparatus to allow the user to generate attribute data comprise instructions for causing said apparatus to allow the user to define, by said value of said at least one attribute, a tangent angle of said boundary at said respective attribute point relative to said path.

56. A memory device according to claim 45, further comprising instructions for:

causing said apparatus to generate a first display displaying an image including said object in accordance with said path and said attribute values; and causing said apparatus to generate an auxiliary display displaying a symbolic representation of said value of said at least one attribute at each of said attribute points.

57. A memory device according to claim 56, further comprising instructions for causing said apparatus to allow the user to vary said attribute value by manipulating said symbolic representation using a position sensitive input device.

58. A memory device according to claim 56, further including instructions for causing said apparatus to arrange said auxiliary display to further display a symbolic representation of said path of said object in said image.

59. A memory device according to claim 58, further including instructions for causing said apparatus to allow the user to vary said path by manipulating said symbolic representation of said path using a position sensitive input device.

60. A memory device according to claim 58, further including instructions for causing said apparatus to arrange said auxiliary display to further display a plurality of symbols on said symbolic representation of said path, each of said symbols representing a respective one of said attribute points.

61. A memory device according to claim 60, further including instructions for causing said apparatus to allow the user to vary the relative position of a selected one of said attribute points by manipulating said respective symbol using a position sensitive input device.

62. A memory device according to claim 45, wherein the instructions for causing said apparatus to allow the user to vary the position of a desired one of said attribute points comprise instructions for causing said apparatus to allow the user to vary the position of a desired attribute point without varying said attribute value associated with said attribute point.

63. A memory device according to claim 45, further including instructions for causing said apparatus to allow the user to define a value of a further attribute of said object at at least one further attribute point, said further attribute and said at least one further attribute point being different from said attribute and said attribute points.

64. A memory device according to claim 45, further including instructions for causing said apparatus to allow the user to define values of at least one further attribute of said object at a given one of said specified attribute points.

65. A memory device according to claim 45, wherein the instructions for causing said apparatus to generate path data comprise instructions for causing said apparatus to generate path data defining (i) the path at least partially by plurality of a path control points relative to the path and (ii) flag data for each of said path control points; and further including:

instructions for causing said apparatus to generate said path by interpolating between said path control points; and instructions for causing said apparatus to select said flag data for each path control point between a first value and a second value whereby said path is generated in dependence upon path control points for which the flag data has the second value but independently of path control points for which the flag data has the first value.

66. A method of operating an image processing apparatus to generate image data defining an object, said object being defined by at least a first path and a second path, said method comprising the steps of:

generating first path data defining said first path of said object;

generating, under user control, second path data defining said second path by reference to an attribute point, said attribute point having a position relative to said first path; and varying the position of said attribute point under user control so as to change the second path without changing said first path.

67. A method according to claim 66, wherein said attribute point has a position on said first path.

68. A method according to claim 66, further including the step of varying said first path under user control while maintaining the position of said attribute point relative to said first path.

69. A method according to claim 66, wherein said first path is defined as a spline curve.

70. A method according to claim 66, wherein said first path is determined at least partially by a plurality of first path control points relative to said first path.

71. A method according to claim 70, wherein said second path is determined at least partially by a plurality of second path control points, said attribute point forming one of said second path control points but not one of said first path control points.

72. A method according to claim 71, wherein when said step of varying the position of said attribute point is performed, other ones of the plurality of second path control points are moved by a corresponding amount.

73. A method according to claim 66, wherein the position of said attribute point is defined by a scalar value specifying a distance along said first path.

74. A method according to claim 66, further including the step of recording said image data on a recording medium.

75. A method according to claim 74, wherein said image data as recorded includes said first path data and said second path data.

76. A method according to claim 66, further including the step of generating a signal carrying said image data.

77. A method according to claim 76, wherein said image data as carried by said signal includes said first path data and said second path data.

78. An image defining apparatus comprising:

means for storing data defining an image comprising a plurality of objects, at least one of said objects being defined by at least a first path and a second path;

means for defining said first path of at least one of said objects;

means for defining, under user control, said second path of said at least one of said objects by reference to an attribute point, said attribute point having a position relative to said first path; and means for varying the position, under user control, of said attribute point so as to change said second path without changing said first path.

79. An image defining apparatus according to claim 78, wherein said attribute point has a position on said first path.

80. A computer-useable memory device wherein computer-readable instructions are stored for causing an image processing apparatus to generate image data defining an object, said object being defined by at least a first path and a second path, said instructions including instructions for:

causing said apparatus to generate first path data defining said first path of said object;

causing said apparatus to allow a user to generate second path data defining said second path by reference to an attribute point, said attribute point having a position relative to said first path; and causing said apparatus to allow a user to vary the position of said attribute point so as to change the second path without changing said first path.

81. A method according to claim 80, wherein the instructions for causing the apparatus to allow the user to generate the second path data comprise instructions for causing said apparatus to allow the user to generate the second path by reference to an attribute point having a position on said first path.

82. A method according to claim 80, further including instructions for causing said apparatus to allow the user to vary said first path while said apparatus maintains the position of said attribute point relative to said first path.

83. A method according to claim 80, wherein the instructions for causing said apparatus to generate the first path data comprise instructions for causing said apparatus to define said first path as a spline curve.

84. A method according to claim 80, wherein the instructions for causing said apparatus to generate the first path data comprise instructions for causing said apparatus to determine said first path at least partially by a plurality of first path control points relative to said first path.

85. A method according to claim 84, wherein the instructions for causing said apparatus to allow the user to generate the second path data comprise instructions for causing said apparatus to allow the user to determine said second path at least partially by a plurality of second path control points, and instructions for causing said apparatus to define said attribute point to form one of said second path control points but not one of said first path control points.

86. A method according to claim 85, wherein the instructions for causing said apparatus to allow the user to vary the position of the attribute point further comprise instructions for causing said apparatus to move other ones of the plurality of second path control points by a corresponding amount when the position of said attribute point is varied.

87. A method according to claim 80, wherein the instructions for causing said apparatus to allow the user to generate the second path data comprise instructions for causing said apparatus to allow the user to define the position of said attribute point by a scalar value specifying a distance along said first path.

* * * * *

UNITED STATES PATENT AND TRADEMARK OFFICE
CERTIFICATE OF CORRECTION

PATENT NO. : 5,611,036
DATED : March 11, 1997
INVENTOR(S) : Berend et al.

It is certified that error appears in the above-indentified patent and that said Letters Patent is hereby corrected as shown below:

Column 5, line 52, "$3(x_1-x_3)=c_x+2b_x 3a_x;$" should read -- $3(x_1-x_3)=c_x+2b_x+3a_x;$ --.

Column 9, line 9, "ill" should read -- 111 --.

Column 16, line 9, delete "a".

Column 20, line 8, "$S=(|P_1-P_0|+0.5|P_2-P_1|)/(|P_1-P_0|+|P_2-P_1|+|P_3-P_2|)$" should read -- $S=(|P_1-P_0|+0.5|P_2-P_1|)/(|P_1-P_0|+|P_2-P_1|+|P_3-P_2|)$ --.

Column 22, line 9, "$3a+2b$" should read -- $3a\,s^2+2b$ --.

Column 24, line 58, "130$b$is" should read -- 130$b$ is --.

Column 27, line 46, "(A)" should read -- (B) --.

Column 27, line 47, "(B)" should read -- (A) --.

Column 32, line 9, "generating under user control" should read -- generating, under user control, --.

UNITED STATES PATENT AND TRADEMARK OFFICE
CERTIFICATE OF CORRECTION

PATENT NO. : 5,611,036
DATED : March 11, 1997
INVENTOR(S) : Berend et al.

It is certified that error appears in the above-indentified patent and that said Letters Patent is hereby corrected as shown below:

Column 33, line 43, "An defining" should read -- An image defining --.

Column 33, line 60, "object said" should read -- object, said --.

Column 1, line 44 "represents" should read --represent--.

Column 2, line 59 "device," should read --devices,--.

Column 3, line 49 "to further" should read --to a further--.

Column 5, line 63, "is" should read --are--.

Column 11, line 29 "other the" should read --other hand, the--.

Column 17, line 41 "colocated" should read --co-located--.

Column 18, line 62, "and the hence" should read --and hence--.

Column 23, line 42, "quadrilateral a" should read --quadrilateral, a--.

Signed and Sealed this

Fifteenth Day of July, 1997

*Attest:*

BRUCE LEHMAN

*Attesting Officer*     *Commissioner of Patents and Trademarks*